Dec. 8, 1964 H. E. BURKE 3,160,709

TELEPHONE CALL ACCOUNTING SYSTEM

Filed March 30, 1959 13 Sheets-Sheet 1

Dec. 8, 1964 H. E. BURKE 3,160,709

TELEPHONE CALL ACCOUNTING SYSTEM

Filed March 30, 1959 13 Sheets-Sheet 2

Dec. 8, 1964

H. E. BURKE 3,160,709

TELEPHONE CALL ACCOUNTING SYSTEM

Filed March 30, 1959

13 Sheets-Sheet 4

Dec. 8, 1964 H. E. BURKE 3,160,709

TELEPHONE CALL ACCOUNTING SYSTEM

Filed March 30, 1959 13 Sheets-Sheet 6

United States Patent Office 3,160,709

Patented Dec. 8, 1964

3,160,709

TELEPHONE CALL ACCOUNTING SYSTEM

Harry E. Burke, Sierra Madre, Calif., assignor to Consolidated Systems Corporation, Monrovia, Calif., a corporation of California Filed Mar. 30, 1959, Ser. No. 803,018
17 Claims. (Cl. 179—7.1)

This invention relates to automatic telephone systems and has particular reference to a system for keeping account of telephone calls placed through a telephone exchange from any of a plurality of local telephone subscribers. The information accounted for by the system for each call includes: information identifying the calling subscriber, the called party, and information establishing the time duration of the call. This is the minimum information required to compute the calling subscriber's telephone bill.

The conventional automatic call accounting system, typified by the Bell Telephone Automatic Message Accounting System (AMA system), is an elaborate installation designed to monitor the telephone traffic in a large central office exchange of a telephone company, where subscribers are billed regularly at infrequent periods, usually on a monthly basis. By its nature, this conventional system does not lend itself to a proportionate reduction in size for small scale operations on an economical basis; nor is it practical for situations where a particular subscriber's telephone bill may be required at any time on demand.

There has long existed a need for an automatic call accounting system which is economically practical for small scale operations and which does not interfere with or require major alterations in existing telephone equipment. For example, the telephone service provided by a typical modern hotel for the convenience of its guests is almost invariably operated at a substantial financial loss, which may be directly attributed to the hotel's dependency upon manual line monitoring, call ticketing and bill posting techniques. This loss is defined as the discrepancy between the potentially collectible revenue and the amount actually collected from the guests, and in a typical one thousand room hotel it is estimated at the present time to average around fifteen thousand dollars per year. The manual call accounting practice consists primarily in making a separate record or ticket for each call as it occurs and then, at the end of some arbitrary time interval, collecting the tickets, sorting them and posting the information on the guest's account card. The monitoring and ticketing practice burdens the hotel PBX (Private Branch Exchange) operator and oftentimes results in poor telephone service to the hotel's guests, which telephone service also includes internal calls and incoming calls; and, the failure of the PBX operator to ticket an outgoing call results in a revenue loss to the hotel. Also, the periodic collection, sorting and posting of call information burdens the accounting department, and results in an arbitrary time interval for which the guest must be relied upon to disclose any calls made by him, at the time he chooses to check out. As a guest's bill must be presented complete at the time when he checks out, practically speaking, errors cannot be corrected even when it is subsequently possible to identify them. Hence, errors by the accounting department in the periodic collection, sorting and posting of call information, and errors resulting from the failure of the guest to disclose calls made during the arbitrary time interval, both result in a revenue loss to the hotel. It is therefore abundantly apparent that the modern hotel is greatly in need of an automatic call accounting system, to eliminate the monetary losses and to improve the telephone service to the hotel's guests. So far as is known, nobody has ever come up with an automatic system acceptable for this purpose.

The need is not confined to the hotel situation. An analogous problem exists in any private institution which, as a part of its operation, must keep account of telephone calls, such as in hospitals and universities. Also, many of the small telephone companies servicing local areas throughout the country, while employing central office exchange equipment, nevertheless cannot justify the installation of a conventional automatic call accounting system like the AMA system. Here again is a need for a small, economically practical system, and particularly one which lends itself to expansion.

The call accounting system of the invention fills these stated needs. It may be operated in conjunction with a PBX, a PABX (Private Automatic Branch Exchange), or a central office exchange. Regardless of the type of telephone exchange involved, the basic situation is that calls may be placed through the exchange at random times from any of a plurality of local telephone subscribers, and these calls must be accounted for. Complete up-to-the-minute information must be available at any time on demand. In terms of structure, the present invention combines a main storage facility for storing digitally encoded words, a call monitoring system coupled to the telephone exchange for completing and transferring intact to the main storage facility substantially contemporaneously with the execution of said calls digitally encoded words describing the calls, each completed word describing a particular concluded call and having a known order of digits which identify the calling subscriber, the called party and which establish the time duration of the call, and a concurrently operable readout system coupled to the main storage facility for searching the contents thereof on demand and recovering words therefrom selectively according to a chosen calling subscriber identification.

In accordance with the present invention, there is also contemplated a subcombination which includes the main storage facility and the call monitoring system coupled between the main storage facility and the telephone exchange.

In the preferred embodiment of the invention, the main storage facility includes a plurality of cyclically operating storage means each with the capacity for serially storing a plurality of digitally encoded words. The call monitoring system includes monitoring means for sensing, encoding and accumulating into a complete digital word during the progress of each call the stated information describing the call, and also includes means for transferring each complete word intact from the monitoring means to the main storage facility substantially immediately upon the conclusion of the call which it describes. The transferring means includes means controlling the transfer of complete words to the main storage facility for filling said cyclically operating storage means serially one at a time in a predetermined succession.

Further, in the preferred embodiment of the invention, the readout system is concurrently operable with the call monitoring system and includes readout means for searching the contents of said cyclically storage means one at a time in succession and recovering words having a particular calling subscriber identification, and control means for initiating the action of the readout means for particular subscriber identifications.

The readout means combines means for carrying out a first operating subcycle which includes recovering the particular subscriber identification provided by the control means, means for carrying out a second operating subcycle which includes successively searching the cyclically operating storage means of the main storage facility and recovering the digits identifying the called party and the time duration of the call for each successive word bearing the particular subscriber identification provided by the control means, means coupled to said first and second subcycle means for decoding and printing said information in accordance with a predetermined format as it is recovered, and means responsive to said control means for alternately initiating a first subcycle and a second subcycle.

The control means includes manually actuable means for registering a chosen subscriber identification for the readout means, means for initiating the action of the readout means singularly for said chosen subscriber identification, means providing a program of registrations of subscriber identifications, for the readout means, means for initiating the action of the readout means for a first subscriber identification in the program, and means for automatically recycling the readout means for successive subscriber identifications in the program until the program is exhausted.

The means for initiating the programmed readout operates automatically in response to the filling of a predetermined number of the cyclically operating storage means of the main storage facility following the initiation of the last programmed readout. This cooperation between the call monitoring system and the control means in the readout system prevents overflow of information in the main storage facility.

The control means in the readout system further includes means responsive to the initiation of a programmed readout for limiting the readout means to those particular storage means of the main storage facility filled by said call monitoring system since the initiation of the last programmed readout, and means for erasing the contents of said particular storage means of the main storage facility following the programmed readout thereof. Also, the control means includes means responsive to the initiation of a singular readout for bypassing the limiting means, so as to provide access for the readout means to all of said plurality of said storage means of the main storage facility for a singular readout.

The preferred embodiment of the invention incorporates a number of features which cooperate the programmed readout and the singular readout. Thus, the means for initiating the singular readout includes manually actuable means for producing a requesting signal, and means sensitive to current progress of a programmed readout and responsive to said requesting signal for interleafing a cycle of the readout means for the chosen subscriber identification in between successive cycles of the readout means for the programmed subscriber identifications. This permits a singular readout at any time substantially immediately upon demand.

Another cooperating feature of even greater importance is provided in the readout means which further includes means for transferring for storage in the main storage facility at a predetermined location within each word recovered and prior to the time the readout means leaves each storage means a signal indicating that the word has once been recovered by the readout means, and means sensitive to said stored signals for blocking the subsequent recovery of the same words by the readout means. Thus, unless the system is deliberately operated differently, the information describing any particular telephone call is recovered and printed only one time, either in a singular readout operation or in a programmed readout operation, whichever reaches it first.

Referring again to the hotel situation for an example, it can now be better appreciated that the call accounting system of the invention assures the recovery of virtually all of the monetary losses sustained as a direct result of manual methods, and serves to improve the telephone service offered to the guests. It provides an economically practical means whereby guests may be authoritatively billed for the calls made by them up to and including the particular moment at which they choose to check out. This information is available for each guest upon demand by supplementing the last previous programmed readout with a singular readout when the guest checks out, bearing in mind that the compatibility features between the programmed and singular readouts prevent the guest from being charged twice for the same telephone call or for calls made by previous guests occupying the same room. The hotel PBX operator is relieved of the responsibility and distraction of continuously monitoring and ticketing outgoing calls, thereby leaving her considerably more time to satisfy the demands of her switchboard and hence, of the hotel guests. The amount of handling of the guest's account card is reduced, and the guest's checkout procedure is facilitated.

Moreover, the call accounting system of the invention permits the use of a PABX in a hotel with dial telephones for the guests, whereby guests may place calls directly without going through a hotel exchange operator.

The call accounting system of the invention, together with additional features and advantages thereof, is explained in detail with reference to a preferred embodiment of the system illustrated in the accompanying drawings, in which.

INTRODUCTION

Figure 1:
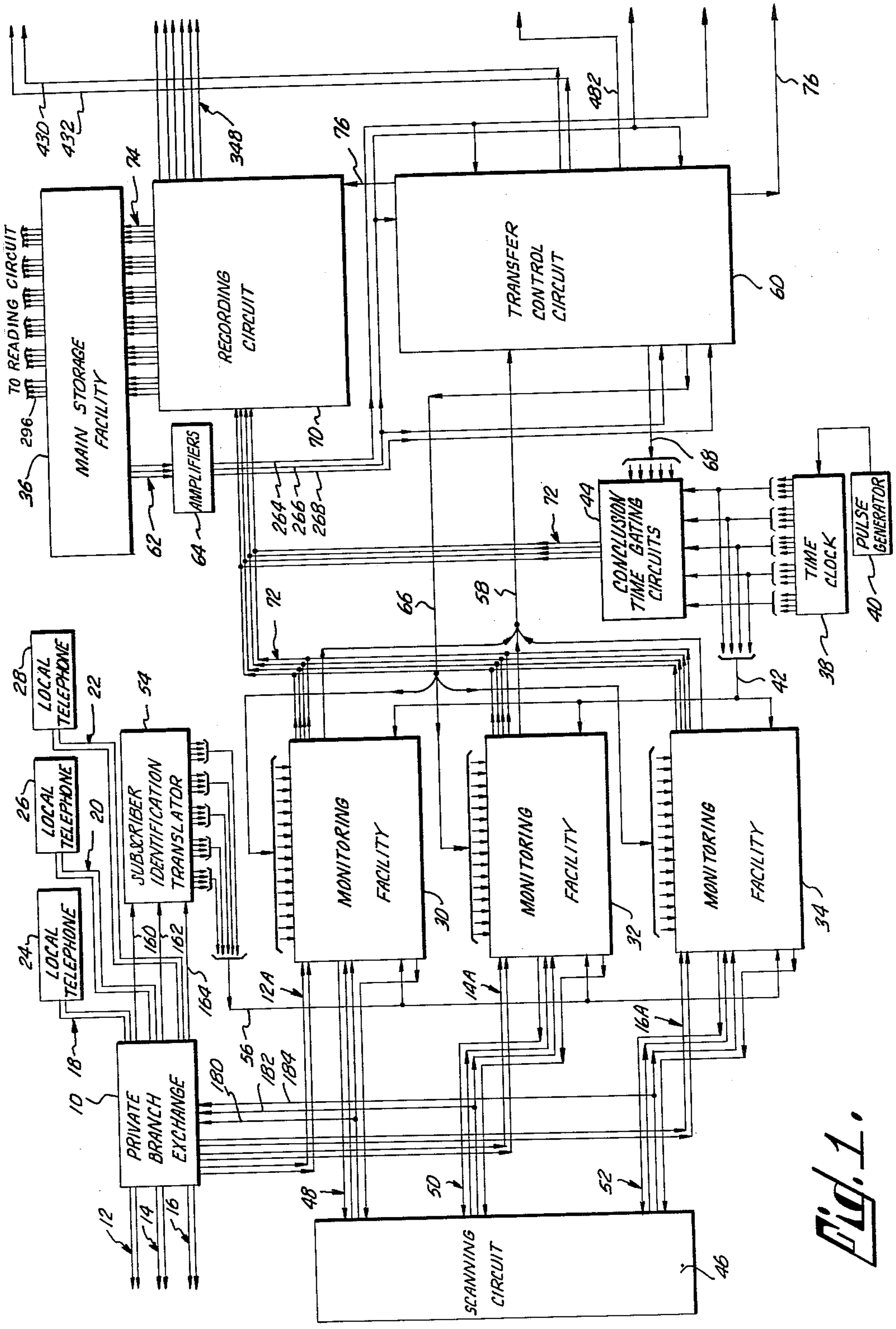
FIG. 1 is a schematic drawing illustrating the components of a call monitoring system as connected between a private branch exchange and a main storage facility.

In the following description, taken in conjunction with the drawings, many of the circuit elements, such as gates, counters, time delays, differentiators, stepping switches, are shown in block schematic form only, with a description of their function and operation in the text. This is done in order to simplify the presentation, because the circuit details of these elements are conventional and form no part of the present invention, and typical circuit details are available in standard reference works. See for example, Electronic and Radio Engineering by Terman, McGraw-Hill Book Company, Inc., 1955, pages 621 to 625 and 656 to 659; The Design of Switching Circuits by Keister, Ritchie and Washburn, D. Van Nostrand Company, Inc., 1951, pages 179 to 193 and 214 to 226; Digital Computer Components and Circuits, Richards, D. Van Nostrand Company, Inc., 1957, pages 397 to 425; Arithmetic Operations in Digital Computers by Richards, D. Van Nostrand Company, Inc., 1955, pages 31 to 48 and 193 to 208; and, Automatic Digital Caclulators, Booth and Booth, Butterworths Scientific Publications, 1956, pages 77 to 93.

Except for coincidence gates, which are so identified in the drawings, three conventional types of gates are employed, the type of gate being ascertainable by noticing the functional terminal labels "off" and "on" in the drawing, and also by reference to the description in the text. The three types are: (1) A monostable "and" gate shown in the drawings with an "on" terminal, which gate is normally closed or "off" but which gate is opened or turned "on" by a signal applied to its "on" terminal so that signals concurrently present at its input produce output signals. This form of gate is typified by a simple relay having a normally open armature-contact combination which is closed by the application of a voltage to the winding, and known electronic equivalents thereof; (2) a monostable "inhibitor" gate which is the reverse of the "and" gate just described and which is shown in the drawings as having an "off" terminal, the gate being normally "on." This gate is typified by a relay that has a normally closed armature-contact combination which is opened by a voltage applied to the relay winding, with known electronic equivalents; and, (3) a bi-stable "and" gate shown in the drawings as having both an "on" and an "off" terminal, the gate being either "on" (open) or "off" (closed) depending on the terminal to which the last signal was applied. This gate is typified by a relay having dual windings wound in opposite directions around a soft iron core for magnetizing the core in opposite directions and having an armature-contact combination with no normal position, the position of the armature being determined by the last direction of magnetization of the iron core where it remains until the condition is reversed by a signal applied to the appropriate winding. A flip-flop operating a simple electronic switch is a known electronic equivalent for this relay.

Figure 20:
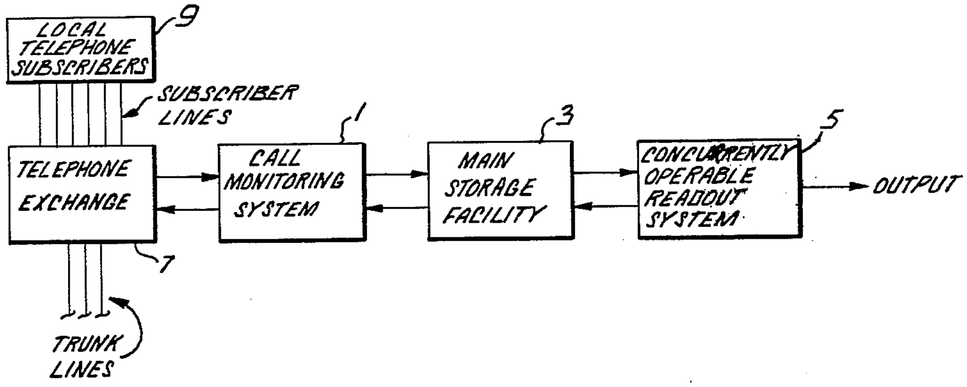

As illustrated in FIG. 20, the general system in accordance with the invention combines a call monitoring system 1, a main storage facility 3 and a concurrently operable readout system 5. Telephone calls may be placed through a telephone exchange 7 from any of a plurality of local telephone subscribers 9. The called party may be another local subscriber, or a distant party. The main storage facility provides storage capacity for a plurality of digitally encoded words. The call monitoring system is coupled between the telephone exchange and the main storage facility and, in monitoring the operation of the telephone exchange, serves to complete digitally encoded words describing the calls and to transfer each complete word intact to the main storage facility. Each word is completed and transferred substantially contemporaneously with the execution of the call which it describes, and has a known order of digits which identify the calling subscriber, the party called and the time duration of the call. The readout system is coupled to the main storage facility and recovers words therefrom selectively according to the calling subscriber identification. It operates concurrently with the call monitoring system, and provides the output for the general system.

Figure 2:
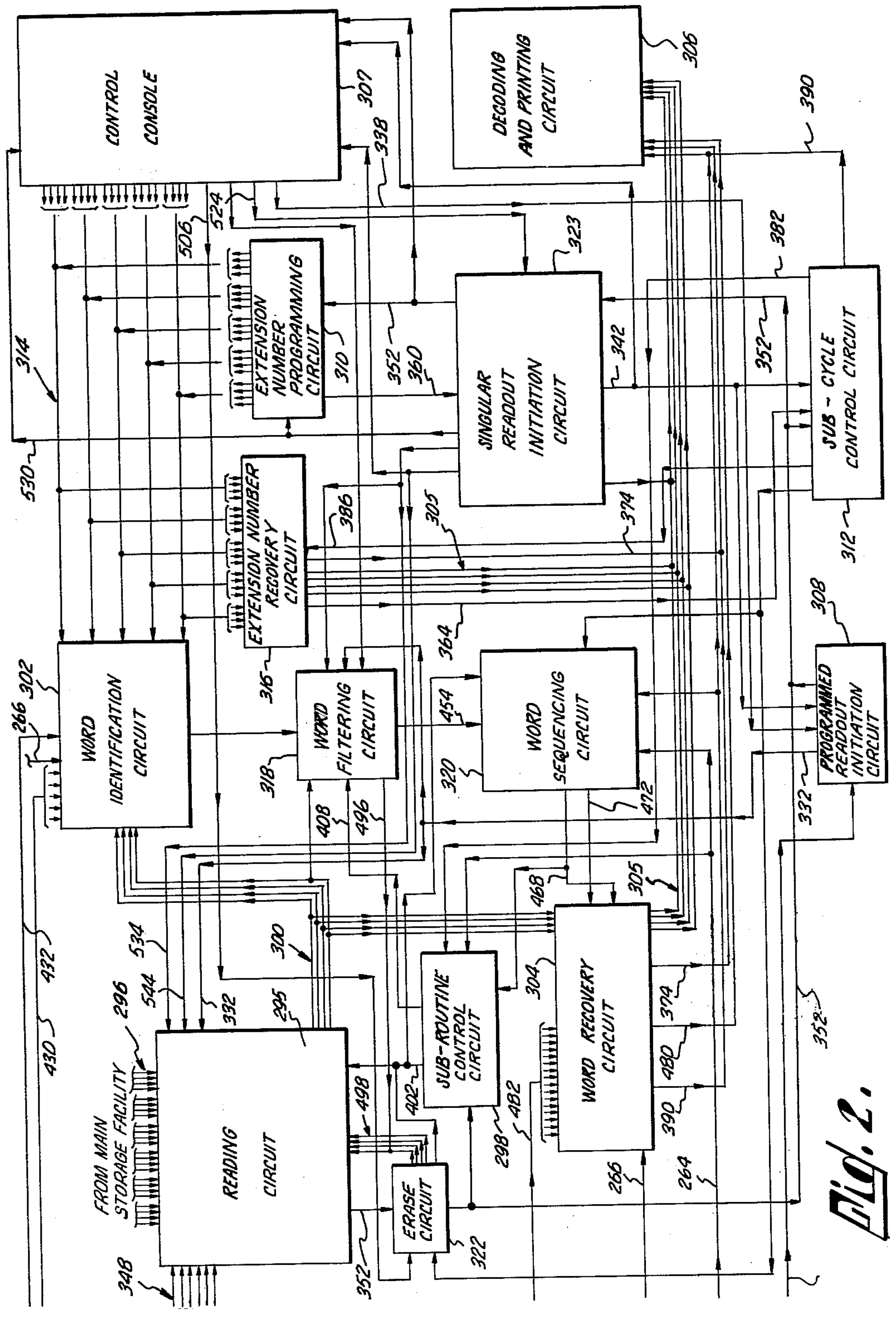
FIG. 2 is a schematic drawing illustrating the components of a concurrently operable readout system.

Taken together, FIGS. 1 and 2 illustrate a preferred embodiment of the general system shown in FIG. 20.

Referring now to FIG. 1, a PBX as might be found in a hotel, is shown at 10. For simplicity, the PBX is shown with only three PBX trunk lines, 12, 14, 16. Each PBX trunk line has two wires, and runs from the PBX to the nearest central office exchange of the telephone company. On the other side of the PBX, herein called the local side, there are three PBX subscriber lines 18, 20, 22, respectively running from the PBX to three subscriber telephones 24, 26, 28, typically hotel extension telephones located in the hotel rooms for the convenience of the guests. In a large hotel, the telephones may outnumber the trunk lines by a factor of thirty or more to one; hence, no particular phone is associated with any particular trunk line. When an outside call is initiated from one of the local telephones, a temporary connection is made between the subscriber line for that telephone and one of the outgoing trunk lines not already in use. This connection is made manually by the PBX operator.

A cyclically operating main storage facility 36 is arranged to receive digitally encoded information over any of a plurality of recording channels 74. Each recording channel is coupled to a different portion of the main storage facility, and each portion of the main storage facility has a capacity for storing serially a plurality of digitally encoded words. The main storage facility provides timing pulses over a channel 62 and through amplifiers 64 for synchronizing the action of other parts of the system with its cyclic operation.

A call monitoring system is coupled between the PBX and the main storage facility, and includes a plurality of monitoring facilities 30, 32, 34, a time clock 38, pulse generator 40, conclusion time gating circuits 44, a scanning circuit 46, a subscriber identification translator 54, a transfer control circuit 60, and a recording circuit 70.

Some of the components of the call monitoring system serve as a monitoring means for sensing, encoding and accumulating into a complete digital word during the progress of each call information identifying the calling subscriber, the called party and the time duration of the call. As will be taken up in greater detail later, the monitoring means includes the monitoring facilities 30, 32, 34, the scanning circuit 46, the subscriber identification translator 54, and the time clock 38 and pulse generator 40.

There is one monitoring facility for each trunk line. The monitoring facilities 30, 32, 34 are connected respectively to the associated trunk lines 12, 14, 16 by trunk line extensions 12A, 14A, 16A.

Each monitoring facility senses and stores the dialed telephone number directly by monitoring the signals appearing on its associated trunk line. This information identifies the called party. Also, by this monitoring process, each monitoring facility is instantly aware of the completion and of the conclusion of outgoing calls placed over its associated trunk line.

The time of day is constantly available to all monitoring facilities from the time clock 38. The time clock is driven by the pulse generator 40, and has a digitally coded electrical output which is constantly supplied to all monitoring facilities over a common parallel connection 42. Instantly upon sensing the completion of the call over its trunk lines, each monitoring facility stores the time of day available from the time clock. Later, upon sensing the conclusion of the call, it is not necessary for the monitoring facility to again store the time of day, because the accumulated information is transferred to the main storage facility almost instantly upon the conclusion of the call and the call conclusion time is transferred directly from the time clock along with it.

The calling subscriber identification must be stored in the particular monitoring facility associated with the trunk line carrying the call. This is effected through the cooperative action of the scanning circuit 46 and the subscriber identification translator 54. The scanning circuit has separate connections 48, 50, 52 with the monitoring facilities 30, 32, 34 respectively, and it scans through these connections cyclically and serially, at a fast rate. In a hotel, the calling subscriber identification would be the room or extension number from which a call is placed. Accordingly, the subscriber identification translator 54 is coupled to the local side of the PBX and is prearranged to supply the extension number from which the call is placed upon the receipt of an appropriate tracing signal through the PBX.

At some instant during the course of a call, chosen here as the instant when the call is completed, the monitoring facility monitoring the trunk line will supply a signal to the scanning circuit over its connection therewith, which has the effect of causing the scanning circuit to supply a tracing signal to the PBX upon its next arrival at the connection with the monitoring facility. This signal traces through the PBX by virtue of the connection between the trunk line and the calling subscriber line, whereupon it is supplied to the subscriber identification translator 54 causing the calling party's extension number to appear electrically in digitally coded form on a common interconnection 56 running between the subscriber identification translator and all of the monitoring facilities. Each monitoring facility is arranged internally so that it will accept information from the subscriber identification translator only when the scanning circuit is at its connection with that monitoring facility. Hence, the only monitoring facility that will accept this information for storage is the one associated with the trunk line over which the call is carried.

Thus, during the progress of an outgoing call over a particular trunk line, the associated monitoring facility accumulates the outside telephone number dialed, the extension number from which the call is placed, and the time of day at which the call is completed. Each monitoring facility provides predetermined storage locations for the digits identifying this information. While this information does not amount to an entire word, it is sufficient to make the entire word available for transfer intact to the main storage facility in one transfer operation. Hence, the effect is the same as if the whole word were stored in the monitoring facility. The technique of sensing and recording the time of day approximately at the instant when a call is completed and concluded should be contrasted with simpler and less informative alternative of actuating a timing device over the period of the call whereby a mere measure of the time duration of the call is provided.

In the call monitoring system, the scanning circuit and the monitoring facilities cooperate with the conclusion time gating circuits 44, the transfer control circuit 60 and the recording circuit 70 to constitute a means for transferring each complete word intact from the monitoring means to the main storage facility substantially immediately upon the conclusion of the call which it describes.

After accumulating the call extension number, the outside number dialed and the call completion time, and upon detecting the conclusion of the call, the monitoring facility primes itself to respond to the next arrival of the scanning circuit at its connection therewith, whereupon the monitoring facility causes the scanning circuit, having arrived at the connection, to dwell there for a length of time sufficient to permit the information stored in the monitoring facility, together with the call conclusion time, to be transferred to the main storage facility. Second, and at the same time, the monitoring facility provides a signal over a common connection 58 running from all monitoring facilities to the transfer control circuit 60. This signal initiates the action of the transfer control circuit, which controls the transfer of the word describing the call to the main storage facility.

The transfer control circuit is constantly apprised of the operating cycle of the main storage facility by means of the timing pulses from the amplifiers 64, and controls the transfer of words to the main storage facility so that the several portions thereof are each filled serially one at a time in a predetermined succession. Upon receipt of a signal over the common connection 58 with the monitoring facilities, the transfer control circuit proceeds to determine the next sequential unused word storage location in the cyclic main storage facility, whereupon it supplies part of a continuous series of transfer signals to all of the monitoring facilities over a common connection 66 therewith, and immediately continues to supply the remainder of the series of transfer signals to the conclusion time gating circuits 44 over a connection 68 therewith. All of this takes place while the scanning circuit is still dwelling on the connection assocaited with the particular monitoring facility involved; and, only this monitoring facility will respond to the transfer signals from the transfer control circuit at this time.

The transfer signals set up a simultaneous reaction in the monitoring facility which causes successive coded digits identifying the calling extension number, the telephone number dialed, and the call completion time to be transferred to the recording circuit 70 over a common recording channel 72, the latter being connected commonly between all monitoring facilities and the recording circuit. The information is routed through the recording circuit to the main storage facility over one of the plurality of recording channels 74. The particular recording channel employed is determined by the transfer control circuit, which signals the recording circuit to this effect over a connection 76.

The conclusion time gating circuits 44 receive the output of the time clock 38, and the immediately continuing transfer signals supplied to these gating circuits by the transfer control circuit cause successive electrically encoded digits which describe the time of day to be transferred over the common recording channel 72 through the recording circuit to the main storage facility. This transfer is effected immediately following the succession of digits from the intermediate storage facility, and in-so-far as timing is concerned, amounts to a continuation of that transfer so that each word is effectively transferred intact to the main storage facility. Because the word is complete with its digits held in known storage locations before being transferred to the main storage facility, the storage pattern for the word in the main storage facility may have a fixed interrelation of parts, thereby facilitating its later recovery.

A readout system which operates concurrently with the call monitoring system is shown in FIG. 2. The readout system includes readout means for searching the contents of the several portions of the main storage facility one at a time in succession and recovering words having a particular calling subscriber identification, and control means for initiating the action of the readout means for particular subscriber identifications.

Referring now to FIG. 2, the readout means shown includes a reading circuit 295, a sub-routine control circuit 298, a word identification circuit 302, a word recovery circuit 304, a decoding and printing circuit 306, a sub-cycle control circuit 312, a word filtering circuit 318, and a word sequencing circuit 320.

Access to the main storage facility 36 is provided by the reading circuit 295, which has a plurality of information channels 296, coupling it to respective portions of the main storage facility for this purpose. Through these channels, and under the control of the sub-routine control circuit 298, a search can be made through the storage capacity of the main storage facility, dwelling on one portion of the main storage facility at a time and scanning the contents thereof serially and cyclically. The contents of each portion of the main storage facility are repeated cyclically over an output channel 300, which runs from the reading circuit to the word identification circuit 302, and also runs to the word recovery circuit 304 wherein it is coupled to a channel 305, called the recovery channel. The recovery channel runs from the word recovery circuit to the decoding and printing circuit 306.

Figure 14:
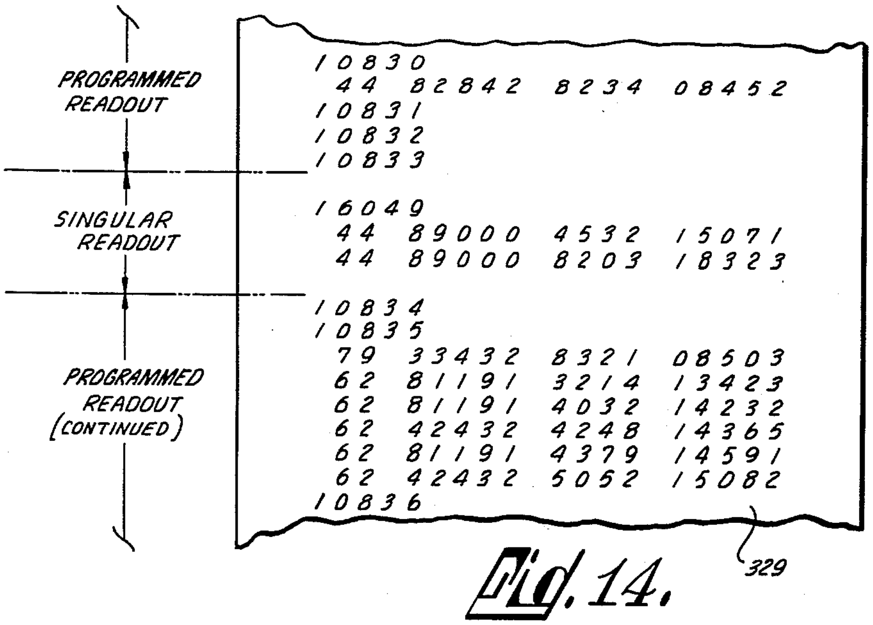
FIG. 14 is a fragmentary drawing of a sheet of paper showing the format in which information is printed by the decoding and printing circuit of FIGS. 2 and 8.
Figure 16:
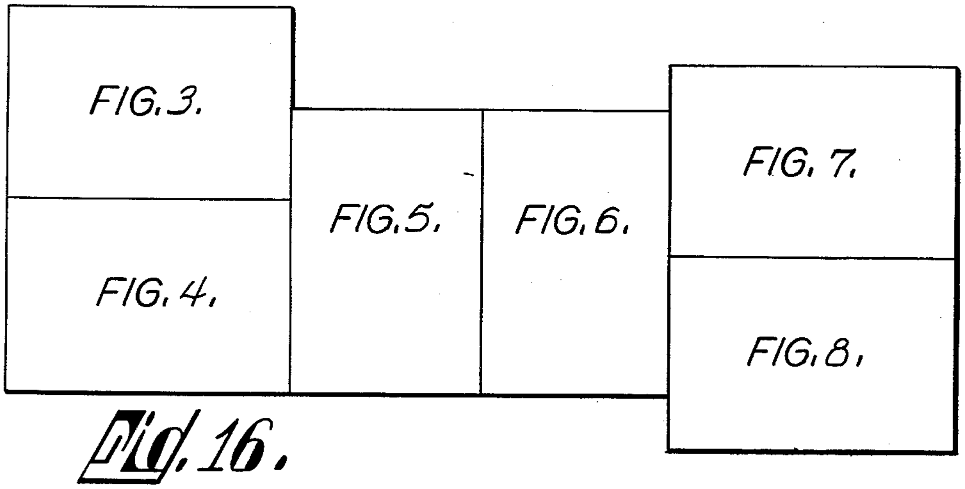
FIG. 16 is a block diagram showing how FIGS. 3, 4, 5, 6, 7 and 8 fit together to form a detailed presentation of the combined circuit of FIGS. 1 and 2.
Figure 15:
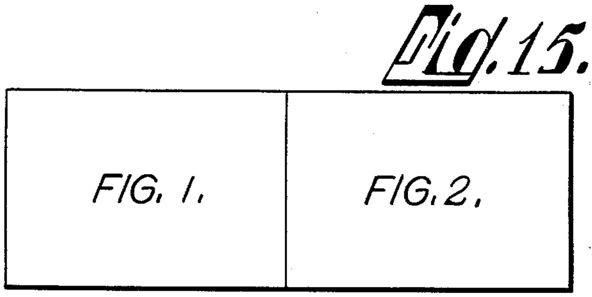
FIG. 15 is a block diagram showing how FIGS. 1 and 2 fit together to form a circuit diagram of the preferred embodiment of the call accounting system of the invention.

The fundamental cycle of the readout means is to search the main storage facility for all words bearing a particular extension number, and to recover these words in a conveniently usable form. Preferably this is printed form as illustrated in FIG. 14. However, if further processing of the information through machines is desired, it must be appreciated that a conveniently usable form might be punched cards or tape, or suitably coded electrical signals for direct entry into a computer or the like, such as for the automatic computation of telephone bills.

This fundamental cycle is divided into two sub-cycles through the operation of the sub-cycle control circuit 312. The first of these sub-cycles in order of occurrence is the recovery of the extension number. The second sub-cycle is the search of the main storage facility, and is divided into two sub-routines that occur alternately a number of times during the sub-cycle, once for each successive portion of the main storage facility searched. The alternate initiation of first and second sub-routines is carried out through the operation of the sub-routine control circuit 298.

In the first sub-cycle, the extension number appearing on five channels 314, called the common extension number channels, is recovered and printed. The common extension number channels 314 are connected to five respective input channels of the word identification circuit 302, and to five respective input channels of the extension number recovery circuit 316. Under the control of the sub-cycle control circuit 312, the extension number recovery circuit supplies the extension number digit by digit over the recovery channel 305 to the decoding and printing circuit 306, which prints the extension number.

After the extension number is printed, the sub-cycle control circuit 312 starts the second sub-cycle by activating the sub-routine control circuit 298. The sub-routine control circuit in turn initiates a first sub-routine by advancing the reading circuit 295 to a first portion of the main storage facility, whereupon the information stored in that portion of the main storage facility begins to appear cyclically on the reading circuit output channel 300.

In each first sub-routine, the words found in the portion of the main storage facility being scanned which bear the extension number provided on the common extension number channels 314 are recovered and printed in accordance with a predetermined format. The extension number for these words, having already been recovered and printed during the first sub-cycle, is not recovered and printed again. The information recovered and printed for each word during the first sub-routine includes the telephone number dialed, the call completion time and the call conclusion time, and may be referred to as the call information group.

The first sub-routine involves the operation of the word identification circuit 302, the word filtering circuit 318, the word sequencing circuit 320, the word recovery circuit 304, and the decoding and printing circuit 306.

The word identification circuit 302 is a comparator means and looks for words bearing the particular extension number. The digits identifying the calling extension number in each word are located in advance of the other digits in the word. As the first part of each word appears on the output channel 300, these digits are picked off and immediately compared for identity with the extension number appearing on the common extension number channels 314. If and when identity exists, the word identification circuit sends a signal through the word filtering circuit 318 to the word sequencing circuit 320. This is referred to as the call identification signal.

A significant feature of the call identification signal is that it occurs during the time when the word from which it results is appearing digit by digit on the output channel 300, and more precisely, at an instant just preceding the succession of digits defining the call information group in this word. Since the informaiton on the output channel 300 is repeated cyclically, any resulting call identification signals are likewise repeated cyclically.

The word filtering circuit 318 normally blocks call identification signals resulting from words previously recovered in other readout operations. As will be seen later, after the call information group from a particular word is recovered and printed, this word is marked by recording a tab signal in an otherwise unused digit storage location immediately preceding the call information group. In any later readout operation, this tab signal will appear on the output channel 300 from the reading circuit in point of time coincident with any call identification signal resulting from the word, so that it may be employed to block this particular call identification signal and hence block a second recovery of the call information group from the word.

The word filtering circuit 318 is coupled to the output channel 300 so that it receives previously recorded tab signals, and normally operates to block the recovery of words from which the tab signal is derived. However, the word filtering circuit may be rendered inactive for any particular readout operation, as desired, in response to a signal manually initiated at a control console 307.

The operation of the word sequencing circuit 320 depends on its receipt of call identification signals, whereupon it performs two main functions. First, it interrupts the operation of the sub-routine control circuit 298 so as to cause the reading circuit 295 to continue scanning the same portion of the main storage facility so long as is necessary to recover and print the call information groups from the words causing the call identification signals. Second, it controls the operation of the word recovery circuit 304 through which this information is recovered. In this regard, the word sequencing circuit distinguishes between call identification signals resulting from different words in the same portion of the main storage facility, and causes these words to be handled one at a time in sequence.

Under the control of the word sequencing circuit 320, the word recovery circuit 304 goes through one operating cycle for each word in the sequence. It serially picks off one at a time the digits defining the call information group, in its operating cycle for each word. These digits are transferred successively over the recovery channel 305 to the decoding and printing circuit 306, where the call information group from each word in the sequence is printed below the extension number recovered in the preceding first sub-cycle.

Eventually, all of the words in the sequence will be printed out by the decoding and printing circuit 306 under successive cycles of operation of the word recovery circuit 304. When this happens, the word sequencing circuit 320 permits the sub-routine control circuit 298 to continue its normal operation of alternately initiating first and second sub-routines. The sub-routine control circuit immediately initiates a second sub-routine.

Each second sub-routine is a brief recording operation occurring just prior to the time that the reading circuit 295 is advanced to scan the next portion of the main storage facility. It is during the second sub-routine that the tab signals are recorded in the words recovered in the immediately preceding first sub-routine, these being the words producing call identification signals. Upon a signal from the sub-routine control circuit 298, the word filtering circuit 318 routs one cycle of the call identification signals through the reading circuit 295 to the main storage facility 36. Accordingly, the call identification signals will be recorded in the current portion of the main storage facility being scanned; and, because of the occurrence of each of these signals in point of time, they will be recorded in the unused digit storage locations immediately preceding the call information groups in the respective words from which they derive. Once the call identification signals are recorded within the words, they are referred to as tab signals to better indicate the purpose which they then serve. The whole operation in the second sub-routine may take place while the reading circuit scans through the contents of the current portion of the main storage facility one time.

After allowing the brief time necessary to complete the second sub-routine, the sub-routine control circuit 298 proceeds directly to initiate another first sub-routine, advancing the reading circuit 295 to scan the next portion of the main storage facility, whereupon the words bearing the particular extension number in that portion, if any, are recovered and printed as described above. Before the reading circuit 295 leaves this new portion of the main storage facility, a second sub-routine will be initiated wherein the tab signals are recorded. Immediately thereafter, the sub-routine control circuit 298 initiates another first sub-routine, advancing the reading circuit 295 to scan a third portion of the main storage facility, and so on, until the reading circuit 295 has exhausted its information channels 296.

If during this process the reading circuit 295 arrives at a portion of the main storage facility wherein there are no words bearing the particular extension number, the failure of call identification signals to arrive at the word sequencing circuit 320 will cause the word sequencing circuit in turn to fail to interrupt the operation of the sub-routine control circuit 298, so that the sub-routine control circuit will proceed immediately to initiate a second sub-routine (which in this event is meaningless since there are no call identification signals) and then proceed immediately to initiate a new first sub-routine, which will advance the reading circuit 295 to the new portion of the main storage facility. It is the word sequencing circuit 320 which causes the reading circuit 295 to dwell upon a particular portion of the main storage facility. Otherwise, the sub-routine control circuit 298 will advance the reading circuit 295 uninterruptedly through its information channels.

Having exhausted its information channels, the next advancement of the reading circuit 295 will produce a signal, called the recycling signal, indicating that the fundamental cycle of the readout means is completed. The recycling signal deactivates the sub-routine control circuit 298.

The control means, which functions primarily to initiate the action of the readout means for particular subscriber identifications, includes the reading circuit 295, the control console 307, a programmed readout initiation circuit 308, an extension number programming circuit 310, and a singular readout initiation circuit 323.

Under the control means, the readout system has two modes of operation, singular and programmed. In the programmed readout operation, a fundamental cycle of the readout means is initiated for a first extension number in the program, and the readout means is recycled for subsequent extension numbers in the program until the program of extension numbers is exhausted. In the singular readout operation, which may be manually initiated at any time, the readout means proceeds substantially immediately to search the entire storage capacity of the main storage facility and recover all the words bearing a chosen extension number of interest, after which the readout means automatically returns to its quiescent state, or resumes a programmed readout operation not yet finished, whichever the case may be.

The programmed readout operation results from a requesting signal, which may be produced manually at the control console 307, and which is produced automatically by the programmed readout initiation circuit 308 when a predetermined amount of the storage space in the main storage facility has been filled by the call monitoring system. In either event, the final signal for initiating a programmed readout operation is provided from the programmed initiation circuit 308, this being the initiating signal which actually starts the operation by activating the extension number programming circuit 310. Should a singular readout operation be in progress at the time the requesting signal is produced, the programmed readout initiation circuit 308 awaits the conclusion thereof before executing the request.

The extension number programming circuit 310 is arranged to provide a complete program of extension numbers. It has five output channels on which any extension number may be represented in coded electrical form. These five output channels are coupled to the common extension number channels 314. The first extension number in the program is set up on these five output channels when the programmed readout operation is initiated. This first extension number will continue on the output channels until the readout means finishes one fundamental cycle, whereupon the recycling signal provided by the reading circuit 295 advances the extension number programming circuit 310 to the next extension number in the program, and causes the sub-cycle control circuit 312 to initiate another first sub-cycle wherein this extension number is recovered through the extension number recovery circuit 316. The sub-cycle control circuit 312 then proceeds to initiate a second sub-cycle, wherein the main storage facility is searched for words bearing this particular extension number in alternate first and second sub-routines, and at the end of which the reading circuit 295 provides another recycling signal to deactivate the sub-routine control circuit 298, advance the extension number programming circuit 310 to the next extension number in the program, and cause the sub-cycle control circuit 312 to initiate another first sub-cycle.

This process continues until after the last extension number in the program is set up on the output channels from the extension number programming circuit 310, and upon the receipt of the next following recycling signal, the extension number programming circuit interrupts the operation of the sub-cycle control circuit 312, thereby returning the readout means to its quiescent state. This finishes the programmed readout operation.

The portions of the main storage facility just read out may now be erased. The erasing operation is initiated manually from the control console 307, whereupon the erase circuit 322 is activated. Under the control of the erase circuit, the reading circuit 295 is cycled through its information channels 296 while an erasing signal is applied through it, thereby erasing the contents of the portions of the main storage facility previously read out. The erase circuit is automatically shut off by the resulting recycling signal from the reading circuit.

The programmed readout operation and subsequent erasing operation do not cover the entire storage capacity of the main storage facility; rather, one or more portions of the main storage facility are reserved for recording call information newly occurring during the time the programmed readout and erasing operations take place. This is effected through the cooperative action of the recording circuit 70 (FIG. 1) and the reading circuit 295, by means of which appropriate information channels of the reading circuit are blocked during this period. On the other hand, a singular readout operation does cover the entire storage capacity of the main storage facility. All of the information channels of the reading circuit 295 are opened during a singular readout operation.

A singular readout operation may be requested at any time from the control console 307. The control console has five output channels coupled to the common extension number channels 314, on which any extension number of interest may be set up manually. After setting up a chosen extension number, a requesting signal is manually initiated. The requesting signal activates the singular readout initiation circuit 323.

The singular readout initiation circuit 323 prevents the initiation of a singular readout operation from interfering with any progressive readout operation currently in progress. Ordinarily the singular readout operation is initiated immediately upon receipt of the requesting signal. However, should a programmed readout operation be in progress at the time the singular readout operation is requested, the singular readout initiation circuit first awaits the receipt of a recycling signal from the reading circuit 295, which indicates the end of a fundamental cycle of the readout means, and then interrupts the programmed readout operation and interleafs a fundamental cycle of the readout means for the chosen extension number, after which the readout means is returned to the control of the extension number programming circuit 310.

In initiating the singular readout operation, the singular readout initiation circuit 323 blocks the five output channels from the extension number programming circuit 310 and activates the five output channels from the control console 307 on which the chosen extension number appears. Also, it signals the reading circuit 295 to temporarily open all of its information channels 296 for the purpose of the singular readout operation, some of these information channels having been blocked for the purpose of the programmed readout operation as explained above. The readout means then proceeds through one fundamental cycle of operation, first recovering the extension number through the extension number recovery circuit 316, and then searching through the entire storage capacity of the main storage facility and recovering words bearing this extension number. Upon the completion of this fundamental cycle, the recycling signal from the reading means 295 causes the singular readout initiation circuit 323 to reactivate the five output channels of the extension number programming circuit 310, and to block the five output channels from the control console 307, and also to restore the reading circuit 295 to its previous condition so far as the blocking of its information channels is concerned.

The system then continues with the programmed readout operation, if one was in progress at the time the singular readout operation was initiated. If one was not in progress at this time, the singular readout initiation circuit has the effect of deactivating the sub-cycle control circuit 312, returning the readout means to its quiescent state.

THE TELEPHONE EXCHANGE

The call monitoring system monitors calls placed through a telephone exchange from any of a plurality of local telephone subscribers. The telephone exchange may be a PBX, a PABX or a central office exchange. While the construction of different telephone exchanges will vary according to the type and the make of the exchange, they all have certain common characteristics. These characteristics will be brought out in connection with the following discussion of the PBX, and its connection with the call monitoring system.

Figure 3:
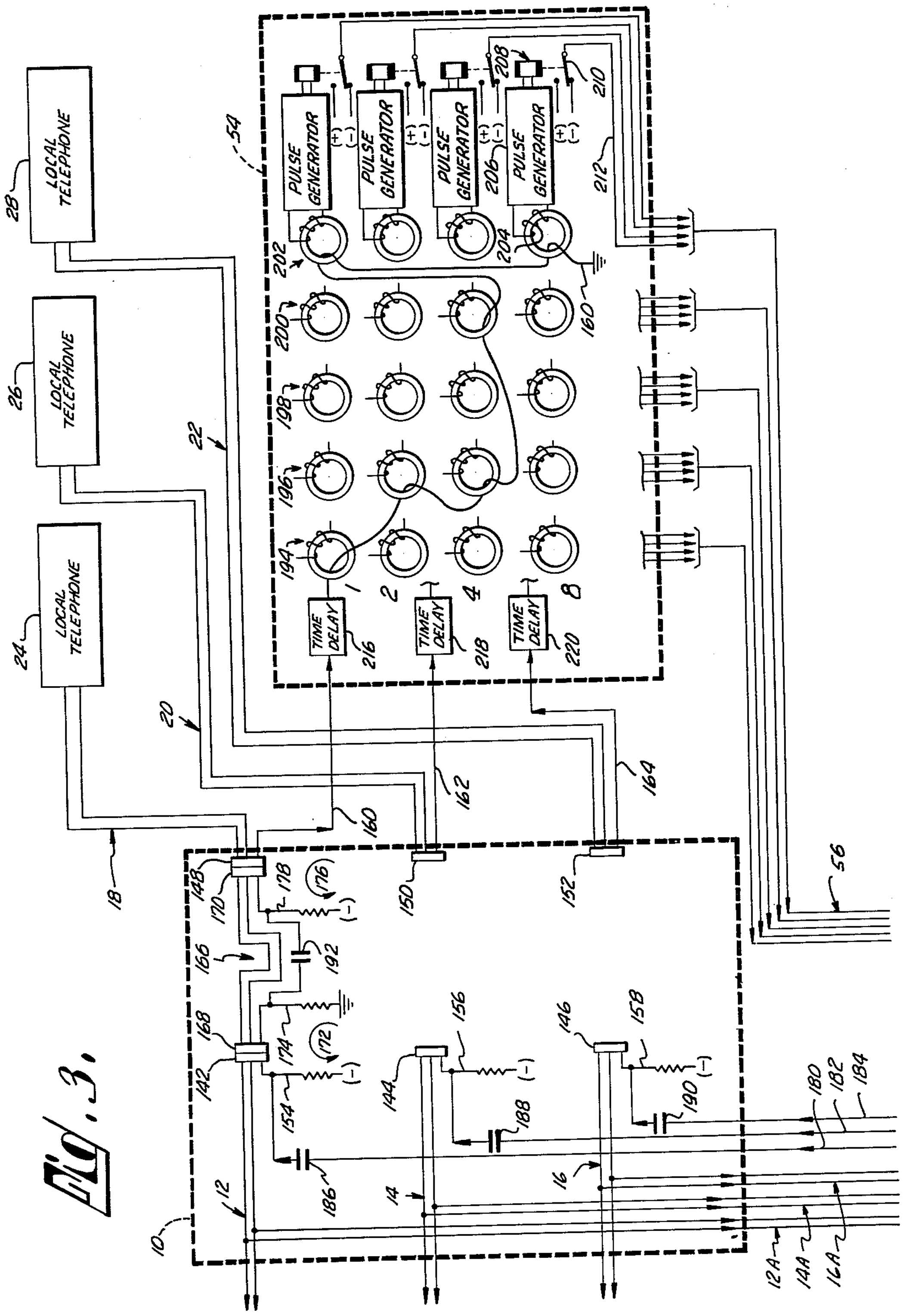
FIG. 3 is a schematic drawing in greater detail of the PBX and the subscriber identification translator of FIG. 1.

Referring now to FIG. 3, the PBX trunk lines 12, 14, 16 terminate in the PBX 10 at first, second and third trunk jacks 142, 144, 146 respectively. The PBX subscriber lines 18, 20, 22 terminate at first, second and third subscriber jacks 148, 150, 152 respectively. In addition to the trunk lines, the trunk jacks have first, second and third control leads 154, 156, 158 respectively connected to them; and, in addition to the subscriber lines, the subscriber jacks have first, second and third control leads 160, 162, 164 respectively connected to them. Conventionally, the trunk jack control leads are supplied with negative battery voltage through a load, and the branch jack control leads are grounded.

When a call is initiated over one of the subscriber lines, the PBX operator makes a connection between this subscriber line and one of the trunk lines not presently in use. The connection is made manually by means of a cord set, such as the typical cord set 166, shown in a simplified schematic form, interconnecting the first subscriber jack 148 with the first trunk jack 142. This connection indicates that a telephone call, initiated from the local telephone 24 on the subscriber line 18, is being carried over the trunk line 12.

The cord set has a trunk plug 168 on one end, and a subscriber plug 170 on the other end. When the cord set is plugged in, this makes a wire to wire contact, or the equivalent, between the subscriber line and the trunk line. In addition, the trunk plug completes a trunk control circuit, as represented by the circular arrow 172, by connecting to the trunk jack control lead 154 a trunk plug control lead 174 which is grounded through a load. Likewise, the subscriber plug 170 completes a subscriber control circuit, as indicated by the circular arrow 176, by connecting to the subscriber jack control lead 160 a subscriber plug control lead 178 which is supplied with negative battery voltage through a load.

The connection of a trunk line to any subscriber line establishes a communication path which may be employed to trace out the particular telephone subscriber using the trunk line. By establishing a pulse path through the control circuits, which parallels the communication path, the use of the communication leads themselves for the tracing operation may be avoided. The pulse path is established by interconnecting the trunk plug control lead 174 and the subscriber plug control lead 178 with a condenser 192.

The call monitoring system is coupled to the PBX by three types of connections. First are the trunk line extensions 12A, 14A, 16A which interconnect the trunk lines 12, 14, 16 with the respective monitoring facilities 30, 32, 34. Second is a plurality of extension number interrogation leads 180, 182, 184 running from the scanning circuit 46 and severally connected through condensers 186, 188, 190 to the trunk jack control leads 154, 156, 158 respectively. Third, the subscriber jack control leads 160, 162, 164 are respectively threaded through the subscriber identification translator 54, before running to ground.

The result of the second and third type connections is that the interconnection of any subscriber jack with any trunk jack by means of the cord set will establish a signal path between the associated extension number interrogation lead and subscriber jack control lead by means of which the calling subscriber can be traced. Hence, with the cord set 166 connected as illustrated, energization of the extension number interrogation lead 180 will cause an electrical pulse to travel through the two condensers 186, 192, thence over the subscriber jack control 160 through the subscriber identification translator 54 to ground.

The PBX control circuits established by the cord set connection, such as the trunk control circuit 172 and the subscriber control circuit 176, are direct current circuits contained internally within the PBX for operating relays which actuate buzzers and lights to assist the PBX operator in monitoring her board. These control circuits are not materially affected by the added connections made through condensers. It must be appreciated however that in some PBX installations, the control circuits may vary in their construction to some extent from that illustrated in FIG. 3. Hence, in order to establish a pulse path through the control circuits, certain modifications in the control circuits may be required. Alternatively, filtering arrangements may be resorted to whereby the communication leads may be employed to establish a path.

Each monitoring facility constantly monitors the voltage levels on its own associated trunk line in order to sense and store the outside telephone number dialed, and to be instantly aware of the completion and conclusion of each call carried over the trunk line. This is accomplished by means of the first type of connection mentioned above, namely that involving the trunk line extensions 12A, 14, 16A.

Figure 11:
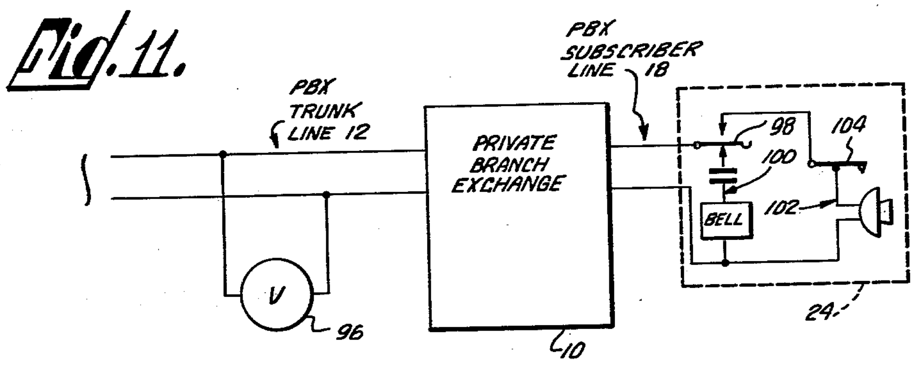
FIG. 11 is a schematic drawing of a telephone connected through a PBX to an outgoing trunk line, and illustrates a voltmeter by means of which a voltage measurement is being taken between the two wires of the trunk line.
Figure 12:
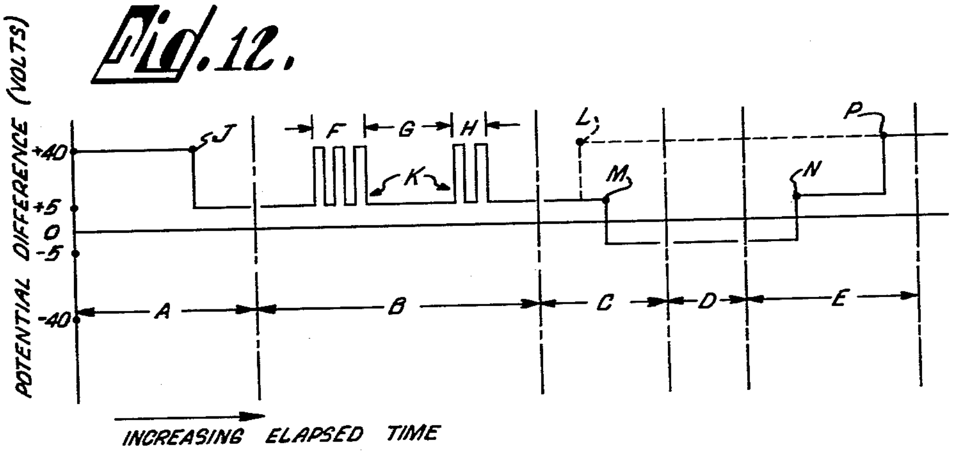
FIG. 12 is a voltage diagram illustrating the voltage variations detected by the voltmeter of FIG. 11, when a call is placed from the telephone over the trunk line.
Figure 13:
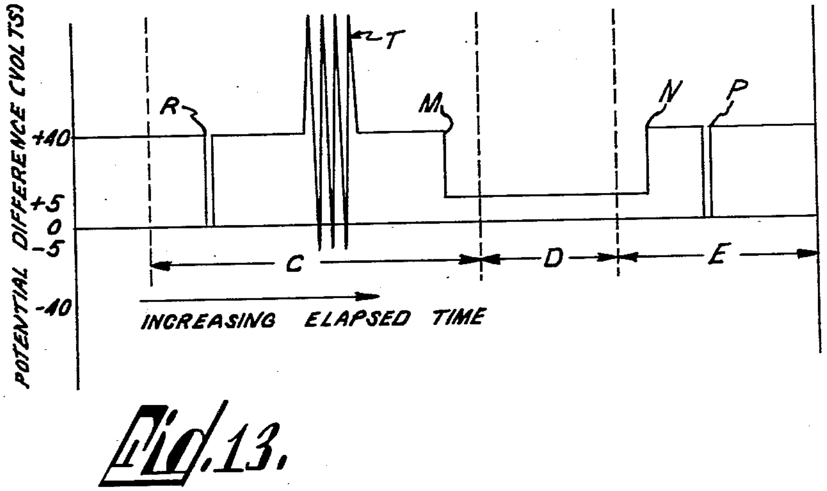
FIG. 13 is a voltage diagram illustrating the voltage variations detected by the voltmeter of FIG. 11 when the trunk line carries an incoming call to the telephone.

FIGS. 12 and 13 illustrate typical voltage changes that might be expected to occur on a trunk line at the calling party's end and at the called party's end respectively, during the course of a telephone call. These simplified voltage diagrams are derived as illustrated in FIG. 11.

Assuming for the moment in FIG. 11 that a call is to be placed from the subscriber telephone 24 through the PBX 10 and out over the first trunk line 12, a recording voltmeter 96 connected across the two wires comprising the trunk line would ordinarily record the potential difference between the pair of wires in accordance with the voltage diagram shown in FIG. 12.

As can be seen in FIG. 11, the telephone has a receiver switch 98 which, when the receiver is down, keeps the PBX subscriber line 18 closed through a ringing circuit 100. When the receiver is lifted from its cradle, the receiver switch breaks contact with the ringing circuit and makes contact with a communication circuit 102, thereby closing a low impedance direct current path across the subscriber line. The communication circuit serially includes a dial switch 104 which is operated by the dial on the telephone to momentarily interrupt the direct current path afforded by the communication circuit a number of times in accordance with the number dialed. When a number is dialed, the appropriate number of interruptions is made at a rate of approximately ten interruptions per second.

Going now to FIG. 12, the significant variations in the potential difference across the trunk line 12 are seen as a function of time over the course of a telephone call placed from the local telephone 24.

A first period of time A exists during which a connection will be made between the subscriber line 18 and the trunk line 12. Before this connection is made, the trunk line will be an open circuit, carrying a direct current voltage across its two wires of about 40 volts supplied from the nearest central office exchange of the telephone company. After the calling party lifts his receiver from its cradle, an instant J will occur at which connection is made between the trunk line and the subscriber line, thereby closing a low impedance path between the trunk line wires through the communication circuit 102 of the telephone. Hence, at the instant J when the connection is made, the voltage across the trunk line will drop from 40 to about 5 volts.

A second interval of time B exists during which the calling party will dial the outside telephone number desired. When a number is dialed, the dial interrupter switch 104 in the telephone will open the direct current communication circuit a number of times in accordance with the number dialed, and at a rate of about ten interruptions per second. Each time the dial interrupter-switch interrupts this direct current circuit, the trunk line reverts to an open circuit with its supplied voltage of 40 volts. This results in dial pulses K.

Within the dialing period B there will be sub-periods. Thus, where numbers 3 and 2 are consecutively dialed, there will be a sub-period of time F of about three-tenths seconds during which three dial pulses are produced. A next sub-period G will occur before the next number can be dialed. Finally, a period H of about two-tenths seconds will occur, during which two dial pulses will be produced. All telephone dials are arranged so that the period G between successive dial pulse groups F and H will be much longer than the period between successive dial pulses within a group. The reason for this will be seen later, in the explanation of the circuits in the monitoring facilities which detect the dial pulses.

A third interval C exists during which the called party will answer, or the calling party will first hang up, usually because he has made a mistake in dialing and wants to dial over again, or because he has waited a sufficient length of time to lead him to believe that the called party is not going to answer.

If for any reason the calling party hangs up before the called party answers, the voltage across the trunk line will return from 5 to 40 volts at the instant L when he hangs up, because this opens the trunk line circuit by depressing the receiver switch 98 in the telephone. Immediately following this event, the subscriber line and trunk line will be disconnected from one another, leaving the trunk line free for other calls.

If on the other hand the called party answers first, the polarity of the battery voltage on the trunk line will be reversed by a relay at the nearest central office exchange of the telephone company, causing the voltage across the trunk line to go from plus 5 volts to minus 5 volts, at the instant M when the called party lifts his receiver from its cradle to answer.

Usually, this polarity reversal is the call completion signal employed by the telephone company to set its message unit registers into operation. The process by which this signal is furnished is sometimes known as reverse polarity monitoring. Ordinarily, the signal is supplied to PABX installations and is not supplied to PBX installations, because the latter usually terminate on subscriber line equipment at the central office exchange of the telephone company. If this signal is not already supplied over the trunk line to the PBX or PABX, it can be supplied with the cooperation of the telephone company. As will be taken up later, resort may be had to other automatic methods of determining the instant of call completion, or if desired, the call completion signal may be provided manually by the PBX operator while yet retaining major automatic features of the present system.

A fourth period of time D exists during which the telephone conversation is consummated.

Finally, a fifth period of time E exists during which the called party and the calling party hang up. At the instant N when the called party hangs up, the battery voltage on the trunk line will be reversed again back to normal polarity. At the instant P when the calling party hangs up, the trunk line circuit will be open, causing it to resume its normal open circuit voltage of plus 40 volts.

It doesn't matter which party hangs up first. Thus, if the calling party hangs up first, this will open the trunk line circuit causing the telephone company's equipment to release the connection between the calling and called party, thereby effecting both a polarity reversal and a resumption by the trunk line of its open circuit voltage. The resumption of open circuit voltage on the trunk line indicates that the call is concluded.

Referring now to FIG. 13, a voltage diagram taken across the line at the called party's end is illustrated in simplified form, with time indications corresponding to those in FIG. 12. Initially the voltage level across the called party's line is at 40 volts. During the time interval C occurring after the calling party has dialed, a connection will be made to the called party's line by the telephone company's equipment, usually involving a changeover of batteries on the line as illustrated at R, putting control of the call under the calling party. Relatively high frequency ringing signals T are supplied at regular intervals until the called party answers. At the instant M when the called party picks up his hand set, he closes his low impedance communication circuit across his line, dropping the voltage from 40 to 5 volts. The conversation takes place during the following interval D. Subsequently, during the following interval E, the called party hangs up, disconnecting his communication circuit and returning his line to the open circuit voltage of 40 volts. The calling party hangs up at P, releasing the called party's line, and effecting a reversal of the original battery changeover.

As will be seen, the voltage variations on the called party's line would not necessarily interfere wtih the operation of the present system, so that the hotel guests may receive incoming calls over the same trunk lines monitored for outgoing calls. Usually, this is not necessary, and certain trunk lines are expressly allocated for outgoing calls only.

The minimum information necessary to describe any telephone call for accounting purposes is information identifying the calling party, the called party and the time duration of the call. As explained above, in a PBX the calling party may be traced through the control circuits, and the other information is present in the voltage variations on the trunk lines.

Appreciate however that the particular way in which connections are made between the call monitoring system and the telephone exchange will depend both upon the type of exchange involved and the practice of charging for calls. Thus, as illustrated by the monitoring connections in the PBX in FIG. 3, a hotel charges its guests only for outgoing calls and not for internal calls between rooms in the hotel. Therefore, by permanently associating a separate monitoring facility with each PBX trunk line reserved for outgoing calls, the problem in the hotel of charging for outgoing calls is solved with a minimum number of monitoring facilities, thereby holding equipment costs to a minimum. While a further reduction in the number of monitoring facilities might be made by employing searching switch type connections between the monitoring facilities and the PBX, analogous to line equipment operation in a central office exchange, it is questionable whether the advantage gained would be sufficient to justify it.

Figure 19:
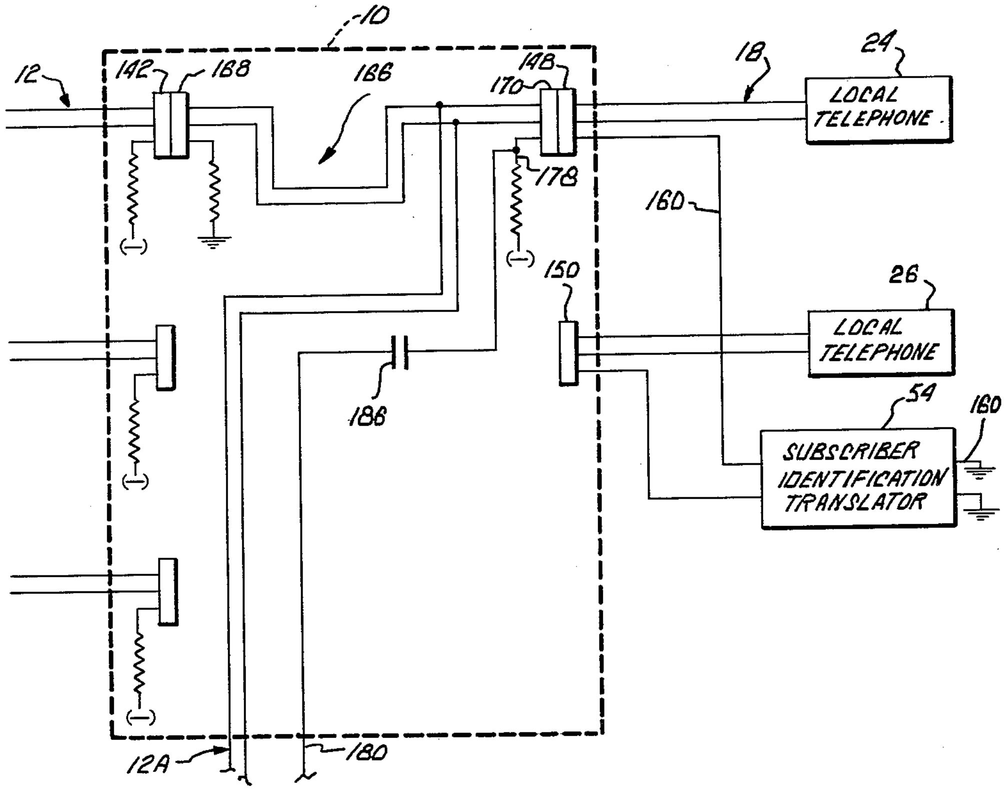
FIG. 19 is a schematic drawing of the PBX of FIG. 3, illustrating another way to connect the call monitoring system to the PBX; and, FIG. 20 is a schematic block diagram illustrating generally the call accounting system of the invention.

Referring to FIG. 19, another way of making connections between the call monitoring system and the PBX 10 is illustrated typically. Here, the trunk line extension 12A is connected directly to the communication leads of the cord set 166. The associated extension number interrogation lead 180 is coupled through its condenser 186 directly to the subscriber plug control lead 178 of the cord set. The condenser 192 added to the cord set in FIG. 3 is not necessary when the connections are made as shown in FIG. 19.

An examination of FIG. 3 in comparison with FIG. 19 will illustrate the operational differences. In FIG. 3, each monitoring facility and the associated extension number interrogation lead is permanently associated with a particular trunk line; whereas, in FIG. 19 each monitoring facility and associated extension number interrogation lead is associated with a particular cord set. In either instance, the signals available over the trunk line extension 12A will be the same, and in either case a signal path is established for tracing the identity of the calling subscriber. However, in FIG. 19 the cord set 166 may be connected not only between any subscriber line and trunk line, but also, for purposes of internal calls, between any two subscriber lines. For example, the trunk plug 168 would be connected to the subscriber jack 150 in FIG. 19 for an internal call between local telephone 24 and local telephone 26. The power would be supplied internally from the PBX, and the signals over the trunk line extension 12A would not necessarily be the same as those previously described. Of course, they could be made to be the same or equivalent in a fashion analogous to the way the telephone company does it in a central office exchange, so as to cause the present system to keep account of internal as well as outgoing calls. However, as indicated previously, in a PBX or for that matter in a PABX, there is usually no requirement for keeping an account of internal calls.

On the other hand, with connections made as shown in FIG. 19, internal calls would not necessarily interfere with outgoing calls so far as the operation of the call monitoring system is concerned because, as will become apparent later, the information accumulated in the monitoring facilities may be written over, and information accumulated in a monitoring facility is not transferred to the main storage facility unless a call completion signal has been received.

The situation existing in a PABX is analogous to that in the PBX as described. Fundamentally, the difference between the PBX and the PABX is that the call connections or their equivalent made in the PBX by means of cord sets are made in the PABX by automatic switches. Hence, the call monitoring system may be connected to the PABX in a fashion analogous to the way it is illustrated as being connected to a PBX in FIGS. 3 and 19.

Figure 17:
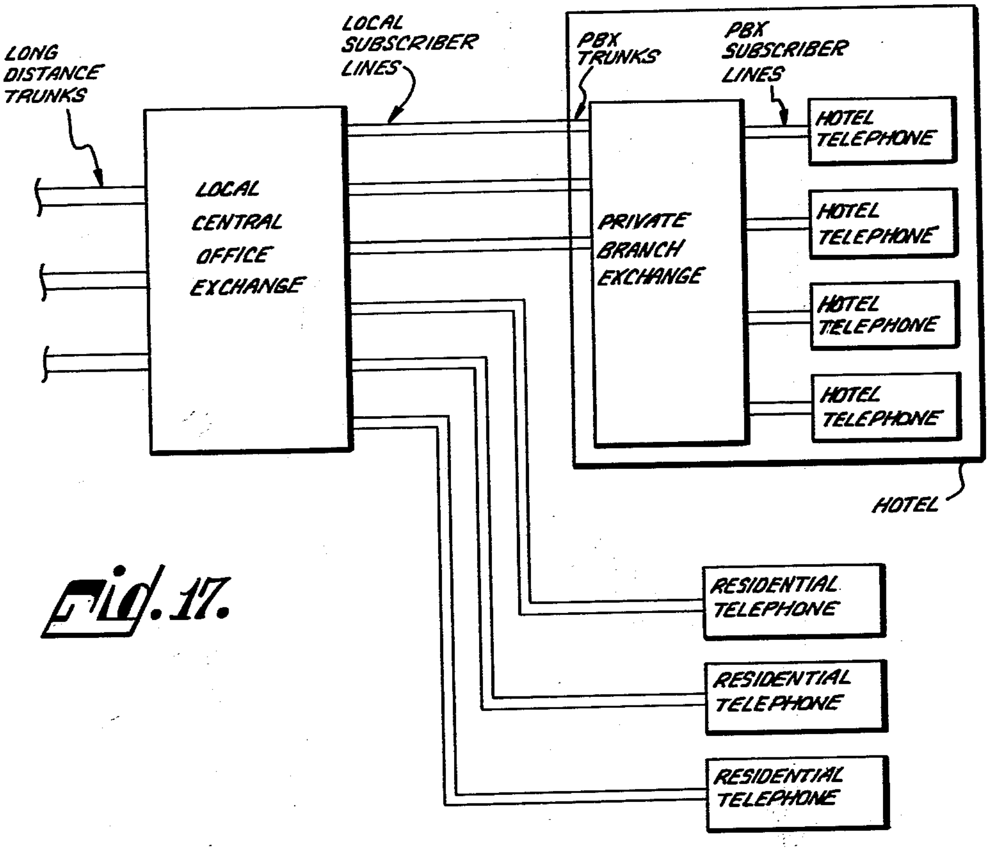
FIG. 17 is a schematic diagram illustrating the analogy between a central office type telephone exchange and a private telephone exchange.

The general relationship between a central office exchange, institutional telephones and residential telephones is illustrated in FIG. 17. As indicated, on one side of the central office exchange are a plurality of local subscriber lines, including those running to residential telephones as well as those running to a private branch exchange in a hotel. The subscriber lines running from the central office exchange to the private branch exchange in the hotel are PBX trunks.

The general situation in a central office exchange so far as call accounting practice is concerned is that the telephone company intends to make a charge for all calls initiated over one of the subscriber lines, whether the call is between subscribers or between a subscriber and a distant party over a long distance trunk line. Thus, what was referred to as internal calls in the above description of PBX operation and for which the hotel makes no charge, by analogy to the central office exchange situation constitutes by far the greater volume of calls for which a charge must be made. That is, in the central office exchange most calls for which a charge must be made will be calls from one subscriber to another. A smaller volume of calls will be made from local subscribers to distant parties over long distance trunk lines. In either case, just like in the PBX, the central office exchange must establish a connection either between two subscribers or between a subscriber and a long distance trunk line.

Therefore, in a PBX, a PABX or in a central office exchange, there are potentially a plurality of trunk type connections available. For example, in the PBX as illustrated in FIG. 3, each monitoring facility by virtue of the corresponding trunk line extension is associated with a particular trunk type connection available in the exchange. For trunk extension 12A, this trunk type connection may be defined as the connection made by means of any cord set between any subscriber line and the particular trunk line 12. Correspondingly in FIG. 19, the trunk type connection associated with a particular monitoring facility by trunk extension 12A may be defined as a connection made by means of the particular cord set 166 between any subscriber line and any trunk line, or for that matter between any two subscriber lines.

The same thing applies in a central office exchange, where connections are made between two subscribers or between a subscriber and a long distance trunk line by means of a switching train. In a typical central office exchange, one satisfactory scheme for connecting the call monitoring system would be to associate a monitoring facility with each first selector switch by coupling the trunk extension to the communication leads at the switch and by coupling the corresponding extension number interrogation lead through a condenser to the control lead at the switch. In this event, the trunk connection with which each monitoring facility is associated would be any connection between subscribers or between a subscriber and a distant party made through the associated first selector switch. The pulse path for tracing the calling subscriber would run back through the control circuit and through the line equipment for the calling subscriber to a subscriber identification translator. While central office type exchange equipment is too extensive to justify detailed explanation here, it will be apparent to those skilled in the telephone art that the mentioned connections in a central office exchange are analogous to those made in the PBX illustrated in FIGS. 3 and 19.

The reason that a monitoring facility is associated with a particular trunk connection (the term trunk denoting a common portion or circuit through which any of a large plurality of possible connections may be made), is to reduce the number of monitoring facilities. To provide a separate monitoring facility for each of the many subscriber lines would be prohibitive, whereas the number of different trunk type connections available are relatively few. There is however one simple connection required for each subscriber. These are the subscriber jack control leads 160, 162, 164 in FIG. 3. In a central office exchange, similar control lead connections would be made from the line equipment for each local subscriber.

THE MAIN STORAGE FACILITY

There are quite naturally a variety of storage devices which may be employed as the main storage facility required in the present system. Basically, the purpose of the main storage facility is to store a plurality of digitally encoded words in a fashion which best facilitates the operation of the call monitoring system, and the concurrent operation of the readout system. To this end, the main storage facility is preferably made up of a plurality of cyclically operating storage means, each having a capacity for serially storing a plurality of digitally encoded words.

Figure 5:
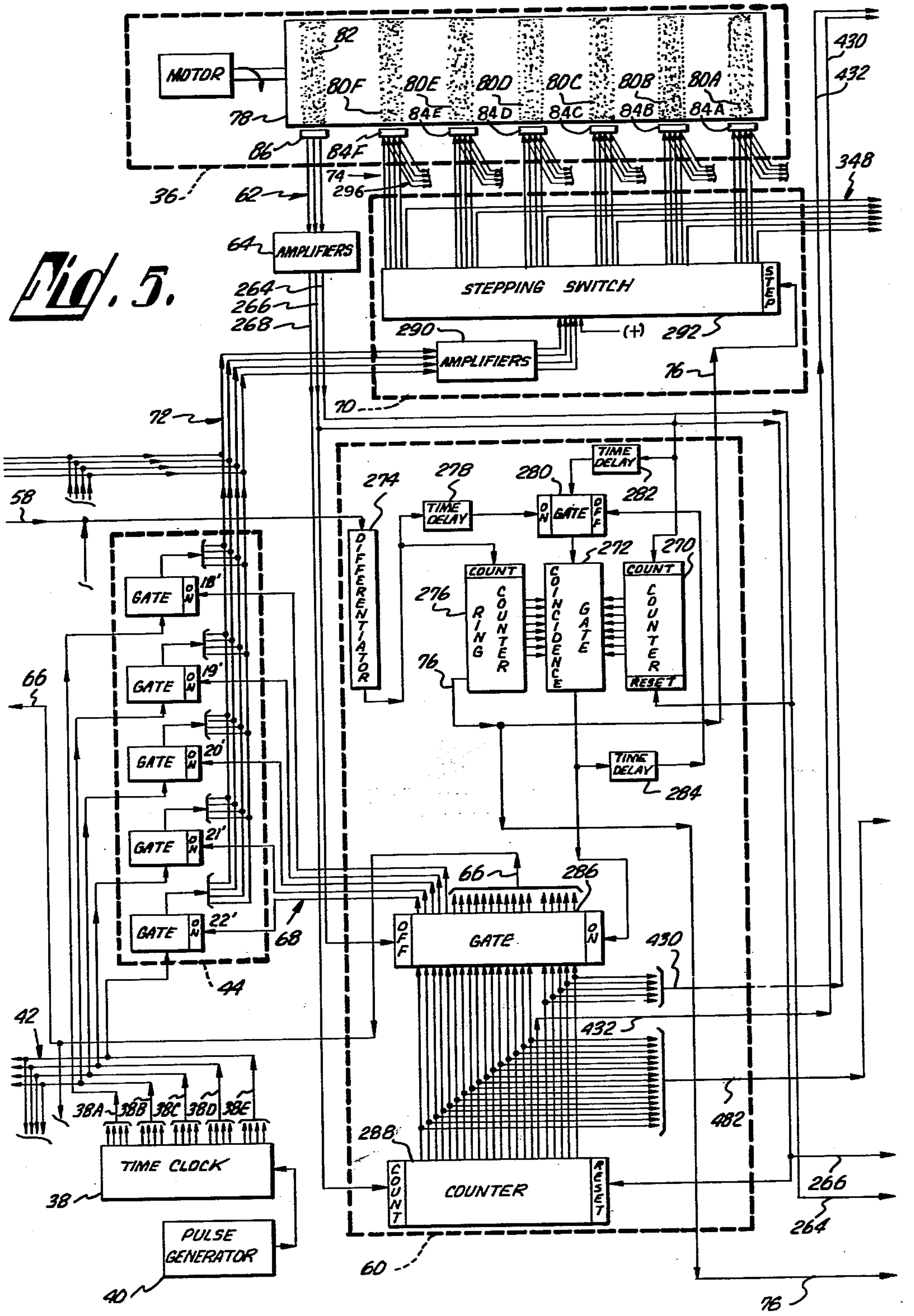
FIG. 5 is a schematic drawing in greater detail of the main storage facility, the recording circuit, the transfer control circuit, the conclusion time gating circuits, and other apparent components, all of FIG. 1.
Figure 9:
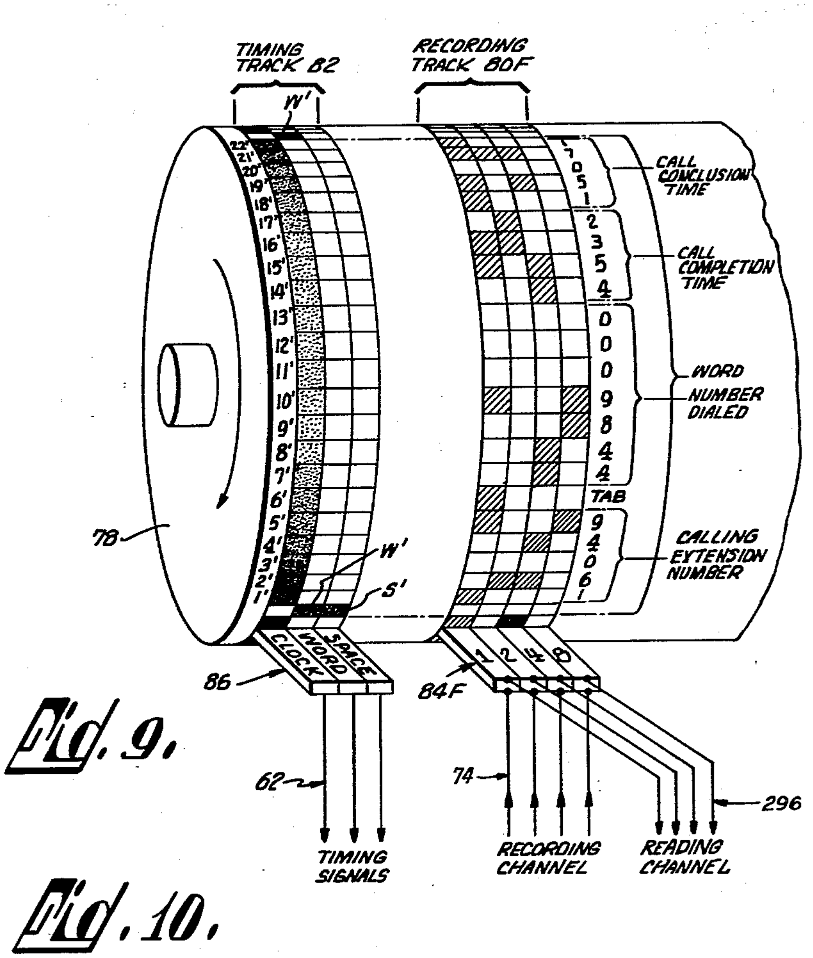
FIG. 9 is a schematic fragmentary drawing of a magnetic drum employed as a main storage facility, illustrating the pattern in which information is recorded on the drum and the corresponding time information on the drum.

The main type of main storage facility employed in the preferred embodiment of the invention is, as shown in FIGS. 5 and 9, a motor driven magnetic drum 78. The magnetic drum has a plurality of recording tracks 80A, 80B, 80C, 80D, 80E, 80F respectively. It also has a timing track 82. Information describing telephone calls is written on and recovered from the recording tracks by means of a corresponding plurality of sets of read-write heads 84A, 84B, 84C, 84D, 84E, 84F, respectively. Similarly, a set of heads 86 is associated with the timing track 82 for recovering timing signals indicative of the rotary position of the drum. Each recording track acts as a cyclically operating storage means, with the cyclic operation of all the recording tracks being synchronized by virtue of their location on the same drum.

As can be seen in FIG. 9, the timing track is comprised of three sub-tracks, a space track, a word track, and a clock track, as identified by the designation on the corresponding reading heads for these sub-tracks. A single magnetic mark S′ is permanently engraved on the surface of the drum in the space track. As this mark passes under the reading head for the space track once during each revolution of the drum, it will generate a space pulse. There are a plurality of similarly engraved marks W′ spaced equally around the periphery of the drum in the word track, thereby dividing the circumference of the drum into a corresponding plurality of segments (word storage locations) each sufficient to store the information describing a telephone call. As the word marks pass under the associated reading head, they generate word pulses. Between each pair of word marks around the drum, there are twenty-two clock marks 1′, 2′, 3′, . . . 20′, 21′, 22′ engraved in the clock track. The clock marks identify the digit storage locations within each word, and as they pass under the associated reading head, they generate clock pulses. To avoid confusion, the designations for the marks engraved in the timing track on the drum are also employed to designate the pulses resulting therefrom.

As shown typically in FIG. 9, each recording track has four sub-tracks respectively assigned the numerical significance of 1, 2, 4, 8. Information is recorded onto and read from each recording track by means of the set of read-write heads associated with the track. Thus, for the recording track 80F illustrated in detail, the associated set of read-write heads 84F is comprised of four separate heads, with the respective heads in the set designated by the numerical significance attached to the sub-track upon which the head operates, namely 1, 2, 4, 8 respectively in accordance with binary-decimal coding.

The storage pattern for a word describing a telephone call is shown schematically. Thus, a typical word might consist of the following:

First would be the word pulse. Whether the word pulse occurs before the word or within the word is academic. Actually, the word mark occupies one clock space in the timing track and the corresponding digit storage location in the recording track is not used. The word pulse is used for control purposes. Adjacent one of the word marks will be the space mark, occurring simultaneously.

Second, and coinciding with the next five succeeding clock spaces 1′, 2′, 3′, 4′, 5′ will be the extension number. The first five clock spaces are allocated for the extension number because the calls are later tabulated according to their origin by the readout portion of the system, and with the extension number from which the call originated passing under the read-write heads first, the decsion to tabulate each following digit in the word is carried out immediately without waiting for the next revolution of the drum. As shown, the room number recording is 16049, in accordance with binary-decimal coding.

Third, and coinciding with the next following clock space 6′, is the tab indication. If the word has been previously read out, a pulse will be recorded in the first sub-channel of the recording track, this pulse being called the tab pulse. It enables a decision as to whether or not the system will read out the word again.

Fourth, and coincident with the next seven clock spaces, 7′, 8′, 9′, 10′, 11′, 12′, 13′, is the number dialed. In this instance the number dialed was 4489000. For example, this could be Hillcrest 89000, the first two digits indicating the exchange.

Fifth, and coincident with the next four clock spaces 14′, 15′, 16′, 17′, is the time of day the call was completed in accordance with a twenty-four hour clock type of designation. Coincident with 14′, is the "hours," 15′ the "tens of minutes," 16′ the "minutes," and 17′ the "tens of seconds". As shown, this is either about 4:53 a.m. or 2:53 p.m. The ambiguity is resolved by the call conclusion time, which provides the "tens of hours" indication.

Sixth, and coincident with the last five clock spaces 18′, 19′, 20′, 21′, 22′, is the call conclusion time. Coincident with 18′ is the "tens of hours," 19′ the "hours," 20′ the "tens of minutes," 21′ the "minutes," and 22′ the "tens of seconds." As can be seen, in this instance, the time of day when the call was concluded was about 1507 hours, or in other words 3:07 p.m. Since the complete twenty-four hour clock indication is given in the call conclusion time, it can be seen that the call completion time was about 2:53 p.m. The tacit assumption here is that no telephone conversation is going to last twelve hours.

Therefore, the patterns for recording words onto the drum in the recording tracks is set by the permanently etched marks in the timing track. In a typical situation, there might be one hundred sixty word marks spaced around the periphery of the drum, defining one hundred sixty corresponding word storage locations in each recording track. While only six recording tracks are illustrated, it can be appreciated that there could be more, say twelve in all. If this were the case, the drum would have a storage capacity for one thousand nine hundred and twenty words, each describing a telephone call. In accordance with conventional practice, the drum would be rotated in a housing, by means of an induction motor, and at a speed of about fifteen revolutions per second. This would result in a clock pulse frequency of about fifty-five kilocycles per second, where there are one hundred sixty word pulses spaced around the drum periphery.

Figure 6:
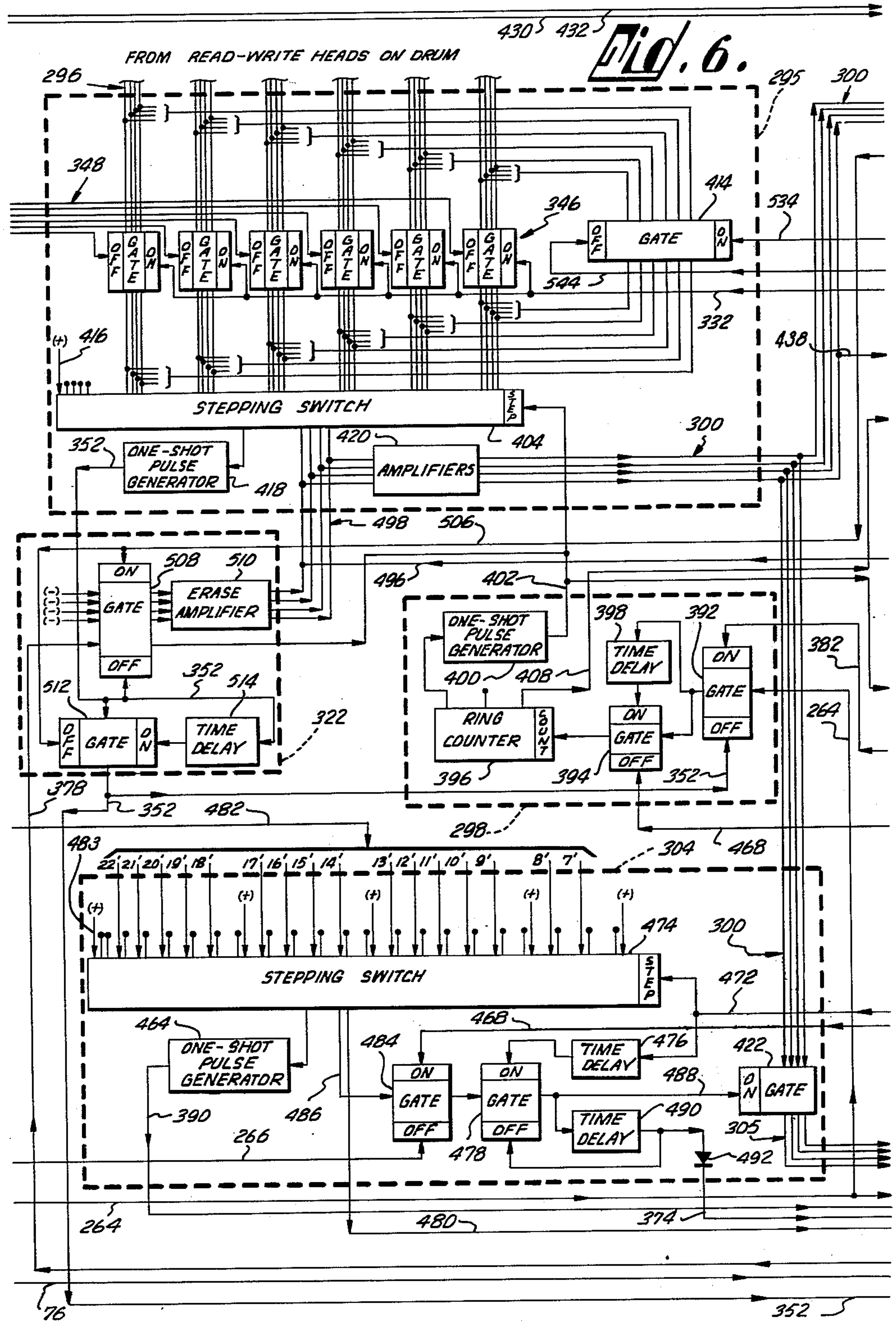
FIG. 6 is a detailed schematic drawing of the reading circuit, the erase circuit, the sub-routine control circuit, and the word recovery circuit, all of FIG. 2.

As can be seen in FIG. 9, and in FIGS. 5 and 6, the same heads are employed for both writing information onto the drum and reading information from the drum.

CALL MONITORING SYSTEM

The call monitoring system includes a plurality of monitoring facilities 30, 32, 34, a time clock 38, pulse generator 40, conclusion time gating circuits 44, a scanning circuit 46, a subscriber identification translator 54, a transfer control circuit 60, and a recording circuit 70. In general, the call monitoring system is coupled between the telephone exchange and the main storage facility, and its operation is to complete and transfer intact to the storage facility substantially contemporaneously with the execution of telephone calls digitially encoded words describing the calls. Each completed word describes a particular concluded telephone call, and has a known order of digits which identify the calling subscriber, the party called and the time duration of the call.

*The Monitoring Means*

Some of the components of the call monitoring system serve as a monitoring means for sensing, encoding and accumulating into a complete digital word during the progress of each call information identifying the calling subscriber, the called party, and the time duration of the call. The monitoring means includes the monitoring facilities 30, 32, 34, the scanning circuit 46, the subscriber identification translator 54, and the time clock 38 and pulse generator 40.

Figure 4:
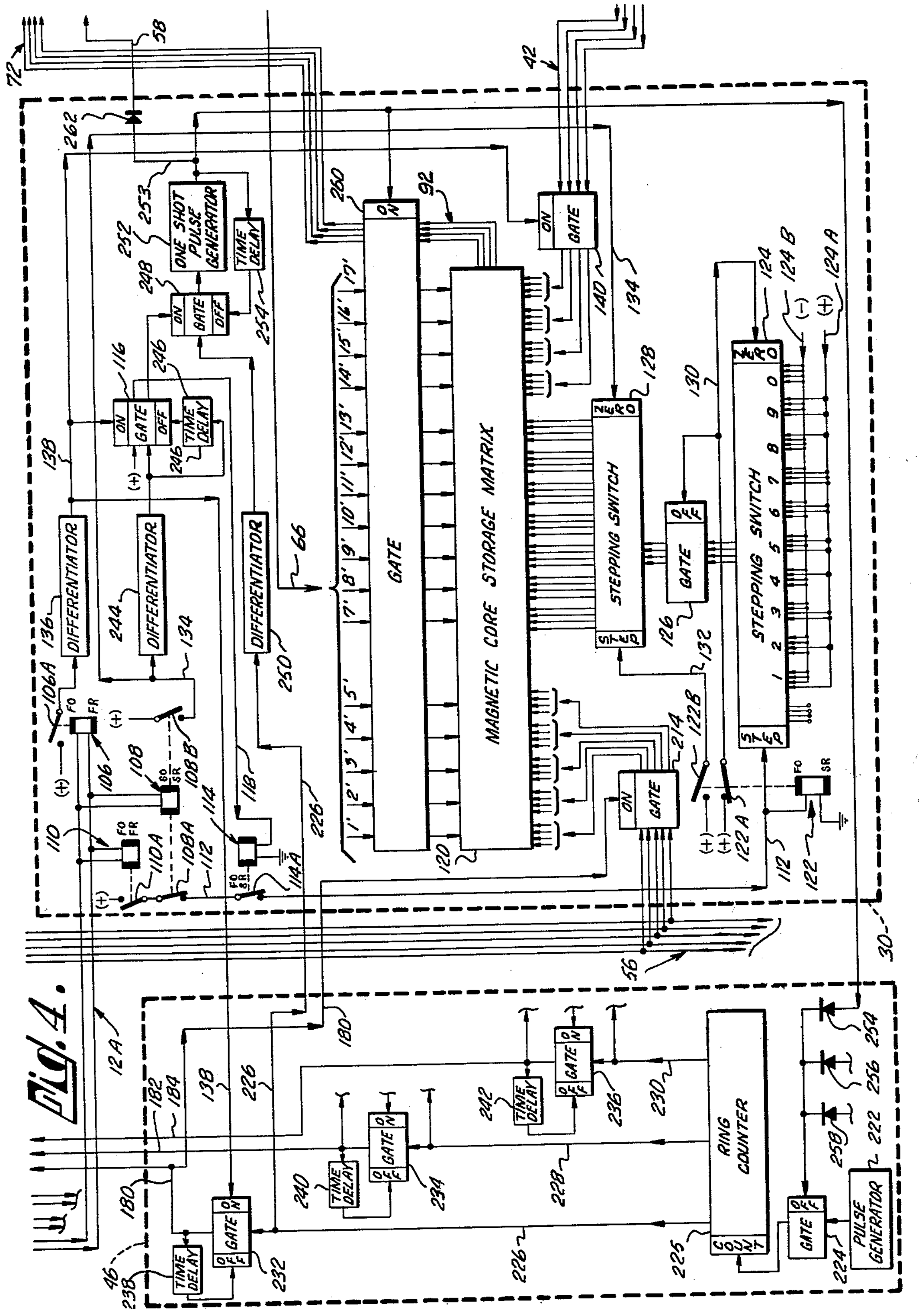
FIG. 4 is a detailed schematic drawing of a typical monitoring facility and of the scanning circuit of FIG. 1.

Referring now to FIG. 4, only one of the plurality of monitoring facilities in the monitoring means is shown in detail, thereby avoiding considerable duplication of circuitry. The particular monitoring facility chosen to illustrate the detailed circuitry and operation is the first monitoring facility 30 which is associated with the first trunk line 12, shown (FIG. 3) carrying a telephone call initiated over the first PBX subscriber line 18. This choice in presentation results in a number of the connections made to other monitoring facilities being broken off. For example, the connection between the scanning circuit 46 and the other monitoring facilities are broken; and the common interconnection 56 between the subscriber identification translator 54 and all monitoring facilities is broken off in the lower left center of FIG. 4.

Each monitoring facility has predetermined storage means for the digits of a word identifying the called party and at least some of the digits establishing the time duration of the call. Thus, the first monitoring facility 30, constructed in accordance with the preferred embodiment of the invention, includes the magnetic core storage matrix 120 having predetermined storage locations for storing sixteen decimal digits in binary-decimal coded form. These sixteen decimal digits comprise the five digits indicating the calling extension number, seven digits indicating the telephone number dialed, and four digits indicating the time of day when the call is completed. This information occurs at random times, and is accumulated in the core storage matrix as it occurs, so that it may be serially transferred as a unit, together with the call conclusion time, to the main storage facility when the call is concluded.

Figure 10:
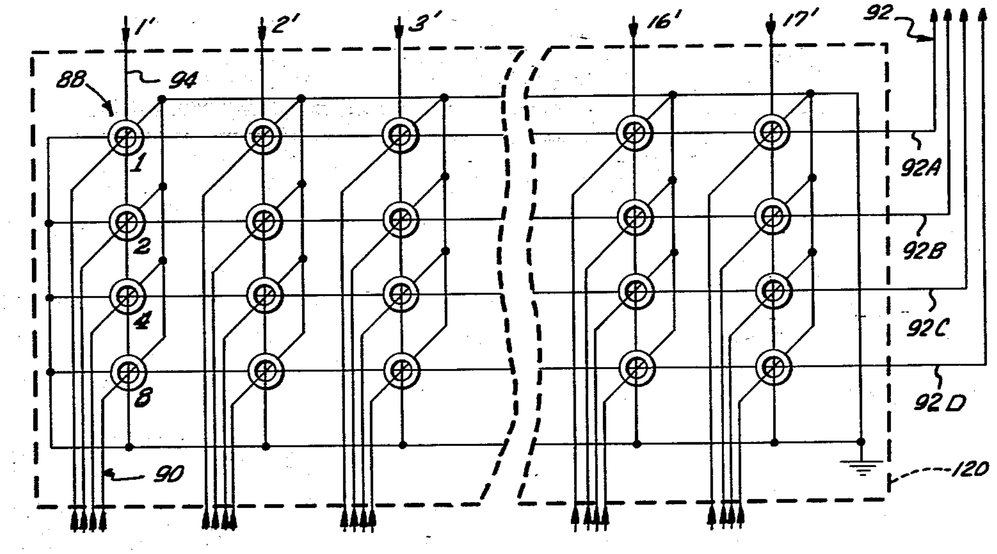
FIG. 10 is a fragmentary drawing of the circuit of the magnetic core storage register, the latter being a part of the typical monitoring facility illustrated in FIG. 4.

The internal circuit of the magnetic core storage matrix 120 is illustrated fragmentarily in FIG. 10. There are sixteen columns of four magnetic cores each. Each column of magnetic cores can store a decimal digit in binary-decimal coded form, in accordance with the direction of magnetization of each of the four magnetic cores in each column. The direction of magnetization of the cores in each column is determined by the last direction of current flow in the four leads comprising the input channel associated with the column.

For example, the core matrix 120 has a typical first column 88 in which there are four magnetic cores assigned a numerical significance of 1, 2, 4, 8 respectively, in acvoltage levels along the four leads in the input channel 90 is associated with the first column. The information carried on this channel is the first digit in the calling extension number, the representation being made in accordance with positive and negative levels.

The input channel 90 has four leads which are severally threaded through the respective magnetic cores in the first column, and then commonly run to ground. Hence, depending upon the polarity of the voltage levels last applied on the leads in the channel, the four magnetic cores will each be magnetized either in one direction or the other accordingly. Effectively then, the binary-decimal coded representation of the first digit in the extension number that appears as positive and negative voltage levels along the four leads in the input channel 90, is converted to an analogous binary-decimal coded representation of this same digit according to the direction of magnetization of the respective four cores in the first column of the core matrix.

While the voltage levels are transient, the resulting magnetization of the cores is permanent until altered. Thus, the entry of a subsequent digit in accordance with the binary-decimal coded voltage levels representing it, will remagnetize the cores accordingly in the appropriate directions. Of course, re-entry of the same digit in the same column will not alter the state of magnetization of the cores in that column.

The core matrix has a single output channel 92 comprised of four leads originating from ground and threaded through the matrix in accordance with rows of cores bearing the same numerical significance. Thus, the output channel 92 includes a first output lead 92A threaded through the first core in all columns, the first core in each instance bearing the numerical significance of 1. Likewise, the channel includes a second output lead 92B, a third output lead 92C, and a fourth output lead 92D, severally threaded through the second, third and fourth cores in all the columns, respectively.

Also, each column in the core matrix has a transfer lead threaded through its cores, and then grounded. Thus, in the first column 88, there is a transfer lead 94 which extends through all four magnetic cores in the column to ground. Transfer of information out of the core matrix over its output channel is effected by supplying pulses successively to the transfer leads.

A pulse applied to the transfer lead in a column will produce a reaction in the four cores which will depend upon their respective states of magnetization and which will induce an array of pulses in the leads of the output channel accordingly. Thus, the original positive and negative voltage levels on the first input channel 90 which produce the state of magnetization of the four magnetic cores in the first column, will be recreated as "pulses" and "lack of pulses" on the leads in the output channel 92 at the instant a transfer pulse is supplied over the first transfer lead 94.

As in indicated by the designations 1', 2', 3', . . . 16', 17', pulses for the transfer leads are derived from the clock pulses available from the main storage facility. As will be seen later, this is accomplished under the control of the transfer control circuit 60.

The monitoring facility 30 monitors its associated trunk line 12 over the trunk line extension 12A by means of three relays, a call completion relay 106, a call conclusion relay 108, and a dial pulse relay 110. These are polarized relays connected in parallel across the trunk line extension 12A. The relays have a high impedance so that, practically speaking, there is no significant interference with the voltage levels carried on the associated trunk line 12 before, during or after a telephone call.

The monitoring facility senses the dialed telephone number by means of the dial pulse relay 110. Accordingly, the function of the dial pulse relay is to repeat, over an output connection 112, the dial pulses appearing on the trunk line. The dial pulse relay is then a fast acting relay, both in its operating and releasing characteristics, as indicated by the designations FO, FR in FIG. 4. It has an armature-contact combination 110A connected on one side to provide battery voltage and connected on the other side to the dial pulse output connection 112. It repeats the dial pulses on the trunk line by operating and releasing this armature-contact combination. The dial pulse relay is set to respond to approximately plus 40 volts, which is assumed here as the dial pulse voltage level.

In addition to the dial pulses however, the dial relay will also respond to the changes in the voltage level on the trunk line at the instants J, L and P (FIG. 12) when a local telephone is initially connected to the trunk line and when the trunk line circuit is opened by the local party hanging up, because in these instances the voltage level is either rising to or falling from plus 40 volts. This causes false dial pulses to be repeated. Such false dial pulses are blocked through the cooperative action of the call conclusion relay 108, and an auxiliary relay 114.

The call conclusion relay is a slow acting relay, both in its operating and releasing characteristics, as indicated by the designations SO, SR in FIG. 4. It is set to be actuated by a plus 40 volt levels on the trunk line, however it will not respond to the dial pulses because of its slow operating characteristics. The call conclusion relay has a first armature-contact combination 108A and a second armature-contact combination 108B. The first armature-contact combination is normally closed, and is located serially in the dial pulse output connection 112 from the dial pulse relay. The call conclusion relay remains actuated so long as the open circuit of plus 40 volts is on the trunk line, thereby keeping its first armature-contact combination open. When the local telephone 24 is initially connected to the trunk line, causing the trunk line voltage to drop from 40 to 5 volts, the call conclusion relay releases its first armature-contact combination slowly, so that by the time it closes, the dial pulse relay being much faster will have already released its armature-contact combination. Hence, any false dial pulse indication is blocked.

If for any reason the calling party hangs up prior to the time the call is completed, returning the trunk line voltage to 40 volts, any false dial pulse indication resulting from the fact that the dial pulse relay will close its armature-contact combination before the call conclusion relay can open its first armature-contact combination, will not matter. The reason is that the calling party is not to be charged for the call, and the information, if any, contained in the core matrix 120 will not be transferred to the main storage facility; rather, it will be written over by subsequent information derived from the next telephone call placed over the trunk line.

However, the situation is different when the calling party hangs up after a call is completed, because in this case he is going to be charged with the call. This is taken care of by the operation of the auxiliary relay 114, which has a normally closed armature-contact combination 114A located serially in the dial pulse output connection 112 from the dial pulse relay. The auxiliary relay is controlled by a call conclusion gate 116, which turns power "on" and "off" to a lead 118 that supplies power to the relay. As will be seen later, the call conclusion gate is turned "on" by a call completion signal, and is turned "off" by a delayed call conclusion signal. Hence, when a call is completed, the dial pulse output connection 112 is broken by means of the armature-contact combination of the auxiliary relay. The auxiliary relay is of the slow release type, so that upon the conclusion of the call, it releases slowly enough to permit the call conclusion relay to open its first armature-contact combination 108A before the armature-contact combination of the auxiliary relay closes.

The regular dial pulses repeated over the dial pulse output connection are grouped, counted, translated to binary-decimal coded form, and routed to proper storage locations in the magnetic core storage matrix 120 through the cooperative action of a pulse grouping relay 122, a counting switch 124, an isolating gate 126, and a routing switch 128.

The pulse grouping relay is a fast acting and slow releasing type. The dial pulse output lead 112 runs to the winding of this relay. A single dial pulse will actuate the pulse grouping relay, and the time interval between successive dial pulses in the same group is not sufficient to permit the relay to release. However, the substantially longer time interval between successive dial pulse groups will be sufficient to permit the pulse grouping relay to release. Thus, referring to FIG. 12, the pulse grouping relay will assume its actuated state during the pulse group intervals F and H, and will resume its normal unactuated state during the interval G between successive dial pulse groups.

The pulse grouping relay has a first armature-contact combination 122A and a second armature-contact combination 122B. The first armature-contact combination is normally closed, and is opened when the relay is actuated. The second armature-contact combination is normally open, and is closed when the relay is actuated. As can be seen, both contacts are supplied with positive battery voltage.

The counting switch 124 is a four pole, eleven position stepping switch. That is, it has eleven sets of four contacts each, with a four pole wiper arm that may be stepped progressively through the sets of contacts. The last ten sets of contacts are permanently supplied with positive and negative battery voltage carried over two leads 124A, 124B respectively. The positive and negative battery voltage is supplied to the sets of contacts in accordance with a binary-decimal coded pattern, so that the four contacts in each set carry appropriate voltage levels representing a decimal digit in binary-decimal code, and so that taken successively the contact sets represent a regular progression through the decimal digits 1, 2, 3, 4, 5, 6, 7, 8, 9, 0 respectively. This can be verified by inspection.

Conventionally, the counting switch, as a stepping switch, has an internal zeroing arrangement which, in response to the application of a direct current voltage, will return the wiper arm to its rest position, in which position the zeroing arrangement breaks its own circuit. Thus, in the rest position, the internal zeroing arrangement is inoperative. The first set of contacts is left blank, so as to illustrate a resting or zero position for the four pole wiper arm. Also, the stepping switch has an internal stepping arrangement which is cocked upon the application of a direct voltage level, and which releases upon the cessation of the voltage level. It is the releasing action of the stepping arrangement which moves the wiper arm from one set of contacts to the next.

The output connection 112 which carries the dial pulses is connected to the step terminal of the counting switch. In addition, an output lead 130 from the first armature-contact combination 122A of the pulse grouping relay is connected to the zeroing terminal of the counting switch.

The output from the counting switch is taken from the four pole wiper arm, as indicated, and applied to the isolating gate 126.

The isolating gate is a normally "on" gate. The gate is turned "off" during the continuance of a direct current voltage over the lead 130 from the first armature-contact combination of the pulse grouping relay. When the gate is "off," the counting switch output is blocked, thereby isolating the counting switch from the routing switch 128.

The routing switch is a four pole, seven position stepping switch which receives the output from the isolating gate at its four pole wiper arm. The seven contact sets of the routing switch are connected as input channels to the magnetic core matrix 120.

As its name indicates, the routing switch serves to rout the counting switch output to different storage locations in the core matrix. Its seven output channels correspond to the seven digits required to represent the ordinary telephone number, the idea being to rout the successive digits to successive storage location in the magnetic core matrix as they occur on the counting switch output.

The routing switch has an internal stepping mechanism and an internal zeroing mechanism similar to that explained with respect to the counting switch. The main difference is that the resting or zero position for the wiper arm in the routing switch, which is the left-most contact set, is an active position. Thus, when the routing switch is zeroed, it returns to its first output channel whereupon the zeroing circuit is self-breaking.

The stepping signal for the routing switch is taken over a lead 132 from the second armature-contact combination of the pulse grouping relay. The zeroing signal for the routing switch is derived over a lead 134 supplied with positive battery voltage through the second armature-contact combination 108B of the call conclusion relay. This is a normally open armature-contact combination which closes when the call conclusion relay is actuated, so that the zeroing signal is supplied when there is open circuit voltage on the trunk line 12. Thus, the routing switch is zeroed any time the calling party hangs up.

The operation of the monitoring facility 30 to detect and store the outside telephone number dialed over its associated trunk line, is as follows:

When the local telephone 24 from which the call is placed is connected to the trunk line 12 associated with the monitoring facility, the immediate drop in voltage on the trunk line releases the call conclusion relay 108 thereby closing the dial pulse output connection 112 from the pulse grouping relay. When a number is dialed, a group of dial pulses corresponding in number is produced on the trunk line, and repeated by the dial pulse relay over the dial pulse output connection. The first of the repeated dial pulses in the group will actuate the pulse grouping relay 122 instantly, thereby opening the first armature-contact combination 122A and closing the second armature-contact combination 122B. This allows the isolating gate 126 to resume its normally "on" state, cuts off the zeroing signal to the counting switch, and cocks the stepping mechanism in the routing switch. Being a fast acting and slow releasing type, the pulse grouping relay will remain actuated during the continuation of the pulse group.

The counting switch is advanced by the repeated dial pulses a number of times corresponding to the number of dial pulses in the group, which is the number dialed. Assuming that the first number dialed is a 3, the counting switch will be advanced three times by the group of three repeated dial pulses, causing it to supply a binary-decimal coded output through the isolating gate and over the first channel of the routing switch to the corresponding column in the magnetic core matrix. As the counting switch initially advances through its contacts, its output will change. However, as previously explained, information in the magnetic core matrix may be written over. Hence, the final position arrived at by the counting switch determines the number stored.

For example, if the counting switch is stepped three times, the number stored in the core matrix will go from one to two to three. The counting switch will stay at its number three position until it is zeroed. This won't happen until the pulse grouping relay releases, and since the pulse grouping relay is of the slow releasing type, the counting switch will definitely arrive at its final position in response to the last repeated dial pulse in the group, before the pulse grouping relay releases. The releasing action of the pulse grouping relay closes its first armature-contact combination, thereby supplying power to turn "off" the isolating gate and to zero the counting switch. While the counting switch is stepping back to its rest position, its output is blocked by the isolating gate which is now in its "off" state, so that the last number entered into the magnetic core matrix for storage remains unaltered. At the same time, release of the pulse grouping relay opens its second armature-contact combination, thereby releasing the previously cocked stepping mechanism in the routing switch. This advances the routing switch from its first to its second channel. Hence, all original conditions are restored, except that the routing switch now rests on its second channel so that the next number dialed will be stored in a different column in the magnetic core matrix.

The process of counting and routing the numbers dialed repeats itself until the whole of the outside telephone number dialed is stored in the magnetic core matrix.

Later, when the calling party hangs up, the open circuit voltage on the trunk line is restored, thereby actuating the call conclusion relay 108 which in turn supplies a zeroing signal to the routing switch, causing it to step to its first position and stop. The routing switch is then in its initial condition and is prepared to rout the successive digits of a new telephone number correspondingly in the same order to the same successive storage columns in the magnetic core matrix 120.

The monitoring facility 30 senses the completion of a call over its associated trunk line by means of the call completion relay 106, which is polarized and set to respond to about minus five volts. During a telephone call, this will happen only one time, namely when the called party answers, shown at the instant M in FIG. 12. At the instant M, the polarity of the voltage on the trunk line 12 is reversed and remains reversed until either the calling or the called party hangs up. During this interval, the call completion relay 106 remains actuated.

Referring to FIG. 13, it can be seen that the voltage diagram includes no polarity reversal of significance. Hence, the call completion relay 106, being set to respond to a level of minus five volts, will never be actuated when the trunk line carries an incoming call. The result is that any information entered into the magnetic core matrix 120 for incoming calls will be written over by information derived from the next outgoing call on the trunk line 12. The same would apply for internal calls between PBX subscribers, were the monitoring connections made as shown in FIG. 19.

The call completion relay has a normally open armature-contact combination 106A, to which positive battery voltage is supplied. Actuation of the call completion relay closes its armature-contact combination, thereby supplying battery voltage to a differentiator 136. The rise in direct current voltage causes the differentiator to produce a positive going pulse, called the call completion pulse, over an output connection 138 which runs, among other places, to the "on" terminal of a call completion gate 140, contained internally within the intermediate storage facility. The call completion gate is normally "off," and is turned "on" momentarily by the call completion pulse for the duration of the pulse.

The output from the time clock 38 is applied constantly to the call completion gates in all monitoring facilities over a common connection 42, comprised of four sets of output leads from the time clock. Hence, when the call completion gate is momentarily turned "on," the time clock output is entered directly into the magnetic core matrix.

A twenty-four hour clock is employed, having five concurrently operating output channels 38A, 38B, 38C, 38D, 38E, which represent "tens of hours," "hours," "tens of minutes," "minutes," and "tens of seconds" respectively, in binary-decimal coded form. The "tens of hours" is not used in the call completion time, but is used in the call conclusion time and extrapolated as an assumption for the call completion time. Hence, the call completion time may be stored in four storage locations in the magnetic core matrix 120, and comprises four decimal digits respectively indicating the "hour," "tens of minutes," "minutes," and "tens of seconds." As can be seen, the output from the call completion gate 140 is in the form of four input channels to the magnetic core matrix, sufficient to carry this information. The call completion time is the time of day, and is not a time duration.

The output of the time clock changes every ten seconds. While no arrangement is illustrated, obviously there may be some provision for preventing the time clock output from changing at the exact instant when a call completion signal occurs. One way of doing this is to employ an electronic time clock wherein the transfer from one output reading to the next takes place during a very short interval of time, so small that the possibility of its occurrence during a call completion signal duration is extremely remote. To this end, the call completion signal from the differentiator 136 is of course very short in duration, and the call completion gate 140 may be an electronic gate.

While no circuit is shown, it is patently obvious that a simple switch at the PBX 10, manually actuated by the PBX operator, would serve as a substitute for the call completion relay 106 of FIG. 4.

Figure 18:
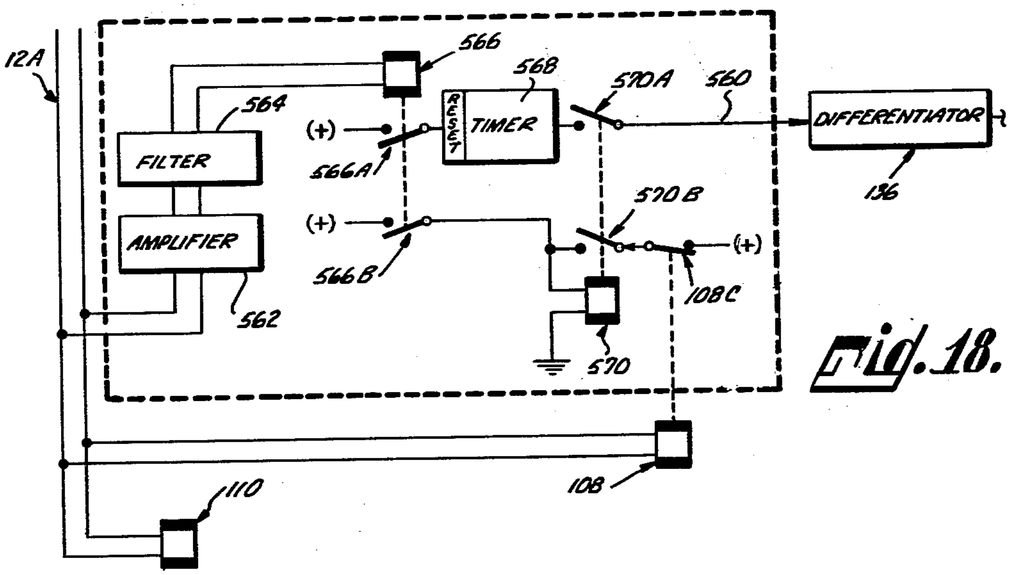
FIG. 18 is a circuit diagram illustrating an alternate method for automatically sensing the completion of a call as determined by the called party answering his telephone.

An alternate method for automatically providing a call completion signal, and one which does not depend upon the polarity reversal in the voltage on the trunk line, is shown in FIG. 18. The reference numerals in FIG. 18 are as much as possible identical with those in FIG. 4, the scheme being to enclose in the dotted enclosure a substitute for the call completion relay 106. Thus, the trunk line extension 12A is shown running to the dial pulse relay 110, the call conclusion relay 108, and to the dotted enclosure which contains the substitute for the call completion relay. The substituted elements in the dotted enclosure operate to provide a signal substantially immediately when the called party answers over a connection 560 to the differentiator 136, which is the same function performed by the call completion relay 106 in FIG. 4.

It is well known that, whether they be real or false (that is, the actual ringing signal, or a dummy ringing signal provided to the calling receiver by the telephone companying for the psychological benefit of the calling party), the telephone companies generally provide a ringing signal which can be heard by the calling party prior to the time the called party answers his telephone, and that this ringing signal ceases when the called party answers his telephone. The ringing signal is provided at regular intervals and has a characteristic frequency.

In FIG. 18, these ringing signals are sensed by an amplifier 562 coupled to the trunk extension 12A, separated out by a filter 564, and applied to actuate a tone relay 566. The tone relay 566 has two armature-contact combinations 566A, 566B, both of which are normally open. The contact of each armature-contact combination of the tone relay is supplied with positive battery voltage, and the armatures close on these contacts when the tone relay is actuated.

The first armature-contact combination of the tone relay is coupled to the reset terminal of a timer 568. The timer has a predetermined timing interval which is longer than the interval between ringing signals, and after timing off this interval provides a positive output voltage to the contact of a first armature-contact combination 570A of an auxiliary relay 570. This first armature-contact combination 570A is normally open and connects to the lead 560 running to the differentiator 136. The relay 570 has a second armature-contact combination 570B, which is also normally open.

There are two circuits for actuating the winding of the auxiliary relay 570. The first circuit is through the second armature-contact combination 566B of the tone relay 566. The second circuit is through the second armature-contact combination 570B of the relay itself, and serially includes a third armature-contact combination 108C provided for the call conclusion relay 108. The latter is normally closed and is coupled between the armature-contact combination 570B of the auxiliary relay and positive battery voltage.

The operation of the circuit in FIG. 18 may be explained as follows. The weak ringing signals heard at the calling party's end (not shown in FIG. 12) are amplified and filtered and employed to actuate the tone relay 566. This periodically resets the timer at intervals so frequent that the timer has insufficient time to time out its full interval to provide an output voltage. This also actuates the auxiliary relay 570, which has a slow operate and fast release characteristic. Since the call conclusion relay 108 is unactuated during this period, the first actuation of the auxiliary relay 570 by the tone relay 566 will close the circuit through the second armature-contact combination 570B of the auxiliary relay, thereby holding the auxiliary relay in its actuated condition. The first armature-contact combination 570A of the auxiliary relay is therefore closed, and should the timer 568 reach the end of its interval under this condition, a call completion signal will be provided over the connection 560 to the differentiator 136. If the called party answers, this is precisely what happens because the tone relay 566 will fail to reset the timer before its period expires since the ringing signals which actuate the tone relay cease.

If on the other hand the calling party hangs up prior to the time that the called party answers, the call conclusion relay 108 will actuate and open its third armature-contact combination 108C, thereby breaking the holding circuit for the auxiliary relay 570, causing the latter to release its first armature-contact combination 570A. This breaks the connection between the timer 568 and the differentiator 136. Hence, the fact that the tone relay 566 does not again reset the timer, thereby permitting the timer to finish its timing interval, is of no consequence. The third armature-contact combination 108C of the call conclusion relay has a fast operate, slow release characteristic.

During the course of each call, the calling subscriber identification is traced, encoded, and accumulated into the magnetic core storage matrix of the monitoring facility associated with the trunk line carrying the call. This involves the operation of the subscriber identification translator 54, the scanning circuit 46, the signal paths established through the control circuits in the PBX, and the monitoring facility.

Referring to FIG. 3, the subscriber identification translator 54 comprises five columns of transformers 194, 196, 198, 200, 202. Each column has four transformers assigned with a numerical significance of 1, 2, 4, 8 respectively, as shown typically for the first column 194, in accordance with the well-known binary-decimal code. Collectively, the five columns have the capacity to represent concurrently five decimal digits, or, in other words, any number between 00000 and 99999, inclusive.

Taking the bottom transformer in the fifth column 202 as typical, each transformer has a secondary winding 204 comprised of many turns of wire and connected to a pulse generator 206. The pulse generator operates a relay 208, which has an armature 210 that normally rests on its front contact to which negative battery voltage is supplied, as shown. When the relay is momentarily actuated by the pulse generator, the armature is moved to its back contact to which positive battery voltage is supplied. The output is taken directly from the armature over an output lead 212. This represents one binary bit of information. When the output lead is positive, it carries the assigned numerical significance which in this case is 8. When the output lead is negative, it carries the significance of 0.

All of the pulse generator and relay connections are shown typically in the fifth column. Carrying this over to all columns, the result is five output channels, one channel from each column, with four output leads in each output channel. Taken collectively, the five output channels constitute the common interconnection 56 between the subscriber identification translator and each of the several monitoring facilities.

The subscriber jack control lead associated with each subscriber line, and therefore with each local telephone, is threaded through selected transformers in the subscriber identification translator in a pattern calculated according to a binary-decimal coded representation of the extension number of its associated telephone, before making its usual connection to ground. The subscriber jack control lead acts then as a single turn primary for each transformer through which it is threaded. When a pulse arrives on the subscriber jack control lead, it energizes the secondary windings of all the transformers for which the control lead acts as a primary, thus triggering the pulse generators associated with these transformers, and thereby momentarily actuating the associated relays. The result is a momentary binary-decimal coded representation of five decimal digits, namely the local extension number, on the five output channels of the subscriber identification translator.

This is illustrated typically by subscriber jack control lead 160, which is associated with PBX subscriber line 18 and local telephone 24. By inspection, it can be seen that a pulse on this control lead will cause the calling extension number 16049 to appear on the output channels 56 of the translator. The length of time during which this number will continue to appear on the translator output is determined by the characteristics of the pulse generators and by the operating characteristics of the associated relays.

Referring to FIG. 4, the translator output 56 is concurrently applied to all monitoring facilities, each monitoring facility having an extension number gate which admits this information for storage only during the time the extension number interrogation lead associated with it and with its corresponding trunk line is energized by a tracing signal upon the arrival of the scanning circuit 46 at its connection with the monitoring facility.

Thus, the first monitoring facility 30 has an extension number gate 214, which is normally "off." The five channel output 56 from the subscriber identification translator is routed through the extension number gate 214 to five corresponding columns of the magnetic core storage matrix 120. The extension number interrogation lead 180 from the scanning circuit is connected to the "on" terminal of this gate. The arrival of the scanning circuit at its connection with the first monitoring facility will, under circumstances to be taken up later, result in a pulse on the extension number gate 214 in the first monitoring facility 30. At this time, the extension number gates in all other monitoring facilities are in their normal or "off" states. Hence, only the first monitoring facility will accept the output from the extension number translator at this time.

Referring again to the internal circuit of the subscriber identification translator, it can be seen that the subscriber jack control leads 160, 162, 164 run through time delays 216, 218, 220 respectively, before threading through the transformers. The reason for this can now be appreciated. The same search pulse from the scanning circuit both initiates a translator output and turns "on" the extension number gate in one of the monitoring facilities. The time delays, by delaying the pulse slightly in the translator, accurately permit the pulse holding the extension number gate in its "on" condition to expire, permitting the gate to revert to its "off" condition at an instant when the translator output produced by the delayed search pulse is still present and existing. This effectively prevents the extension number gate from being in its "on" state at the time when the translator reverts to its normal 00000 output state, which would of course alter the extension number entered into the magnetic core matrix of the monitoring facility.

Referring to FIG. 4, pulses on the extension number interrogation leads 180, 182, 184 are a result of the cooperative action of the scanning circuit and the associated monitoring facilities. The scanning circuit includes a pulse generator 222 which generates pulses at a rapid constant rate, say 100 per second. The output from the pulse generator runs through a normally "on" gate 224 to a ring counter 225. The function of the gate is to cause the ring counter to dwell on a particular connection when information is being transferred out of the associated monitoring facility, and will be taken up in detail later. As shown, the ring counter has three output leads 226, 228, 230, one for each monitoring facility. The ring counter energizes its output leads cyclically and in order, as it is driven by the pulse generator 222.

Inside the scanning circuit, the ring counter output leads 226, 228, 230 run to three gates 232, 234, 236 respectively, the output from these gates being the respective extension number interrogation leads 180, 182, 184. The gates are turned "on" by call completion signals from the associated monitoring facilities, and are turned "off" by their own output signals. For the latter purpose, the output from each gate is applied to the "off" terminal of the gate through an associated time delay 238, 240, 242 respectively. Taking the gate 232 associated with the first intermediate storage facility 30 as typical, this gate is turned "on" by the call completion signal supplied over the output connection 138 from the differentiator 136. Upon the next energization of the associated ring counter output lead 226, a pulse will emerge on the output from the gate, which output is the first extension number interrogation lead 180, running both to the PBX and to the monitoring facility 30. The same pulse is carried through the associated time delay 238, and employed to turn the gate "off." The next following energizations of the associated ring counter output lead 226 will not be effective to produce pulses on the corresponding extension number interrogation lead 180, at least not until another call is initiated over the corresponding trunk line 12 and completed so that the associated monitoring facility 30 furnishes another call completion signal to turn "on" the gate 232.

With the connections as illustrated in FIGS. 3 and 4, the extension number of the branch telephone 24, which is 16049, is supplied on the translator output 56 and through the extension number gate 214 to the first five storage locations in the magnetic core storage matrix 120, as a result of a pulse on the extension number interrogation lead 180.

In effect then, the ring counter in the scanning circuit is constantly searching for a monitoring facility which is ready to receive a local extension number from the extension number translator. When it finds one, a pulse results on the associated extension number interrogation lead, causing the translator output to be entered in the magnetic core storage matrix in the monitoring facility.

*The Transferring Means*

The operation of transferring information from the monitoring facilities to the cyclic main storage facility is comprised of a number of sub-operations. First, a monitoring facility senses the conclusion of a previously completed call, indicating that it is ready to transfer information to the main storage facility. Second, the scanning circuit arrives at its connection with this particular monitoring facility, whereupon a signal is sent to the transfer control circuit. Third, and while the scanning circuit is dwelling on its connection, the transfer control circuit determines the next sequential unused word storage location in the main storage facility and, as this storage location passes under the appropriate set of read-write heads, supplies transfer signals first to the monitoring facility involved, and then to the conclusion time gating circuits through which the call conclusion time is carried. These operations are taken up in detail with reference to FIGS. 4 and 5.

The monitoring facility 30 senses the instant when a previously completed call is concluded through the cooperative action of the call completion relay 106, the call conclusion relay 108 and the call conclusion gate 116. If and when a call is completed, the call completion relay will actuate its armature-contact combination 106A, thereby causing the differentiator 136 connected therewith to produce a positive going pulse over its output connection. This is the call completion pulse, and is applied to the "on" terminal of the call conclusion gate 116. Later, when the call is concluded by the local calling party hanging up, the call conclusion relay actuates its second armature-contact combination 108B, thereby supplying positive battery voltage to a differentiator 244 over the connection 134 therewith. This causes the differentiator to generate a positive going pulse which is applied as an input to the call conclusion gate 116 and is also applied through a time delay 246 to the "off" terminal of the call conclusion gate. The signal will appear on the output from the call conclusion gate if, and only if, the call conclusion gate has been previously turned "on" by a call completion signal.

The output from the call conclusion gate 116 is applied to turn "on" a transfer initiation gate 248. Technically, the output signal from the call conclusion gate to the "on" terminal of the transfer initiation gate is the call conclusion signal. While the call conclusion relay is actuated each time the local calling party hangs up, the signals from the differentiator 244 are blocked at the call conclusion gate except when the local calling party hangs up after the call is completed.

The function of the transfer initiation gate 248 is to indicate and store the fact that the completed call has been concluded, until the next arrival of the scanning circuit 46 at its connection with the monitoring facility.

The direct output from the ring counter 225 in the scanning circuit 46 is employed to scan the transfer initiation gates of the monitoring facilities for concluded calls. Accordingly, the ring counter output leads 226, 228, 230 are connected respectively to the corresponding monitoring facilities, as typified by the ring counter output lead 226 which is run directly to a differentiator 250 in the first monitoring facility 30. The output from the differentiator is applied as the input to the transfer initiation gate 248. Energization of this ring counter output lead 226 causes the differentiator 250 to produce a positive going pulse which will pass through the transfer initiation gate 248 to a one-shot pulse generator 252, but only if the transfer initiation gate has been turned "on." The one-shot pulse generator, in turn, generates a pulse over an output connection 253. The pulse is applied through a time delay 254 to the "off" terminal of the transfer initiation gate.

The pulse generated by the one-shot generator 252 is of a preset duration, and is called the transfer operation signal. The duration of the signal is sufficient to allow for the operation of the transfer control circuit 60 in cooperation with the recording circuit 70, to transfer the word describing the telephone call to the next sequential unused storage location in the cyclic main storage facility.

The transfer operation signal is applied to the "off" terminal of the normally "on" gate 224 in the scanning circuit, and holds the gate "off" during the transfer operation, so as to block driving pulses from the pulse generator 222 and cause the ring counter to dwell on its output lead 226, the energization of which resulted in the generation of this transfer operation signal. The leads carrying the transfer operation signals from the respective intermediate storage facilities are isolated from one another by diodes 254, 256, 258 respectively.

In the monitoring facility, the transfer operation signal from the one-shot pulse generator 252 is employed to turn "on" an isolating gate 260. As can be seen, the common interconnection 66 which carries the transfer signals from the transfer control circuit 60 is comprised of a plurality of leads which are coupled through this isolating gate to the magnetic core storage matrix 120. Also, the output channel 92 from the magnetic core storage matrix 120 is coupled through the isolating gate 260 to the common recording channel 72, which runs to the recording circuit 70. The isolating gate 260 is held "on" during the continuance of the transfer operation signal only. It is a normally "off" gate and normally isolates the monitoring facility from the transfer control circuit 60.

Finally, the transfer operation signal from the one-shot pulse generator 252 is supplied through an isolating diode 262 to the common interconnection 58 running between all monitoring facilities and the transfer control circuit 60. A signal over the common interconnection 58 initiates the action of the transfer control circuit. The entire resulting transfer operation will be completed during the continuance of the transfer operation signal.

The transfer control circuit 60 is constantly apprised of the position of the magnetic drum in the main storage facility by means of the space, word and clock pulses derived from the timing track on the drum and supplied over three output leads 264, 266, 268 respectively from the timing pulse amplifiers 64.

Word pulses supplied over the output lead 266 from the timing pulse amplifiers are employed in the transfer control circuit to drive a word pulse counter 270. Assuming that there are 160 word pulses generated for each revolution of the drum, thereby defining 160 word storage locations for each recording track on the drum, the word pulse counter 270 counts from 1 to 160, whereupon it is reset by a space pulse carried over the output lead 264 from the timing pulse amplifiers. The word pulse counter 270 has a straight binary output which is applied to one side of a coincidence gate 272. The count of the word pulse counter will always indicate the word storage location that is presently passing under the read-write heads on the drum. Being reset by each space pulse, the count is always a true representation of the rotational position of the drum.

The transfer operation signal received by the transfer control circuit 60 over its common interconnection 58 with all the monitoring facilities is applied to a differentiator 274, which generates a positive going pulse accordingly. The output from the differentiator is applied to a call counter 276, which is a ring counter having a straight binary output and capable of counting from 1 to 160 before recycling. Hence, each time a transfer operation signal is received by the transfer control circuit, the call counter 276 is advanced one count. In this fashion, the call counter 276 keeps track of the number of words recorded in each track on the drum as the track is filled. The output from the call counter 276 is applied to one side of the coincidence gate 272, for comparison with the count of the word pulse counter 270.

The output from the differentiator 274 resulting from a transfer operation signal is also applied through a time delay 278 to the "on" terminal of a word pulse gate 280. The time delay 278 gives the call counter time to advance its count before the word pulse gate 280 is turned "on." Word pulses are applied to the input of the word pulse gate 280 through a time delay 282, with the output from the word pulse gate being applied to the coincidence gate 272. The time delay 282 is a very short delay, affording the word pulse counter 270 time to advance its count.

After the transfer control circuit 60 receives a transfer operation signal, the coincidence gate 272 is barraged with slightly delayed word pulses through the word pulse gate 280. The coincidence gate 272 is a normally "off" gate, and is turned "on" only when the count in the call counter 276 and in the word pulse counter 270 is identical. This will happen at the instant the next sequential unused word storage location in the information track begins to pass under the read-write heads, because this is the significance of the number indicated on the output from the call counter, and the word pulse counter will arrive at this number on its output at this exact instant. The coincidence gate 272 is turned "on" at this instant, and it remains "on" only so long as the count in the two counters remains the same. The count in the word pulse counter 270 changes in response to the next following word pulse.

At the instant the coincidence gate 272 is turned "on," a word pulse gets through it. This will be the word pulse corresponding to the beginning of the word storage location in point, and will be the same word pulse which causes the count of the word pulse counter to coincide with that of the call counter, the only difference being that it is slightly delayed by the time delay 282 at the input to the word pulse gate 280. Hence, this slightly delayed word pulse appears on the output from the coincidence gate 272 before any of the digit storage locations within the word storage location in point pass under the read-write heads.

The slightly delayed word pulse on the output from the coincidence gate 272 is applied through an additional time delay 284 to turn "off" the word pulse gate 280, so that no other word pulses will get through. Also, it is applied directly to turn "on" a selecting gate 286. The selecting gate 286 is also turned "off" by each word pulse. However, the slightly delayed word pulse from the coincidence gate 272 will prevail to turn the selecting gate "on," because the slightly delayed word pulse still exists for a slight instant after the parent word pulse from which it is derived expires. Therefore, the next following word pulse will turn the selecting gate 286 "off" so that the gate is "on" during the interval when the word storage location in point is passing under the read-write heads, and only during this interval.

The input to the selecting gate 286 is taken from a clock pulse counter 288. The clock pulse counter is driven by clock pulses supplied over the output lead 268 from the timing pulse amplifiers 64, and is reset by each word pulse supplied over the output lead 266 from the amplifiers. The clock pulse counter 288 has twenty-two output leads, and it operates to effectively separate out the clock pulses corresponding to the successive digit storage locations within each word onto these different leads. Since it is driven by the clock pulses of which there are twenty-two between each pair of word pulses, and since it is reset by each word pulse, the particular output lead of the clock pulse counter 288 which is energized at any instant is indicative of the particular digit storage locations passing under the read-wire heads at that instant.

The clock pulses effectively separated out on the output leads from the clock pulse counter 288 will appear on the output from the selecting gate 286 only during the interval when the word storage location in point is passing under the read-write heads, because the selecting gate is "on" only during this interval. These separated clock pulses are referred to as transfer signals, since that is the operation which they synchronize with the operation of the drum.

The output leads from the selecting gate 286 are divided into two groups. The first group is the common interconnection 66 over which transfer pulses are applied to all monitoring facilities, and is comprised of sixteen leads which carry transfer signals corresponding to clock pulses 1′ to 5′ and 7′ to 17′ respectively. The second group is the connection 68 between the transfer control circuit 60 and the conclusion time gating circuits 44, and is comprised of five leads, severally carrying transfer signals corresponding to clock pulses 18′ to 22′ respectively.

In the monitoring facility 30, the individual leads comprising the common interconnection 66 with the transfer control circuit 60 are separated out and respectively identified by indicating the clock pulses which they carry. These leads are applied as an input to the isolating gate 260. The output from the isolating gate 260 is comprised of a plurality of leads, corresponding in number and referred to as transfer leads. The transfer leads run through the magnetic core storage matrix 120, in the fashion previously explained with reference to FIG. 10. Pulses on the successive transfer leads cause successive coded digits stored in the magnetic core storage matrix 120 to appear on the output channel 92 therefrom.

The output channel 92 from the magnetic core storage matrix 120 is carried through the isolating gate 260 before being connected to the common recording channel 72. This isolates it from the output channels of core matrices in other monitoring facilities.

The common recording channel 72 runs to the recording circuit 70 where it is connected to a set of recording amplifiers 290. The output from the amplifiers is applied to the wiper arm of a five-pole, six position stepping switch 292. This stepping switch is called the recording switch. Its six positions correspond to the six recording tracks on the drum, there being four contacts in each switch position connected to a corresponding set of read-write heads on the drum. The switch is the continuous cycle type; that is, starting from the right most position which is coupled to the set of read-write heads 84A, the recording switch responds to stepping signals and advances progressively through its successive positions until it arrives at its last position which is coupled to the last set of read-write heads 84F, whereupon the next stepping signal will step the switch to its first position again. Thus, the switch does not need to be zeroed. The fifth pole in the wiper arm of the recording switch, and the corresponding fifth contacts in each switch position, all relate to the operation of the readout portion of the system. This will be explained later.

The recording switch 292 is stepped by signals supplied over the connection 76 between the recording circuit and the transfer control circuit. This is a lead taken from the call counter 276. As previously noted, the call counter 276 is a ring counter; hence, it relies on an internal overflow pulse to set it back to the beginning of its cycle. When the call counter 276 reaches a count of 160, this indicates that the current information track on the drum is now filled, so that the next count of the call counter produces an overflow pulse thereby causing the counter to assume an output of one. The overflow pulse is carried on the lead 76, and steps the recording switch 292 in the recording circuit over its next position, so that subsequent information is recorded in the next unused recording track on the drum. Thus, each time a recording track on the drum is filled, and upon receipt of the next transfer operation signal, the transfer control circuit 60 causes the recording circuit to switch over to the next unused recording track on the drum in accordance with a predetermined succession.

Referring again to the monitoring facility 30, the transfer pulses 1′ to 5′ and 7′ to 17′ cause the successive digits in the core matrix 120 to appear on the common recording channel 72 in exact synchronism with the appearance of the corresponding digit storage locations under the read-write heads on the drum and within the word storage location presently under discussion. These successive coded digits are amplified by the recording amplifiers 290 and supplied through the recording switch 292, and through the set of read-write heads to which it is currently connected, directly onto the corresponding recording track on the drum. Effectively then, the clock pulses in the timing track on the drum transfer the successive digits to the corresponding digit storage locations in the recording track.

The immediately continuing transfer pulses 18′ to 22′ are applied to the conclusion time gating circuits 44. The gating circuits 44 contain five normally "off" gates, each of which is momentarily turned "on" by a coresponding one of the transfer signals as indicated. The five output channels from the time clock are applied to these gates, respectively. The respective outputs from the gates are coupled in parallel to the common recording channel 72. As the transfer pulses 18′ to 22′ are applied to these several gates respectively, the coded digits represented on the corresponding output channels from the time clock are successively supplied to the common recording channel 72, thereby supplying the call conclusion time through the recording circuit 70 and onto the drum. This completes the information describing the call.

The entire transfer operation, from the time the scanning circuit 46 arrives at its connection with the monitoring facility causing the one-shot pulse generator 252 to generate the transfer operation signal to the time that the last coded digit in the call conclusion time is recorded on the drum, may take place in a fraction of a second. During this time interval, the transfer operation signal from the one-shot pulse generator is continuing, holding the isolating gate 260 "on," and causing the scanning circuit 46 to dwell on its connection with the monitoring facility. Immediately after the last digit in the call conclusion time is transferred to the drum, the transfer operation signal will cease, permitting the scanning circuit to continue its scanning operation and permitting the isolating gate 260 in the monitoring facility to revert to its normally "off" state.

The effect on the transfer control circuit 60 of having just transferred a word to the drum is merely to advance the count of the call counter 276 by one count so that the next word will be transferred to the next sequential unused word storage location in the recording track. If the transfer operation signal arrives at a time when the recording track coupled to the recording circuit is filled, requiring the recording circuit to switch to the next unused track, the overflow pulse generated by the call counter resets the counter and advances the recording switch 292 one step. Otherwise, all original conditions of the transfer control circuit are restored. The word pulse gate 280 is returned to its "off" state by the original word pulse which gets through the coincidence gate, and the next following word pulse turns "off" the selecting gate 286.

THE READOUT SYSTEM

*The Readout Means*

Figure 7:
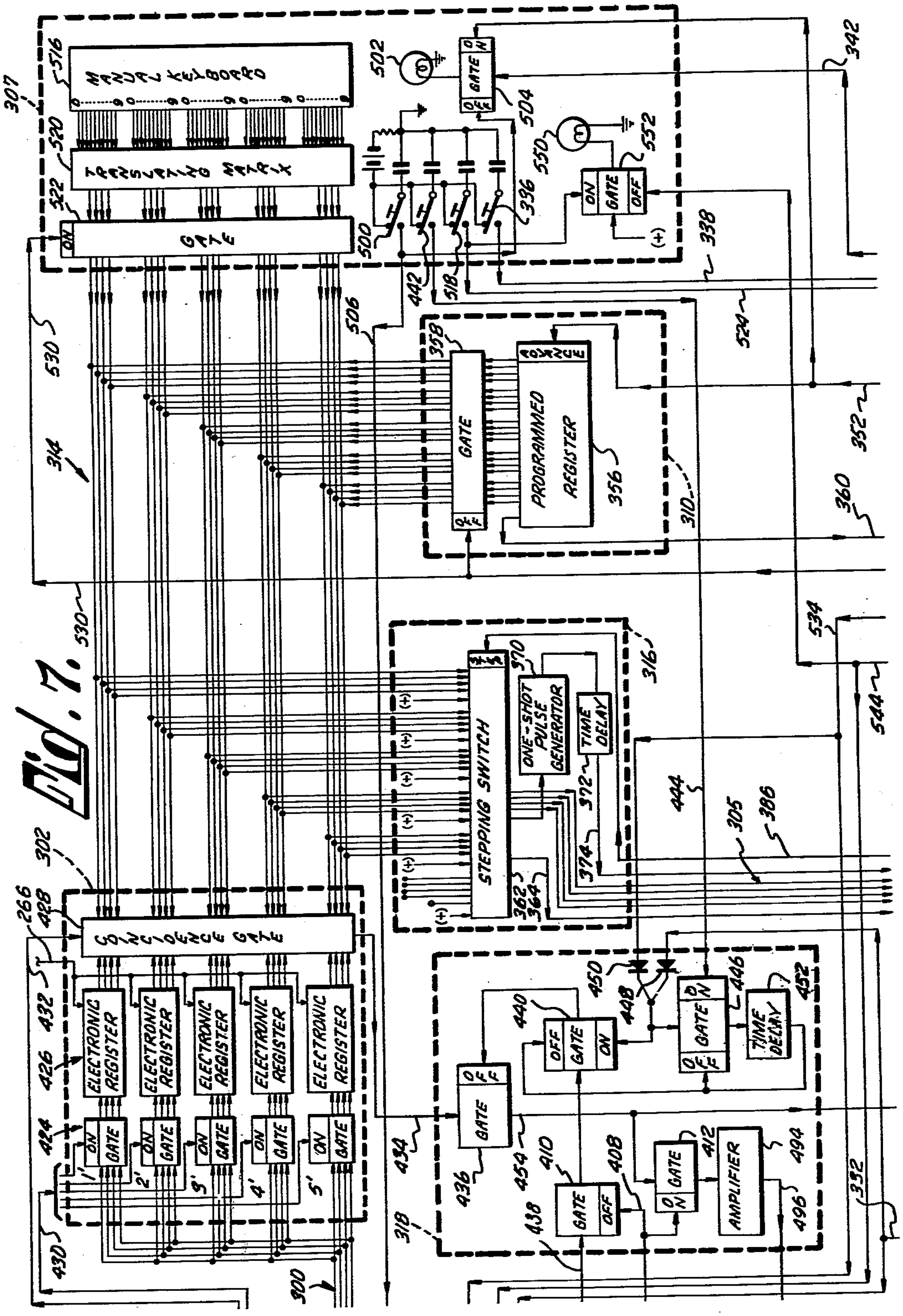
FIG. 7 is a schematic drawing in greater detail of the word identification circuit, the word filtering circuit, the extension number recovery circuit, the extension number programming circuit, and the control console, all of FIG. 2.
Figure 8:
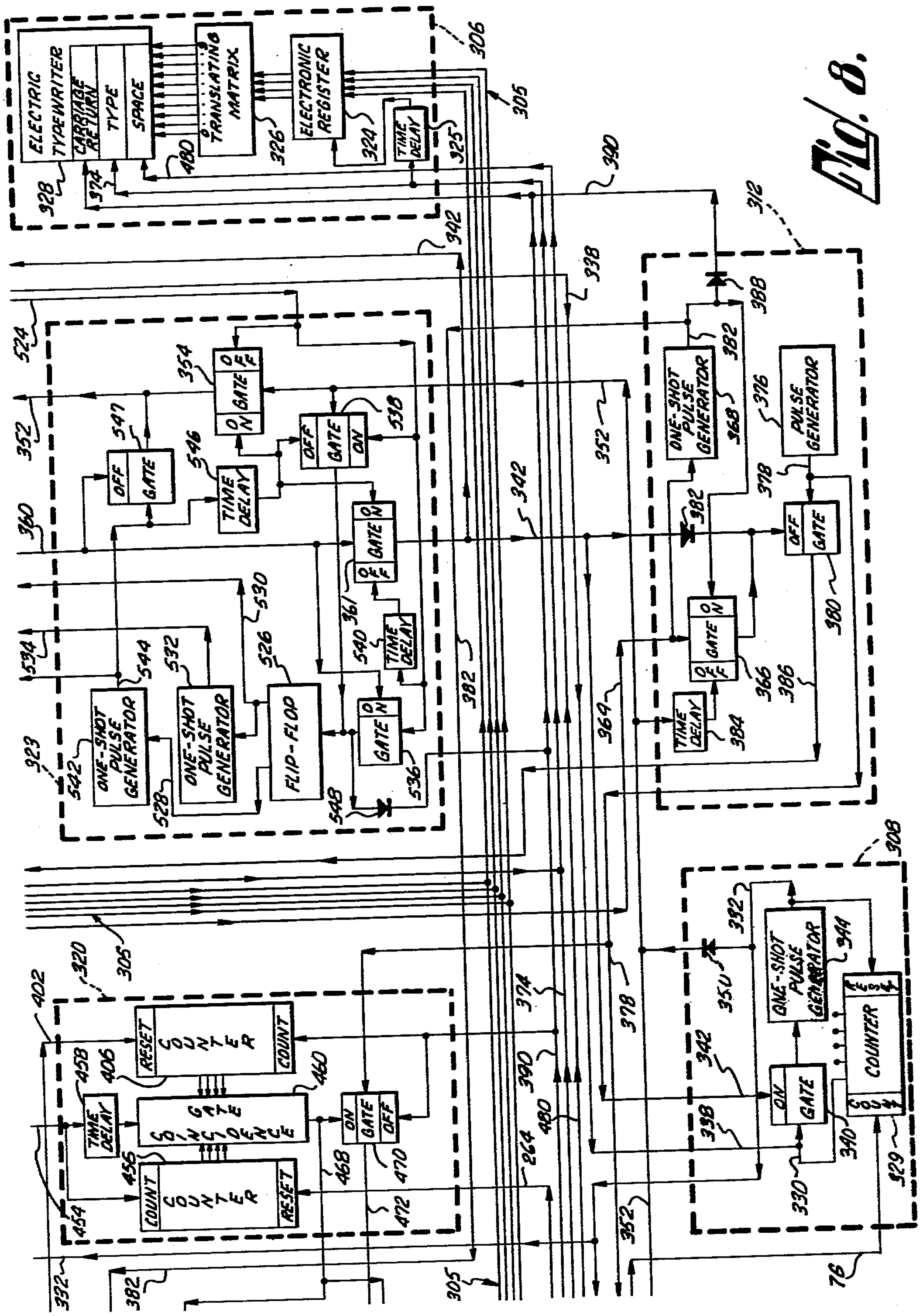
FIG. 8 is a detail schematic drawing of the word sequencing circuit, the programmed readout initiation circuit, the singular readout initiation circuit, the subcycle control circuit, and the decoding and printing circuit, all of FIG. 2.

The readout means illustrated in FIGS. 6, 7 and 8 operates on a fundamental cycle. This fundamental cycle is divided into two sub-cycles, the first of which involves the recovery of the calling extension number present on the common extension number channels 314. The second sub-cycle involves the search of the recording tracks on the magnetic drum 78 for all words bearing the extension number appearing on the common extension number channels 314, and is divided into two sub-routines that occur alternately, once for each successive recording track searched. The first sub-routine is the recovery of the call information groups from words bearing the particular extension number in the recording track. The second sub-routine is the brief recording operation wherein tab signals are recorded in the words recovered in the recording track, prior to going on to the next recording track. The fundamental cycle is accomplished by means of the reading circuit 295, the sub-routine control circuit 298, the word identification circuit 302, the word recovery circuit 304, the decoding and printing circuit 306, the sub-cycle control circuit 312, the word filtering circuit 318, and the word sequencing circuit 320.

The decoding and printing circuit 306, illustrated in FIG. 8, operates to reduce the call information directly to printed form. It includes an electronic register 324, a time delay 325, a translating matrix 326, and an electric typewriter 328 having three control leads, 390, 374, 480.

The electronic register 324 is capable of registering one digit at a time in binary-decimal coded form. Its registration is determined by the coded voltage levels applied to it over the recovery channel 305, either from the reading circuit 295 through the word recovery circuit 304, or from the extension number recovery circuit 316. The signal carried over control lead 374 causes the electric typewriter 328 to type the digit registered in the electronic register 324, and is also carried through the time delay 325 to clear the register for the entry of the next digit over the recovery channel 305.

The translating matrix 326 converts the coded output from the electronic register 324 to straight decimal form. It has ten output leads, respectively designated 0 . . . 9. The particular decimal digit registered in binary-decimal coded form by the electronic register determines which one of the ten output leads of the translating matrix is energized. These ten output leads are connected to the electric typewriter 328, so as to enable the typewriter to type the digit corresponding to the energized lead.

The electric typewriter 328 has three control terminals, a carriage return terminal, a type terminal, and a space terminal as indicated. A pulse supplied to any of these terminals over the corresponding control leads will produce the indicated action by the electric typewriter. Hence, a pulse supplied to the type terminal over control lead 374 will cause the typewriter to type the digit indicated by the energized lead from the translating matrix. A pulse supplied to the space terminal over control lead 480 will cause the typewriter to advance by one space without typing. A pulse supplied to the carriage return terminal over control lead 390 causes the typewriter to execute a carriage return and at the same time to advance the page to the next line.

In accordance with the particular embodiment of the system illustrated in the drawings, the decoding and printing circuit 306 operates to provide a printed record according to a predetermined format as illustrated in a record sheet portion 329 in FIG. 14. The record sheet illustrates the situation where a programmed readout operation in progress is interrupted by a singular readout operation, after which the programmed readout operation is continued. The portions of the record separately attributable to the programmed readout operation and the singular readout operation are indicated.

Beginning at the top of the record in the area of the programmed readout operation, four fundamental cycles of the readout means are illustrated. In the first fundamental cycle, and during the first sub-cycle thereof, the calling extension number 10830 was recovered and printed. During the same fundamental cycle, and in the second sub-cycle thereof, the search of the recording tracks of the magnetic drum 78 yielded one telephone call logged against this extension number which was recovered and printed. As can be seen, the extension number 10830 was printed on one line beginning at the left margin, whereupon a carriage return was executed, and the call information group was printed on the following line beginning in an indented position one space from the left margin. The call information group is 44 82842 8234 08452. This was a call made to Hillcrest 8–2842, beginning at about 8:23 a.m. and ending at about 8:45 a.m.

In the next three fundamental cycles in the programmed readout operation, the next three extension numbers in the program 10831, 10832, and 10833 were recovered and printed out on successive lines. Evidently, there were no calls chargeable to these extension numbers found in the searches made of the recording tracks on magnetic drum.

Sometime during the fundamental cycle pertaining to extension number 10833, a singular readout operation for extension number 16049 was requested. The singular readout operation was initiated at the end of this fundamental cycle.

The initiation of the singular readout operation caused the typewriter to execute an extra carriage return, thereby setting it apart from the preceding programmed readout operation. Thereupon, a fundamental cycle was started for the chosen extension number of interest. This extension number, 16049, was recovered and printed during the first sub-cycle, and the record reveals that the search of the main storage facility during the following second sub-cycle yielded two calls charged to this extension number. The call information groups for these two calls were recovered and printed on successive lines during the second sub-cycle. Taken in order, the call information groups indicate that these were calls made to Hillcrest 8–9000, beginning at about 2:53 p.m. and ending at about 3:07 p.m.; and to Hillcrest 8–9000, beginning at about 6:20 p.m. and ending at about 6:32 p.m. At the end of the fundamental cycle, an extra carriage return was called for thereby setting apart the singular readout operation from the following continuation of the programmed readout operation. The interrupted programmed readout operation was then immediately continued.

In continuing the interrupted programmed readout operation, the next extension number 10834 in the interrupted program was recovered and printed out, and, in the following search of the recording tracks on the magnetic drum, no calls were found chargeable to it. The programmed readout operation then continued, going on to the next extension number in the program which was 10835, and so on.

To facilitate the check-out procedure in hotels, it is probably desirable to have singular readout operations handled by a separate typewriter so that the resulting printed record portion for each singular readout operation may be separately torn off and presented to the guest. This is easily accomplished by the installation of a switch, such as a bar relay, for the ten output leads from the translating matrix 326 and the three typewriter control leads 390, 374, 480, the switch operating to connect these leads to the separate typewriter during a singular readout operation. A bar relay may be operated in this fashion by means of a direct current voltage supplied only during the continuation of a singular readout operation. As will be seen, such a voltage level is provided in the system.

Referring now to FIG. 6, access to the recording tracks on the magnetic drum 78 is provided by the reading circuit 295. The reading circuit includes a seven-position, four-pole stepping switch 404 which is of the continuous cycle type. The first six positions of this switch 404 are the active positions, and are connected respectively to the corresponding information channels 296 over two parallel paths. One path runs through a plurality of blocking gates 346, and is employed during programmed readout operations; and, the other path runs through a by-passing gate 414, and is employed only during singular readout operations. The seventh position on the stepping switch is indicated by the disconnected terminals, and is the rest position for the switch. The stepping switch has conventional off-normal contacts to which positive battery voltage is applied, as indicated at 416. When the stepping switch arrives at its seventh or rest position, the off-normal contacts close and continue this direct current voltage to a one-shot pulse generator 418. The pulse generated by the one-shot pulse generator 418 in the reading circuit is the recycling signal, with the output connection from the one-shot pulse generator being the start of what is herein referred to as the recycling path 352. The recycling signal marks the end of a fundamental cycle.

The wiper arm of the stepping switch 404 in the reading circuit is connected to a set of reading amplifiers 420. The output from these amplifiers is the reading circuit output channel 300.

As shown typically in FIG. 9, and as indicated in FIG. 6, the information channels 296 of the reading circuit 295 are connected to the same sets of read-write heads as are the recording channels 74 of the recording circuit 70. However, the stepping switch 404 in the reading circuit 295 (FIG. 6) advances independently of the stepping switch 292 in the recording circuit 70 (FIG. 5).

Referring now to FIGS. 7 and 8, when the readout system is set into its first sub-cycle of operation, the extension number appearing on the common extension number channels 314 is recovered digit by digit through the action of the extension number recovery circuit 316, under the control of the sub-cycle control circuit 312.

The extension number recovery circuit 316 includes a six-position, five-pole stepping switch 362, which is of the continuous cycle type, that is, the type that steps directly from its last to its first position. The first five positions of the stepping switch 362 are active positions, and are connected respectively to the common extension number channels 314. This requires four poles in each of the positions. The fifth pole in these five positions is supplied with positive battery voltage as shown. The sixth position of the stepping switch is illustrated by the set of five disconnected terminals, and is the rest position for the switch. The stepping switch has conventional off-normal contacts, which are set to close when the switch is in its rest position. As indicated at the extreme left, positive battery voltage is applied to one of the off-normal contacts, so that when the stepping switch arrives at its rest position, the closure of the off-normal contacts continues the positive battery voltage over an output connection 364, that runs to an auxiliary gate 366 and to a pulse generator 368, both in the sub-cycle control circuit. Four of the five poles of the wiper arm of the stepping switch 362 are coupled to the recovery channel 305 running to the electronic register 324 in the decoding and printing circuit 306. The fifth pole of the wiper arm is connected to a one-shot pulse generator 370, the output from which is applied through a time delay 372 and over the typewriter control lead 374 to the type terminal of the electric typewriter 328 in the decoding and printing circuit 306.

Looking now to the sub-cycle control circuit 312, a free running pulse generator 376 supplies pulses at a constant rate over a connection 378 running, among other places, to the input of a gate 380 called the first sub-cycle gate. The first sub-cycle gate is a normally "on" gate, held "off" by a direct current voltage, called the quiescent voltage level, supplied over a connection 342 and through a blocking diode 382. The first sub-cycle gate 380 is also held "off" by a direct current voltage supplied on the output connection 364 from the off-normal contacts of the stepping switch 362 in the extension number recovery circuit 316, but only when the auxiliary gate 366 in the sub-cycle control circuit 312 is "on." The auxiliary gate 366 is turned "on" when the stepping switch 362 in the extension number recovery circuit 316 arrives at its rest position, supplying the direct current voltage over the connection 364 to the one-shot pulse generator 368, which in turn generates a pulse over an output connection 382 that runs, among other places, to the "on" terminal of the auxiliary gate 366. The auxiliary gate is turned "off" by each signal supplied on the recycling path 352 through a time delay 384 to its "off" terminal.

Hence, the auxiliary gate 366 is turned "on" at the end of each first sub-cycle and is turned "off" at the end of each second sub-cycle. This has the effect of holding the first sub-cycle gate 380 "off" during the second sub-cycle, when the quiescent voltage level on connection 342 is not available for this purpose.

When a first sub-cycle is initiated, the quiescent voltage level over the connection 342 to the "off" terminal of the first sub-cycle gate 380 is extinguished. This permits the first sub-cycle gate to revert to its normally "on" condition since the auxiliary gate 366 is "off" at this time. Immediately, pulses from the pulse generator 376 are supplied through the first sub-cycle gate 380 and over an output connection 386 running to the stepping terminal of the stepping switch 362 in the extension number recovery circuit 316.

As each successive pulse is supplied through the first sub-cycle gate 380, the stepping switch 362 in the extension number recovery circuit 316 is advanced one step. The first pulse advances the stepping switch from its rest position to its first active position at the extreme right. This completes a connection between the first of the common extension number channels 314 and the recovery channel 305, thereby causing the first digit in the extension number to be set up in the electronic register 324 in the decoding and printing circuit, and translated by the translating matrix 326 to a corresponding energization of one of its ten output leads. At the same time, the advancement of the stepping switch to its first active position activates the one-shot pulse generator 370, which in turn generates a pulse that is slightly delayed by the time delay 372 and then supplied over the connection 374 to the type terminal of the electric typewriter, causing the typewriter to type the digit indicated on the output of the translating matrix. The time delay 372 insures the fact that the wiper arm of the stepping switch 362 is resting fully on its contacts before the signal is given to the electric typewriter to type the digit indicated. The signal over the connection 374 is also applied through the time delay 325 in the decoding and printing circuit to clear the register 324.

Successive pulses through the first sub-cycle gate 380 cause the stepping switch 362 to step through its five active positions, thereby causing the electric typewriter to type out the extension number appearing on the common extension number channels 314.

Upon the arrival of the stepping switch 362 at its rest position, the off-normal contacts close and provide a direct current voltage on the output connection 364 running to the input of the auxiliary gate 366 and to the one-shot pulse generator 368, both in the sub-cycle control circuit 312. The one-shot pulse generator 368 immediately generates a pulse over its output connection 382, which turns the auxiliary gate 366 "on," thereby causing a direct current voltage to be supplied over the output from the auxiliary gate to the "off" terminal of the first sub-cycle gate 380, turning the first sub-cycle gate "off." With the first sub-cycle gate "off," the stepping switch 362 receives no additional stepping pulses and hence remains in its rest position. The pulse generated by the one-shot pulse generator 368 in the sub-cycle control circuit 312 at the time the stepping switch 362 arrives at its rest position marks the end of the first sub-cycle. The output connection 382 from this one-shot pulse generator runs to a blocking diode 388, which in turn is coupled by the typewriter control lead 390 to the carriage return terminal of the electric typewriter 328. Hence, the electric typewriter executes a carriage return at the end of the first sub-cycle. The pulse from the one-shot pulse generator 368 is also employed to initiate the second sub-cycle.

The second sub-cycle is initiated by the arrival of the stepping switch 362 in the extension number recovery circuit 316 at its rest position, causing the one-shot pulse generator 368 in the sub-cycle control circuit 312 to generate a single pulse over its output connection 382. This output connection runs to the "on" terminal of a gate 392 in the sub-routine control circuit 298 (FIG. 6), called the second sub-cycle gate. The second sub-cycle gate 392 is "on" only during the second sub-cycle. It is turned "off" at the end of each fundamental cycle by the recycling signal supplied on the recycling path 352 and remains "off" until the initiation of a new second sub-cycle.

The second sub-cycle gate 392 receives the space pulses taken from the timing track 82 of the magnetic drum 78 (FIG. 5) and supplied over the connection 264 to the input of this gate. As previously indicated, one space pulse is generated for each revolution of the drum. The output from the second sub-cycle gate 392 is applied through a second gate 394, called the dwelling gate, to a ring counter 396, and also through a time delay 398 to the "on" terminal of the dwelling gate.

The ring counter 396 has three stages as indicated, through which it cycles in succession. The first stage of the ring counter is employed to actuate a one-shot pulse generator 400, which has an output connection 402 that runs to the stepping terminal of the stepping switch 404 in the reading circuit 395, and to the zero terminal of a counter 406, called the recovery counter, in the word sequencing circuit 320 (FIG. 8). The second stage of the ring counter 396 is used as a buffer, and is illustrated by the disconnected terminal. The third stage of the ring counter is coupled directly by a connection 408 to the "off" terminal of an isolating gate 410, and to the "on" terminal of a tab pulse transferring gate 412, both in the word filtering circuit 318 (FIG. 7).

The pulse generated by the one-shot pulse generator 400 when the ring counter 396 arrives at its first stage is the signal that initiates the first sub-routine in the second sub-cycle, and the direct current voltage supplied on the connection 408 when the ring counter arrives at its third stage both initiates and controls the duration of the second sub-routine in the second sub-cycle.

If the dwelling gate 394 is originally "off" when the second sub-cycle is initiated, then the first space pulse arriving on the output from the second sub-cycle gate 392 will not get through the dwelling gate, but will turn this gate "on" through the time delay 398. The following space pulse will get through the dwelling gate to advance the ring counter 396, as will the succeeding space pulses, until the ring counter arrives at its first stage, thereby causing the one-shot pulse generator 400 to supply a pulse over its output connection 402 to the stepping terminal of the stepping switch 404 in the reading circuit 295. Further advancement of the ring counter 396 will depend upon the action of the word sequencing circuit 320 in turning "off" the dwelling gate 394.

When the stepping switch 404 in the reading circuit 295 is advanced to its first active position by the pulse from the one-shot pulse generator 400, the information recorded in the first recording track 80A on the drum (corresponding to the first of the information channels 296) begins to appear on the reading circuit output channel 300, amplified by the reading amplifiers 420. The reading circuit output channel 300 runs to the input of a digit selecting gate 422 in the word recovery circuit 304, and also runs to the respective inputs of each of five extension number selecting gates 424 in the word identification circuit 302.

The word identification circuit 302 is a comparator means, and looks for words bearing the particular extension number set up on the common extension number channels 314. It produces a call identification signal as the sixth digit storage location in each word bearing the particular extension number passes under the read-write heads on the magnetic drum.

The extension number selecting gates 424 in the word identification circuit 302 are normally "off" gates. The outputs from these respective gates run to five corresponding electronic registers 426, each similar to the electronic register 324 in the decoding and printing circuit. The outputs from the respective registers are connected to one side of the coincidence gate 428. The common extension number channels 314 are connected to the other side of this coincidence gate. The output connection 266 from the timing pulse amplifier 64 (FIG. 5) is applied to each of the registers 426, so that the registers are cleared by each successive word pulse. The connection 266 is shown broken in FIG. 7 to avoid crowding the figure.

The purpose of the extension number selecting gates 424 is to enter the five digit extension number of each word appearing on the output channel 300 into the five respective electronic registers 426, so that a comparison can be made with the extension number appearing on the common extension number channels 314. It will be remembered that the extension number occupies the first five digit storage locations in each word, and that these digit storage locations correspond in point of time to the first five clock pulses 1′, 2′, 3′, 4′, 5′ separated out on the first five output leads from the clock pulse counter 288 in the transfer control circuit 60 (FIG. 5). The first five output leads from the clock pulse counter are connected respectively to the "on" terminals of the five respective extension number selecting gates 424 in the word identification circuit 302, as shown by the ganged connection 430 and by the indications 1′, 2′, 3′, 4′, 5′ adjacent the "on" terminals of these respective gates. Hence, these five gates are turned "on" in succession by the first five clock pulses 1′ to 5′ as the respective first five digits in each word pass under the read-write heads on the drum. This happens one hundred and sixty times for each revolution of the drum, since there are one hundred and sixty word storage locations around each recording track of the drum.

Therefore, in between successive space pulses which occur once each drum revolution, the extension number selecting gates 424 in the word identification circuit will be turned "on" serially one hundred and sixty times, thereby serially entering into the registers 426 and the five digit extension number from each of one hundred and sixty words successively (assuming that the recording track is filled with words). Each succeeding entry of five digits is preceded and followed by a word pulse on connection 266 which clears the registers 426.

The sixth output lead from the clock pulse counter in the transfer control circuit 60, as indicated at 432, is carried over as the input to the coincidence gate 428 in the word identification circuit, so that the clock pulses 6′ corresponding to the sixth digit storage location in each word are applied to the input of the coincidence gate. Each time the fifth clock pulse 5′ momentarily turns "on" the last of the extension number selecting gates 424, thereby completing the registration in the registers, the coincidence gate 428 is immediately turned "on" if the registered extension number matches that on the common channels 314. If the coincidence gate is turned "on" at this instant, then as the sixth digit storage location in the word from which the registered extension number was derived passes under the read-write heads, the sixth clock pulse 6′ applied at the input of the coincidence gate will arrive at the output connection 434 of this gate. The clock pulses 6′ arriving at the output of the coincidence gate are the call identification signals. The output connection 434 from the coincidence gate runs to a normally "on" gate 436, called the tab gate, in the word filtering circuit 318.

The function of the word filtering circuit 318 during the first sub-routine is to block call identification signals resulting from words previously read out in other readout operations. This it accomplishes by means of the tab gate 436. If the particular word bearing the extension number of interest has been previously read out, it will contain a tab signal which, as can be seen in FIG. 9, is recorded in the unused digit storage location immediately preceding the call information group in the word. This is the sixth digit storage location and corresponds in point of time to the sixth clock pulse 6′. The tab signal will appear on the output channel 300 at the same instant the call identification signal appears on the connection 434 at the input of the tab gate.

The tab signal is taken from the output channel 300 over a connection 438 to the previously mentioned isolating gate 410 in the word filtering circuit. The isolating gate 410 is "on" during the first sub-routine, and therefore passes the tab signal to the input of another gate 440, called the tab call gate. The output from the tab call gate 440 is applied to the "off" terminal of the tab gate 436. Hence, if the tab call gate is "on," the tab signal on the output channel 300 will be applied to the "off" terminal of the tab gate, thereby turning the tab gate "off" at the same instant that the call identification signal appears at the input of the tab gate. This prevents this particular call identification signal from arriving at the output of the tab gate. The result, then, is that during the first sub-routine, and so long as the tab call gate 440 is "on," no call identification signals will appear on the output of the tab gate 436 except those call identification signals resulting from words not previously read out. This is in effect a word filtering operation.

The word filtering circuit 318 can be of substantial importance in making the programmed and singular readout operations compatible. For example, in a hotel, the operation of the word filtering circuit prevents the occupant of a room from being charged with calls made by the previous occupant. Preferably, the storage capacity of the magnetic drum is chosen so that a progressive readout operation will be initiated automatically once each day, and, as will be explained, calls placed after the initiation of a programmed readout operation are not recovered in that readout operation, but are reserved for the next following programmed readout operation. When a guest chooses to check out, a singular readout operation is initiated whereby the calls placed from the guest's extension number since the initiation of the last programmed readout operation and up until the present minute, are recovered, printed and charged to the departing guest. The room occupied by this departing guest will likely be rented to a new guest sometime during the same day, who may or may not place calls that day. It would appear then that when the next following programmed readout operation is initiated, all calls placed from the room on the day in question, including those placed by and already charged to the departed guest, would be recovered and printed out, and charged again to the new guest. The operation of the word filtering circuit prevents this, because the calls read out in the singular readout operation for the departed guest will bear tab signals which the word filtering circuit will employ to block any subsequent recovery of this same call information. Hence, the only calls recovered during this programmed readout operation will be those calls made by the new guest following the departure of the previous guest.

A provision is made in the word filtering circuit 318 for permitting all identified words to be read out in a particular progressive or singular readout operation, regardless of whether the words have been previously read out. This is effected turning "off" the tab call gate 440 during the particular programmed or singular readout operation. When the tab call gate 440 is "off," the tab signals cannot reach the "off" terminal of the tab gate 436 to block the call identification signals. Hence, in effect, the tab signals are ignored. This is accomplished for any particular readout operation by depressing a tab call key 442 at the control console 307 before the particular readout operation is initiated.

Depression of the tab call key 442 produces a pulse over a connection 444, which runs to the "on" terminal of an auxiliary gate 446 in the word filtering circuit 318. The initiating signal for a programmed readout operation, which is carried over a connection 332, is applied through a first blocking diode 448 to the input of the auxiliary gate 446, and also to the "on" terminal of the tab call gate 440. The initiating signal for a singular readout operation is supplied over a connection 534 and is applied through a second blocking diode 450 in the word filtering circuit to the input of the auxiliary gate 446 and to the "on" terminal of the tab call gate 440. The output from the auxiliary gate 446 runs through a time delay 452 back to the "off" terminal of the auxiliary gate, and to the "off" terminal of the tab call gate 440. When either a singular or a programmed readout operation is initiated, the initiating signal will always be applied through one of the blocking diodes 448, 450 to the "on" terminal of the tab call gate 440. Hence, the tab call gate 440 is always "on" during a readout operation, unless the initiating signal gets through the auxiliary gate 446 and is delayed to turn it "off."

Depression of the tab call key 442 at the control console 307 turns the auxiliary gate 446 "on." The next initiating signal to arrive through one of the blocking diodes 448, 450 appears on the output from the auxiliary gate, and after being delayed by the time delay 452, turns "off" both the auxiliary gate and the tab call gate. The tab call gate 440 remains "off" during this readout operation, causing the word filtering circuit 318 to ignore any tab signals received. Upon the initiation of the next readout operation, the tab call gate will be turned "on," and will remain "on" during this next readout operation, unless the auxiliary gate 446 was again turned "on" by depression of the tab call key 442 before this readout operation was initiated. Of course, in determining the state of the tab call gate 440, the delayed signal if any applied through the time delay 452 to the "off" terminal of this gate prevails over the direct signal at the "on" terminal.

The word sequencing circuit 320 depends for its operation upon the receipt of call identification signals through the word filtering circuit, whereupon it causes the reading circuit 295 to dwell on the same information channel so long as is necessary to recover and print the call information groups from the words causing the call identification signals, and controls the operation of the word recovery circuit 304 through which this information is recovered. The call identification signals are carried over an output connection 454 from the tab gate 436 in the word filtering circuit. The signals are applied to the count terminal of a sequence counter 456, and through a time delay 458 to the input of a coincidence gate 460, all in the word sequencing circuit.

As can be seen, the word sequencing circuit 320 contains two counters, the sequence counter 456, and the previously mentioned recovery counter 406. Both of these counters are straight binary counters. The output from each counter is applied to the coincidence gate 460, which is turned "on" by a concurrence of the count in the two counters, remaining "on" only so long as the count in the two counters remains the same. In its reset or starting condition, the recovery counter 406 has a binary coded output of one. On the other hand, the sequence counter 456 is reset to a count of zero. Therefore, at the start, the count in the recovery counter 406 exceeds that in the sequence counter 456 by one, so that the coincidence gate 460 is "off."

The sequence counter 456 is driven by call identification signals received over the connection 454 from the word filtering circuit. The connection 264 carrying the space pulses runs to the reset terminal of this counter, so that each successive space pulse resets the counter to a count of zero. Hence, the sequence counter 456 counts the number of call identification signals derived from the current recording track being scanned and arriving through the word filtering circuit, and repeats this counting process for each revolution of the drum.

The recovery counter 406 starts with an initial count of one, and is driven by signals supplied over the output connection 390 running to the carriage return terminal of the electric typewriter in the call recovery circuit. The connection 390 receives the output signals from a one-shot pulse generator 464 in the word recovery circuit 304. These are called index signals and one such signal is generated each time the word recovery circuit finishes recovering the last digit in the call information group of a word.

The recovery counter 406 is reset by each pulse supplied over the connection 402 from the sub-routine control circuit 298, this being the same pulse which advances the stepping switch 404 in the reading circuit 295. Hence, the recovery counter 406 is reset to a count of one each time the stepping switch in the reading circuit is advanced to a new channel, and counts the words recovered through the word recovery circuit 304, if any, from the corresponding recording track on the drum.

One of the main functions of the word sequencing circuit 320 is to cause the stepping switch 404 in the reading circuit 295 to dwell on its current information channel so long as is necessary to recover and print out the call information groups from the words bearing the extension number of interest in the corresponding recording track on the drum. The word sequencing circuit accomplishes this by supplying call identification signals over an output connection 468 from the coincidence gate 460 to the "off" terminal of the dwelling gate 394 in the sub-routine control circuit 298.

Since the stepping switch 404 takes a certain amount of time to advance from one position to another, by the time the wiper arm of the stepping switch arrives at the first active position the drum will have turned through some angular distance with respect to the read-write heads since the generation of the space pulse which, by the action of the ring counter 396 and one-shot pulse generator 400, caused the stepping switch to advance. Therefore, a second space pulse will occur before all of the information in the track on the drum has had a chance to appear on the reading circuit output channel 300. And, if the only word bearing the extension number of interest was thereby missed by the word identification circuit, this space pulse will advance the ring counter 396. For this reason, the ring counter 396 is provided with its second stage, as indicated by the disconnected terminal thereon. Thus, the space pulse following that which caused the stepping switch 404 to advance, merely advances the ring counter 396 to its buffer stage. This gives the word identification circuit 302 an opportunity to find any words bearing the extension number of interest, so as to provide call identification signals to the word filtering circuit 318 and hence to the word sequencing circuit 320 in sufficient time to enable the word sequencing circuit to turn "off" the dwelling gate 394 in the sub-routine circuit 298, and thereby block further space pulses.

Assume for example that in the first recording track on the drum there are three words bearing the extension number of interest which have not been previously read out. Immediately upon the arrival of the stepping switch 404 at its first information channel, the word identification circuit 302 will have an opportunity to search through all the information in this first track and will generate call identification signals. As long as the stepping switch 404 remains on this first active position, the word identification circuit will continue to generate three call identification signals each time the drum turns through one revolution. The first call identification signal generated will advance the count of the sequence counter 456 to one, thereby turning "on" the coincidence gate 460, since the reset condition of the recovery counter 406 is a count of one. This same call identification signal, slightly delayed by the time delay 458 for the purpose of giving the sequence counter 456 time to index its count, will get through the coincidence gate 460 and will turn "off" the dwelling gate 394 in the sub-routine control circuit 298. Once the dwelling gate is turned "off," it will block the next occurring space pulse, which however will be applied through the time delay 398 to turn the dwelling gate 394 back "on." Each time a space pulse is so blocked, another complete repetition of the information from the recording track on the drum over the output channel 300 is assured, before the following space pulse is available to advance the ring counter 396.

Once the sequence counter 456 is reset by a space pulse during the time that information is appearing on the output channel 300, it will then count the three call identification signals in proper sequence. That is, going around the track on the drum, it will be the call identification signal resulting from the first identified word coming under the read-write heads after the occurrence of the space pulse that will cause the sequence counter 456 to advance to a count of one. The next word will cause the counter to advance to a count of two, and the third word pulse will cause the counter to advance to a count of three. Following this, it being stipulated that there are only three words bearing the extension number of interest in the recording track, a space pulse will reset the counter back to a count of zero.

Initially then, for every revolution of the drum, the call identification signal resulting from the first word in the sequence will appear on the output of the coincidence gate 460, and will turn "off" the dwelling gate 394 before the arrival of the next space pulse. The result is that the dwelling gate 394 is turned "on" by each successive space pulse through the time delay 398, but is turned "off" each time by a call identification signal on the output of the coincidence gate 460 before the next following space pulse arrives, so that the ring counter 396 remains at its first or second stage. This continues indefinitely so long as the count in the recovery counter 406 remains the same, namely one.

The word sequencing circuit 320 programs the sequence of recovery of words by the word recovery circuit 304, which recovers the words at a rate slower than the rate at which they appear on the reading circuit output channel 300. During the time that the word sequencing circuit causes the reading circuit to dwell on a particular information channel, the word recovery circuit 304, under the control of the word sequencing circuit, recovers at a rate substantially slower than the reading rate the call information group digits from each successive word in the identified sequence.

In the word sequencing circuit 320, the output connection 468 from the coincidence gate 460 runs to the "on" terminal of a supply gate 470. The output 378 from the free running pulse generator 376 in the sub-cycle control circuit 312 runs directly to the input of the supply gate 470 in the word sequencing circuit. The output from the supply gate 470 is carried over a connection 472 to the stepping terminal of a stepping switch 474, and through a time delay 476 to the "on" terminal of an auxiliary gate 478, all in the word recovery circuit 304.

When the supply gate 470 is turned "on" by a call identification signal on the output from the coincidence gate 460, pulses are supplied at a constant rate through the supply gate, thereby advancing the stepping switch 474 in the word recovery circuit at a constant rate, until this switch arrives at its last position, whereupon the one-shot pulse generator 464 generates the index signal. As indicated at 483, positive battery voltage is applied to one of the off-normal contacts of the stepping switch 474 so that when the stepping switch arrives in its last position, the off-normal contacts will close, thereby supplying the positive battery voltage to the one-shot pulse generator 464, causing the one-shot pulse generator to produce the index signal. The output connection 390 from the one-shot pulse generator 464 is the control lead for the carriage return terminal of the typewriter in the decoding and printing circuit and, in addition, is connected to the count terminal of the recovery counter 406 and to the "off" terminal of the supply gate 470, both in the word sequencing circuit. The index signal is employed to turn "off" the supply gate, so that the stepping switch 474 remains at its rest position, until the supply gate is again turned "on."

The stepping switch 474 in the word recovery circuit 304 is a two-pole switch having twenty-one positions, and is of the continuous cycle type that steps directly from its last to its first position. The first pole in the first, fourth, tenth and fifteenth positions of the switch is supplied with positive battery voltage, so that when the wiper arm of the switch arrives at these positions, a signal is available at the first pole of the wiper arm. The first pole of the wiper arm is coupled to the control lead 480 which runs to the space terminal of the electric typewriter in the decoding and printing circuit. Hence, the arrival of the wiper arm at the first, fourth, tenth and fifteenth positions causes the typewriter to advance one space without typing. As shown by the disconnected leads, the first poles in all other positions of the stepping switch 474 are inactive, so that no signal is supplied to the space terminal of the typewriter when the wiper arm of the stepping switch is in these positions.

The respective second poles in the second, third, fifth, sixth, seventh, eighth, ninth, eleventh, twelfth, thirteenth, fourteenth, sixteenth, seventeenth, eighteenth, nineteenth and twentieth positions of the stepping switch 474 are severally connected to the seventh through twenty-second output leads respectively of the clock pulse counter 288 in the transfer control circuit (FIG. 5), as indicated by the ganged connection 482 and by the clock pulse indications 7′ . . . 22′ shown adjacent the respective second poles to which they are applied.

In the word recovery circuit 304, the second pole of the wiper arm of the stepping switch 474 is coupled to the input of a word selecting gate 484 by a connection 486. The output from the word selecting gate 484 is applied as the input to the auxiliary gate 478, and the output from the auxiliary gate 478 is taken over a connection 488 which runs directly to the "on" terminal of the normally "off" digit selecting gate 422. The output from the auxiliary gate 478 also runs through a time delay 490 back to the "off" terminal of the auxiliary gate, and from the time delay to a blocking diode 492. The blocking diode is coupled to the control lead 374 for the type terminal of the electric typewriter in the decoding and printing circuit.

The output connection 468 from the coincidence gate 460 in the word sequencing circuit also runs to the "on" terminal of the word selecting gate 484 in the word recovery circuit. Word pulses are supplied over the connection 266 from the timing signal amplifiers 64 (FIG. 5) to the "off" terminal of the word selecting gate. The word selecting gate 484 is turned "on" by each call identification signal arriving on the output of the coincidence gate 460 and is turned "off" by each word pulse.

It will be recalled that the call information group in each word occupies digit storage locations corresponding to the last sixteen clock pulses, namely clock pulses 7′ to 22′. Since call identification signals derive from the sixth clock pulses 6′, and since each word pulse occurs between successive words, it can be appreciated that the word selecting gate 484 is "on," if at all, only during the time that the call information group in the word from which the call identification signal results is passing under the read-write head on the drum. Of course, the particular call identification signal sent to the word selecting gate is determined by the word sequencing circuit.

Again, assume for example that in the first recording track on the drum there are three words bearing the extension number of interest which have not been previously read out. Immediately after the arrival of the stepping switch 404 at its first information channel, the first call identification signal appearing on the output from the coincidence gate 460 will turn "on" the supply gate 470, thereby passing driving pulses to the stepping switch 474 in the word recovery circuit. The stepping switch 474 is advanced by these pulses without interruption through its twenty active positions dwelling on each position for a time longer than that required for the drum to turn through a complete revolution. Also, the rate of advancement of the stepping switch 474 is sufficiently slow to permit proper operation of the electric typewriter in the decoding and printing circuit so that the information can be printed as it is recovered without requiring a buffer storage for call information groups. The recovery speed is controlled by the frequency of the pulse generator 376 in the sub-cycle control circuit. It is much slower than the rate at which information appears on the reading circuit output channel 300.

When the stepping switch 474 arrives at its first active position, a signal is supplied over the connection 480 from the first pole of the wiper arm of the switch, thereby causing the typewriter to advance one space without typing. This causes the call information group to be indented one space with respect to the printed extension number on the page. Similarly, the arrival of the stepping switch at its fourth, tenth and fifteenth positions will in each instance cause the electric typewriter to advance one space without typing, thereby accounting for the spaces within the call information group on the printed page.

Upon the arrival of the stepping switch 474 at its second active position, and during the time the switch is dwelling thereon, more than one-hundred-sixty seventh clock pulses 7′ will be applied to the second terminal at this position and hence to the input of the word selecting gate 484, corresponding to more than one revolution of the drum. In accordance with the previous explanation, the word selecting gate 484 will be "on" only during the time the digit storage locations containing the call information group of the first word in the sequence are passing under the read-write heads on the drum, which happens once each drum revolution. Hence, of the many seventh clock pulses 7′ applied to the second terminal at the second position of the switch, only the one which occurs coincident with the seventh digit storage location in the first word in the sequence will get through the word selecting gate 484. This seventh clock pulse is applied through the auxiliary gate 478 to momentarily turn "on" the digit selecting gate 422. At this instant, the first digit in the dialed telephone number exists in coded electrical form on the reading circuit output channel 300, and this digit alone is supplied through the digit selecting gate 422 to the call recovery channel 305, and hence to the electronic register 324 in the decoding and printing circuit. The same seventh clock pulse is also applied through the time delay 490, blocking diode 492 and control lead 374 to the type terminal of the typewriter. Hence, immediately after the digit is set up in the electronic register 324, the same seventh clock pulse causing this digit to be set up, slightly delayed by the time delay 490, causes the electric typewriter to type the digit. Also, through time delay 325, it thereafter clears the register 324.

Similarly, when the stepping switch 474 is advanced to its third active position, the eighth clock pulse 8′ coincident with the second digit in the call information group will be selected by the word selecting gate 484 under the control of the word sequencing circuit, and will be employed to momentarily turn "on" the digit selecting gate 422 so as to set up the second digit in the dialed telephone number of this same word in the electronic register 324, with the same eighth clock pulse being slightly delayed and employed to cause the electric typewriter to type the digit, and further delayed and employed to clear the register. An analogous operation takes place in the succeeding fifth to ninth, eleventh to fourteenth and sixteen to twentieth positions of the stepping switch 474, where the second poles are supplied with the ninth through twenty-second clock pulses 9′ . . . 22′ respectively, as indicated.

The main purpose of the auxiliary gate 478 in the word recovery circuit is to preclude the possibility of a second recovery of the same digit while the stepping switch 474 is dwelling on one of its positions. The auxiliary gate 478 is turned "on" by each driving pulse supplied over the output connection 472 from the supply gate 470, slightly delayed by the time delay 476. Thus, the auxiliary gate 478 comes "on" at about the same instant that the wiper arm of the stepping switch 474 comes to rest on a new position. After arriving at the new position, the first clock pulse selected by the word selecting gate 484 is carried through the auxiliary gate 478 and through the time delay 490 back to the "off" terminal of the auxiliary gate, thereby turning the auxiliary gate "off." Should this same pulse be again selected by the word selecting gate 484 before the stepping switch 474 is advanced from its position, the clock pulse will be blocked by the auxiliary gate. The auxiliary gate 478 is turned "on" again when the stepping switch 474 is advanced to its next position.

The index signal generated upon the arrival of the stepping switch 474 at its last or rest position advances the count of the recovery counter 406 to two, turns "off" the supply gate 470, and causes the electric typewriter to execute a carriage return. This prepares the system to recover the call information group of the next word in the sequence, if any.

Having assumed that there are three words in the sequence, the effect of advancing the count of the recovery counter 406 to two is the immediate appearance of call identification signals on the output from the coincidence gate 460 resulting from the second word in the sequence, because the sequence counter 456 counts the identified words in the sequence and turn "on" the coincidence gate 460 when its count matches that of the recovery counter 406. The call identification signals on the coincidence gate output turn "on" the supply gate 470 again, so that the stepping switch 474 is advanced again through its twenty active positions, effecting a recovery of the call information group from the second word in the sequence. The following index signal causes the electric typewriter to execute another carriage return, turns "off" the supply gate 470, and advances the count of the recovery counter 406 to three. The third word in the sequence is then recovered in a similar fashion, whereupon the supply gate 470 is again turned "off," the typewriter executes another carriage return, and the count of the recovery counter 406 is advanced to four.

Since there are only three words in the sequence, the sequence counter 456 will never arrive at a count of four. Hence, no call identification signal will appear on the output from the coincidence gate 460 after the instant that the recovery counter 406 is advanced to a count of four. The supply gate 470 therefore remains in its "off" state, and the stepping switch 474 remains at its rest position. Also, the lack of call identification signals on the output from the coincidence gate 460 to turn "off" the dwelling gate 394 in the sub-routine control circuit permits the ring counter 396 to be advanced without interruption by succeeding space pulses. This marks the end of the first sub-routine, and brings on the second sub-routine.

It is during the second sub-routine that the tab signals are transferred to and recorded in the words read out in the immediately preceding first sub-routine. The second sub-routine is then a brief recording operation, taking place while the ring counter 396 in the sub-routine control circuit is at its third stage. Since the ring counter is driven by space pulses, it will dwell on its third stage for exactly one drum revolution, while the total storage area around the track on the drum is scanned by the read-write heads.

When the ring counter 396 arrives at its third stage, a direct current voltage is provided over the connection 408 to the "off" terminal of the isolating gate 410, and to the "on" terminal of the tab pulse transferring gate 412, both in the word filtering circuit. Assuming as before that there are three words in the sequence, the three respective call identification signals resulting from these words during one drum revolution are routed over the output connection 454 from the tab pulse gate 436 and through the tab pulse transferring gate 412 to a tab pulse amplifier 494. An output connection 496 runs from the tab pulse amplifier to one of the leads of an input channel 498 at the reading circuit, this channel running from the erasing circuit 322 to the wiper arm of the stepping switch 404. Hence, the call identification signal resulting from each word in the sequence will be carried through the reading circuit and recorded as a tab pulse in the sixth digit storage location in the word. The result of this transferring and recording operation is that the words recovered in the previous first sub-routine are marked with tab pulses in the sixth digit storage location which immediately precedes the call information group in each word, so that the subsequent recovery of these same words may be blocked by the action of the word filtering circuit.

The information channels of the reading circuit 295 are employed for recording tab pulses. This is convenient because the stepping switch 404 is at the time resting on the information channel corresponding to the recording track on the drum in which the words are stored. As shown, it is not necessary to employ all four leads in a channel for this purpose. The input channel 498 of the reading circuit is merely a set of four leads connected to the four-pole wiper arm of the stepping switch 404 in parallel with the four leads running to the reading amplifiers 420, with only one of these leads being employed to record tab signals.

When the ring counter 396 is advanced by the following space pulse from its third stage back to its first stage, the disappearance of the direct current voltage on the connection 408 permits the isolating gate 410 to revert to its normally "on" condition, and the tab pulse transferring gate 412 to revert to its normally "off" condition. Also, the arrival of the ring counter 396 at its first stage activates the one-shot pulse generator 400 which in turn produces a pulse over its output connection 402. This advances the stepping switch 404 to the next information channel, and resets the recovery counter 406 in the word sequencing circuit, thus initiating a new first sub-routine whereby the corresponding new track on the drum is searched for words bearing the extension number of interest, which calls are recovered through the cooperative action of the word identification circuit, the word filtering circuit, the word sequencing circuit, and the word recovery circuit. After this, a new second sub-routine is carried out as the ring counter 396 passes again through its third stage. Hence, the stepping switch 404 in the reading circuit dwells on each successive information channel until a first sub-routine and a second sub-routine are completed. If for any reason, no call identification signals appear on the output 454 from the word filtering circuit after the stepping switch 404 arrives at a particular channel, the dwelling gate 394 in the sub-routine control circuit will continue in its "on" condition, and the ring counter 396 will continue advancing without interruption as it receives each space pulse.

Eventually, the stepping switch 404 is advanced to its last or rest position, whereupon the off-normal contacts close activating the one-shot pulse generator 418, which produces the recycling signal over the recycling path 352. The recycling signal is employed to turn "off" the second sub-cycle gate 392 in the sub-routine control circuit, thereby shutting off the supply of space pulses to the ring counter 396 so that the stepping switch 404 remains at its rest position. This marks the end of the second subcycle which, of course, is also the end of the fundamental cycle.

THE CONTROL MEANS

The control means functions primarily to initiate the action of the readout means for particular subscriber identifications. The control means includes portions of the reading circuit 295, the control console 307, the programmed readout initiation circuit 308, the extension number programming circuit 310, the erase circuit 322, and the singular readout initiation circuit 323. In addition, the control means includes certain elements in the word filtering circuit 318.

A programmed readout operation is initiated automatically by the action of the programmed readout initiation circuit 308, illustrated in FIG. 8. The programmed readout initiation circuit accomplishes this by means of a track counter 329. The track counter is a conventional five stage counter driven by overflow pulses carried on the connection 76 from the call counter 276 in the transfer control circuit 60 (FIG. 5) of the call monitoring system. The call counter 276 produces an overflow pulse each time it becomes necessary to cause the recording switch 292 to advance to a new recording track on the magnetic drum 78, after the current recording track is filled to its one hundred sixty word capacity.

In the programmed readout initiation circuit 308, the fifth stage of the track counter 329 is coupled by a lead 330 to the input of an initiation gate 340. When the track counter 329 reaches a count of five, it provides a direct current voltage on this connection thereby, in effect, requesting the initiation of a programmed readout operation. If the initiation gate 340 is in its "on" state during the time a requesting signal is present at its input, it will transmit this signal to a one-shot pulse generator 344 which in turn generates an initiating signal over its output connection 332. This initiating signal resets the track counter 329 to a count of one.

Since there are six recording tracks on the drum, the indication of the track counter when it arrives at its fifth stage is that four of these tracks have been completely filled since the initiation of the last programmed readout operation, and a fifth track is beginning to be filled, so that effectively two tracks on the drum, this fifth track and the following sixth track which account for one-third of the storage capacity of the drum, remain as yet unfilled. While the preceding four tracks are being read out through a new programmed readout operation, newly occurring call information is recorded in the two remaining unfilled tracks.

Hence, the track counter 329 repeatedly measures out two-thirds of the storage capacity of the drum, starting with the track to which the stepping switch 292 in the recording circuit was advanced when the count of the track counter was advanced to five. Since there are six recording tracks on the drum, it can be appreciated that the track counter is always being reset at a different track on the drum. Therefore, the track counter is not always measuring the same two-thirds portion of the storage capacity of the drum.

Referring to FIG. 7, a programmed readout operation may be requested manually by depressing a key 336 in the control console 307. By the simple condenser, battery and resistor arrangement shown, depression of this key will produce a pulse on a connection 338 which, like the connection 330 from the track counter 329, runs to the input of the initiation gate 340.

A function of the programmed readout initiation circuit is to prevent the initiation of a programmed readout operation at a time when another readout operation is already in progress, particularly a singular readout operation. This it does by the action of the initiation gate 340, which is turned "on" only when the readout system is in its quiescent state.

The initiation gate 340 is normally "off," and is turned "on" by the quiescent voltage level supplied over the connection 342 from the singular readout initiation circuit 323 when there is no readout operation currently in progress. At the time the requesting signal is supplied, the initiation gate 340 will either be "on," or will come "on" shortly thereafter when a singular readout operation in progress is finished.

Referring to FIG. 6, the control means includes the plurality of gates 346 in the reading circuit 295, called blocking or limiting gates. The limiting gates 346 are disposed respectively in the plurality of information channels 296 of the reading circuit 295 so that they may be employed to block any of these channels so as to limit the action of the readout means to particular recording tracks on the drum. The limiting gates 346 are turned "on" by the initiating signal for a programmed readout operation carried over the connection 332. The limiting gates are turned "off" by the action of the recording switch 292 in the recording circuit 70 (FIG. 5) of the call monitoring system.

Referring to FIG. 5, the wiper arm of the recording switch 292 has five poles, the fifth of which is supplied with positive battery voltage as shown. As this stepping switch is advanced through its channels, the fifth lead in each channel receives this positive battery voltage so long as the switch dwells on that channel. These fifth leads are referred to collectively as the blocking leads 348. They run respectively to the corresponding limiting gates 346 in the reading circuit 295, where they are each coupled to the "off" terminal of their associated limiting gate.

When the recording operation is proceeding in a particular recording track on the drum, the block lead associated with that channel of the recording switch 292 is energized, and holds the associated limiting gate in the reading circuit 295 in its "off" state with a continuing direct current voltage. Thus, there is always one blocking lead carrying a direct current voltage, corresponding to the track wherein the recording operation is proceeding in the call monitoring system.

The initiating signal for the programmed readout operation turns "on" all the limiting gates 346, except the one corresponding to the track in which the recording operation is proceeding, this being the first of the two tracks comprising the remaining one-third of the storage capacity of the drum in which newly occurring call information is to be recorded while the programmed readout operation takes place. Should this first unfilled track become filled during the programmed readout, the recording switch is advanced to the second remaining unfilled track, and the limiting gate in the reading circuit 295 corresponding to this second track is turned "off." Hence, during the programmed readout operation, no information is derived from the two tracks reserved for newly occurring call information. Rather, the action of the readout means is effectively limited to those particular tracks filled by the call monitoring system after the initiation of the preceding programmed readout and prior to the initiation of the present programmed readout.

The connection 332 from the one-shot pulse generator 344 in the programmed readout initiation circuit also runs directly to the word filtering circuit 318. This will be taken up later.

The programmed readout initiating signal from the one-shot pulse generator 344 is supplied through a blocking diode 350 to the recycling path 352. The recycling path originates in the reading circuit 295, extends through the erase circuit and the singular readout initiation circuit 323, and terminates in the extension number programming circuit 310. The recycling signal generated by the reading circuit 295 at the end of each fundamental cycle is carried over the recycling path. As can be seen, a number of connections are made to and taken from the recycling path at various points.

The programmed readout initiation signal is carried over the recycling path, through a gate 354 in the singular readout initiation circuit 323, to the stepping or advancing terminal of a programmed register 356 in the extension number programming circuit 310. The gate 354 in the singular readout initiation circuit is called the automatic programming gate. Normally, the automatic programming gate 354 is "on." It is turned "off" when a singular readout operation is requested, remaining "off" until the singular readout operation is finished.

The programmed register 356 may be any conventional arrangement for advancing through a program of registrations of extension numbers, having an output of five decimal digits, each in binary-decimal coded form. For example, the programmed register 356 may be a binary-decimal coded counter; or, a tape reader with the program of extension numbers being provided on the tape; or, five four-pole stepping switches ganged together either electrically or mechanically to successively represent a complete program of extension numbers when driven with a stepping signal. In a hotel, a complete program may comprise the extension numbers or room numbers associated with all the guest telephones in the hotel. Thus, there might be one thousand or more different extension numbers in the program.

The five output channels from the programmed register 356 are connected to the common extension number channels 314 through an isolating gate 358. This gate is always "on," except during a singular readout operation, when it is then employed to isolate the extension number programming circuit 310 from the common extension number channels.

The programmed register 356 is arranged to provide a continuing direct current voltage over an output connection 360 when it is in its quiescent state. The programmer is advanced to its quiescent state by the next advancing signal received after it arrives at the last extension number in the program. After arriving at its quiescent state, a further advancing signal would step the programmed register back to the first extension number in the program. This would be the signal supplied from the programmed readout initiation circuit 308 to initiate a new programmed readout operation.

The output connection 360 from the programmed register 356 runs to a gate 361 in the singular readout initiation circuit 323, called the shut-off gate. The shut-off gate 361 is normally "on." It is turned "off" when a singular readout operation is requested, remaining "off" until the singular readout operation is finished. The output signal from the shut-off gate 361 is the continuing direct current voltage called the quiescent voltage level, and indicates that the readout system is in its quiescent condition, i.e., that no readout operation is in progress. The existence of the quiescent voltage level depends upon two things; upon the programmed register 356 being in its quiescent state; and, upon the shut-off gate 361 being "on." The output connection from the shut-off gate 361 which carries the quiescent voltage level is the connection 342 running, among other places, to the "on" terminal of the initiating gate 340 in the programmed readout initiation circuit 308.

Just prior to the initiation of a programmed readout operation, the programmed register 356 is in its quiescent state. And, as soon as any singular readout operation in progress is completed, the shut-off gate 361 and the automatic programming gate 354 will both come "on." The resulting quiescent voltage level over the output connection 342 from the shut-off gate turns "on" the initiating gate 340 in the grogrammed readout initiation circuit, so that any signal present at the input of the initiating gate 340 will actuate the one-shot pulse generator 344, causing it to generate the initiating signal for a programmed readout operation over its output connection 332. This signal is carried through the blocking diode 350 and over the recycling path 352, through the automatic programming gate 354, and to the programmed register 356. The programmed register 356 is immediately advanced from its quiescent state to register the first extension number in the program on its five output channels; and, since the isolating gate 358 is "on," the registration from the programmed register is carried over to the common extension number channels 314. Also, the initiating pulse over the connection 332 resets the track counter 329, and turns "on" all the limiting gates 346 in the reading circuit except the one which is currently blocked. In this way, a total readout of two-thirds of the storage capacity of the drum is effected, while newly occurring call information is being stored in the remaining one-third portion, and while the track counter 329 is counting off another two-thirds portion of the storage capacity of the drum in anticipation of the future necessity for initiating another programmed readout operation.

The action of the readout means is initiated for the first extension number in the program upon the advancement of the programmed register 356 from its quiescent state. The advancement of the programmed register 356 from its quiescent state cuts off the direct current voltage on the output connection 360, hence cuts off the quiescent voltage level on the output connection 342 from the shut-off gate 361. This permits the first sub-cycle gate 380 in the sub-cycle control circuit 312 to revert to its normally "on" state, thereby starting the fundamental cycle of the readout means, the details of which has been previously explained.

Upon the completion of the fundamental cycle for the first extension number in the program, the recycling signal over the recycling path 352 will advance the programmed register 356 in the extension number programming circuit 310 to register the next extension number in the program, and this same recycling signal, delayed slightly by the time delay 384 will turn "off" the auxiliary gate 366 in the sub-cycle control circuit 312, thereby permitting the first sub-cycle gate 380 to revert to its normally "on" condition in view of the fact that the programmed register 356 no longer provides a signal over its connection 360 to the shut-off gate 361. This automatically recycles the readout means for the second extension number in the program.

Thus, the readout means is automatically recycled for successive extension numbers in the program until the program of extension numbers is exhausted. Eventually, the program register 356 will register the last extension number in the program. At the end of the fundamental cycle carried out for this last extension number, the recycling signal over the recycling path 352 will advance the programmed register to its quiescent state, causing the reappearance of the signal on its output connection 360 and hence the reappearance of the quiescent voltage level over the output connection 342 from the shut-off gate 361. At this time, the fact that the same recycling signal, through the time delay 384, turns "off" the auxiliary gate 366 in the sub-cycle control circuit is of no consequence, because the first sub-cycle gate 380 is held in its "off" condition by the quiescent voltage level, re-established by the arrival of the programmed register 356 at its quiescent state. At this point, the readout system is in its quiescent state.

The control means provides for erasing the contents of the particular recording tracks on the drum read out during the preceding programmed readout operation.

The erasing operation may be initiated manually from the control console 307 by depressing an erase key 500 after a first indicator lamp 502 comes "on." Thus, the operator has an opportunity to check the results of the programmed readout operation before initiating the erasing operation. If the operator is dissatisfied with the results of the programmed readout operation, the operator can depress the tab key 442 and then depress the programmed readout initiation key 336, thereby requesting another programmed readout operation wherein the tab signals recorded in the words will be ignored.

The first indicator lamp 502 on the control console is turned "on" by the return of the system to its quiescent state after a programmed readout operation. The operating voltage for the lamp is derived from the quiescent voltage level through a control gate 504. The control gate is turned "on" by any signal supplied over the recycling path 352 to advance the programmed counter 356. Hence, it is turned "on" when a programmed readout operation first starts. Upon the completion of the programmed readout operation, the appearance of the quiescent voltage level on the output connection 342 from the shut-off gate 361 will energize the indicator lamp. This advises the operator that the portions of the main storage facility just read out may now be erased. The erase key 500 at the control console is depressed, whereupon by means of the simple battery, resistor and condenser arrangement illustrated, a pulse is produced over a connection 506 to the erasing circuit 322, and to the "off" terminal of the control gate 504. This extinguishes the indicator lamp 502, and initiates the erasing operation.

Once initiated, the erasing operation is carried out automatically by the erase circuit 322 (FIG. 6). The erase circuit includes an erase gate 508, a set of amplifiers 510, a blocking gate 512, and a time delay 514. As shown, negative battery voltage is supplied through the erase gate 508, and through the set of amplifiers 514 to the input channel 498 of the reading circuit. By applying negative voltage levels on the respective leads of the input channel 498 and advancing the stepping switch 404 through its information channels, an indication of zero will be written into each digit storage location around each recording track on the drum, except those tracks for which the corresponding recording channels are blocked by one or more of the limiting gates 346. It will be recalled that these recording tracks were reserved for newly occurring call information during the just finished programmed readout operation.

The pulse produced by the depression of the erase key 500 at the control console 307 is carried over the connection 506 to the "on" terminal of the erase gate 508, and to the "off" terminal of the blocking gate 512. Immediately, the negative voltage level from the erase amplifiers 510 appears on the input channel 498 of the main readout circuit. The stepping switch 404 is advanced through its information channels by pulses supplied over the output connection 378 from the free running pulse generator 376 in the sub-cycle control circuit 312 to the erase gate 508 and over the connection 402 which runs from the erase gate, as well as from the sub-routine control circuit 298, to the stepping terminal of the stepping switch 404.

Upon the arrival of the stepping switch at its rest position, the recycling signal generated by the one-shot pulse generator 418 will be blocked by the blocking gate 512, which is located serially in the recycling path 352. This recycling signal is employed to turn "off" the erase gate 508, thereby shutting off the supply of driving pulses so that the stepping switch 404 remains at its rest position. Also, this recycling signal is applied through the time delay 514 to the "on" terminal of the blocking gate 512, thereby turning the blocking gate "on" so that future recycling signals will be carried over the recycling path past the erase circuit 322. In effect, the recycling signal resulting from the arrival of the stepping switch 404 at its rest position at the end of the erasing operation restores the erase circuit to its quiescent condition.

The initiation of the singular readout operation has its beginning in the control console 307, where the operator first sets up a chosen extension number of interest on a manual keyboard 516 and then depresses a singular readout initiation key 518. The manual keyboard 516 has five sets of output leads, with ten leads in each set as indicated by the numerical designation 0 . . . 9. By depressing appropriate keys on the manual keyboard, one lead in each of the five sets is energized, thereby providing a decimal indication of the five digit extension number of interest. The five digit output from the manual keyboard is translated from decimal to binary-decimal code by a translating matrix 520, and applied therefrom through an isolating gate 522 to the common extension number channels 314. When the isolating gate 522 is "on," the extension number set up on the manual keyboard appears in binary-decimal coded form on the common extension number channels. As will be seen, the isolating gate is "on" only during a singular readout operation.

After setting up the extension number of interest on the manual keyboard, the operator has the option of then depressing the tab call key 442 so that in the following singular readout operation all words bearing the chosen extension number of interest will be recovered regardless of whether they have been previously recovered in another readout operation. As previously explained, in conjunction with the readout means, the depression of the tab call key 442 turns "on" the auxiliary gate 446 in the word filtering circuit, so that the next signal marking the initiation of either a singular or programmed readout operation has the ultimate effect of turning "off" the tab call gate 440.

While explained in conjunction with the readout means, the auxiliary gate 446, the time delay 452, the tab call gate 440, and the diodes 448, 450 all in the word filtering circuit 318, are treated herein as technically a part of the control means. In conjunction with the tab call key 442, these elements afford a manually actuable means for deactivating the tabe gate 436 for chosen programmed and singular readouts. Since this operation has been previously explained, it is here assumed that the operator elects not to depress the tab call key 442.

After making this election, the operator then depresses the singular readout key 518 which produces a pulse over a connection 524 running to the singular readout initiation circuit 323. This pulse is the singular readout request pulse.

Normally, the readout means is set up for handling programmed readout operations. That is, the bypass gate 414 in the reading circuits 295 is "off" so that access to the magnetic drum through the information channels 296 is subject to the condition of the limiting gates 346; the isolating gate 358 in the extension number programming circuit 310 is "on" so that the output from the programmed register 356, if any, appears on the common extension number channels 314; and, the automatic programming gate 354 in the singular readout initiation circuit 323 is "on" so that signals over the recycling path 352 arrive at the programmed register 356 causing it to advance.

These conditions are reversed by the reaction of the singular readout initiation circuit 323 upon the receipt of a singular readout request pulse. Also, these conditions are restored by the action of the singular readout initiation circuit when the singular readout operation is finished.

The singular readout initiation circuit 323 includes a flip-flop 526 having a first stage at which it provides a direct current voltage over a connection 528, and having a second stage at which it provides a direct current voltage over a connection 530. Normally, the flip-flop is at its first stage. It is switched to its second stage when a singular readout operation is initiated, whereupon the direct current voltage supplied on the connection 530 activates a first one-shot pulse generator 532, and causes the extension number set up on the manual keyboard 516 to appear on the common extension number channels 314 by turning "off" the isolating gate 358 in the extension number programming circuit 310 and turning "on" the isolating gate 522 in the control console. At the same time, the pulse generated by the one-shot pulse generator 532 is applied over an output connection 534 to the second blocking diode 450 in the word filtering circuit, and to the "on" terminal of the by-pass gate 414, in the reading circuit 295, thereby opening all of the information channels 296 by completing a connection through the bypassing gate 414 for each channel which by-passes the limiting gates 346. The effect in the word filtering circuit has already been explained.

In the singular readout initiation circuit, the receipt of the singular readout request pulse over the connection 524 ultimately causes the flip-flop 526 to switch to its second stage where it remains until the completion of the fundamental cycle required for the singular readout operation. The particular signal employed to trigger the flip-flop will depend upon whether the readout system is currently involved in a programmed readout operation, or is currently in its quiescent state. Signals are supplied to the triggering terminal of the flip-flop 526 from the output of either of two gates, an initiating gate 536 and a diverter gate 538. The initiating gate 536 is held "on" by the direct current voltage over the output connection 360 from the programmed register 356, which is present when the programmed register is in its quiescent state.

The singular readout request pulse arriving in the singular readout initiation circuit turns "off" the automatic programming gate 354, turns "on" the diverter gate 538, turns "off" the shut-off gate 361 through a time delay 540, and is applied to the input of the initiating gate 536.

Assuming that the readout system is in its quiescent state, the initiating gate 536 will be "on" and the request pulse will be applied therethrough to trigger the flip-flop 526, causing it to switch to its second stage which, as explained, prepares the system for a singular readout operation. Shortly thereafter, the request pulse will arrive through the time delay 540 to turn "off" the shut-off gate 361, thereby extinguishing the quiescent voltage level on the output connection 342. This permits the first sub-cycle gate 380 in the sub-cycle control circuit to revert to its "on" condition, and thereby initiates a fundamental cycle wherein the chosen extension number set up on the manual keyboard 516 is printed out through the extension number recovery circuit 316, after which the call information groups from words bearing this extension number on the magnetic drum are recovered and printed on successive lines beneath the extension number.

The cycle complete signal generated at the end of this fundamental cycle is blocked by the automatic programming gate 354, and is diverted through the diverter gate 538 to the triggering terminal of the flip-flop 526. This switches the flip-flop back to its first stage, whereupon a second one-shot pulse generator 542 is actuated, producing a pulse on an output connection 544 which restores the system to its original condition. This pulse is supplied through a time delay 546 to turn "on" the automatic programming gate 354, to turn "off" the diverter gate 538 and to turn "on" the shut-off gate 361. Since the time delay 546 is slightly longer than the time delay 384 in the sub-cycle control circuit 312, the quiescent voltage level over the output connection 342 from the shut-off gate 361 is restored before the auxiliary gate 366 in the sub-cycle control circuit is turned "off" by the recycling signal, so that the first sub-cycle gate 380 has no opportunity to come "on" before the restoration of the quiescent voltage level which holds it "off."

The output connection 544 from the second one-shot pulse generator 542 also runs to the "off" terminal of the bypass gate 414 in the reading circuit 295, so that the pulse generated when the flip-flop arrives at its first stage turns "off" the bypass gate thereby subjecting the main readout circuit to the condition of the limiting gates 346. The isolating gates 358, 522 in the extension number programming circuit and control console respectively are restored to their normal condition by the cessation of the direct current voltage over the output connection 530 from the second stage of the flip-flop 526, when the flip-flop is switched back to its first stage.

The singular readout initiation circuit is sensitive to current progress of a programmed readout, and upon the receipt of the request pulse for a singular readout, awaits the next following recycling signal whereupon it interleafs a fundamental cycle of the readout means for the chosen extension number between successive cycles of the readout means for the programmed extension numbers.

Assuming that the system is currently involved in a programmed readout operation, when the singular readout key 518 at the control console is depressed the resulting request pulse will be blocked by the initiating gate 536. However, the next recycling signal generated at the end of a fundamental cycle in the programmed readout operation will be blocked by the automatic programming gate 354 and diverted through the diverter gate 538 to the triggering terminal of the flip-flop 526, causing the flip-flop to switch to its second stage, thereby setting up the system for a singular readout operation. A fundamental cycle of the readout means will start when this same recycling signal arrives through the time delay 384 in the sub-cycle control circuit to turn "off" the auxiliary gate 366, thereby permitting the first sub-cycle gate 380 to revert to its "on" condition. Since the programmed register 356 is not in its quiescent state, there is no quiescent voltage level at this time.

At the end of this fundamental cycle, the resulting recycling signal will be diverted by the diverter gate 538 to the triggering terminal of the flip-flop, 526, causing the flip-flop to switch back to its first stage, whereupon the original conditions of the readout system are restored, and whereupon the pulse supplied on the output connection 544 from the second one-shot pulse generator 542 is applied through time delay 546 to turn the automatic programming gate 354 "on" and the diverter gate 538 "off," and is applied through an auxiliary gate 547 to advance the programmed register 356 to register the next extension number in the program. The previously interrupted programmed readout operation immediately continues when this same recycling signal arrives through the time delay 384 in the sub-cycle control circuit to turn "off" the auxiliary gate 366 therein.

The auxiliary gate 547 in the singular readout initiation circuit is a normally "on" gate, held "off" by the direct current voltage supplied over the conection 360 when the programmed register is in its quiescent state. Hence, the pulse from the second one-shot pulse generator 542 will be employed to advance the programmed register only when he programmed register is not already in its quiescent state, which is only during a programmed readout operation.

Should the signal applied to the programmed register through this auxiliary gate 547 advance the programmed register to its quiescent state, the quiescent voltage level will appear at this time on the output connection 342 from the shut-off gate 361, and hence hold the first sub-cycle gate 380 in the sub-cycle control circuit in its "off" condition, because the shut-off gate 361 is turned "on" by the pulse from the second one-shot pulse generator 542 through the time delay 546.

It should be noted that regardless of the initial condition of the system, depression of the singular readout key 518 at the control console will ultimately produce two pulses at the triggering terminal of the flip-flop 526 in the singular readout initiation circuit, one to advance the flip-flop to its second stage to initiate the singular readout operation and the other to return the flip-flop to its first stage when the singular readout operation is finished. These same two pulses will be applied through a blocking diode 548 to the connection 390 running to the carriage return terminal of the electric typewriter 328 in the decoding and printing circuit. This produces an extra carriage return before the chosen extension number in the singular readout operation is printed, and produces an extra carriage return when the singular readout operation is finished. Hence, the spacing between singular and programmed readout operations on the printed page as illustrated in FIG. 14, is accounted for. Also, the pulses through the blocking diode 548, or alternatively, the direct current voltage level on the output connection 530 from the flip-flop 526 accounts for the signal mentioned previously that may be employed to switch the control leads 390, 374, 480 and output connections from the translating matrix 326 in the decoding and printing circuit to a different typewriter during a singular readout operation, so that the resulting printed record portion for each singular readout operation may be separately torn off and presented to the hotel guest.

A second indicator lamp 550 at the control console 307 is provided to warn the operator that a singular readout operation is in progress. More precisely, the second indicator lamp 550 is turned "on" when a singular readout operation is requested, and is turned "off" when the singular readout operation is concluded. So long as this indicator lamp is "on," the operator should not attempt to initiate another singular readout operation. As a practical matter, because of the speed of operation of the system, the indicator lamp can be expected to be "on" only for very short intervals of time. After the lamp goes "off," the operator is free to initiate a singular readout operation by first setting up the extension number of interest on the keyboard, and then depressing the singular readout key.

The second indicator lamp 550 is operated by positive battery voltage through a control gate 552. The connection 524 which carries the singular readout request pulse runs to the "on" terminal of this control gate, and the output connection 544 from the second one-shot pulse generator 542 in the singular readout initiation circuit runs to the "off" terminal of the control gate. Hence, the control gate is turned "on" when a singular readout operation is requested and is turned "off" when the singular readout operation is concluded, with the indicator lamp 550 being turned "on" and "off" accordingly.

In the following claims, the expression "recovering words" or the equivalent is used generically and includes within its scope the operation of the preferred embodiment of the readout system whereby the calling extension number is recovered after which the call information groups from words bearing the extension number are recovered. So long as the identification of the calling party is known, or is already recovered, recovery of a word is the recovery of any portion or all of the word, always however including the call information group, that is the digits identifying the called party and the digits establishing the time duration of the call.

Further, in the claims, the term "trunk connector" is employed to designate a trunk type connector such as a cord set in a PBX, a first selector switch in a central office exchange, or any connector which performs the analogous function in any telephone exchange.

I claim:

1. In a system for keeping account of telephone calls placed through a telephone exchange from any of a plurality of local telephone subscribers, the combination which comprises a main storage facility for storing a large plurality of digitally encoded words, a call monitoring system coupled between the main storage facility and the telephone exchange, said call monitoring system operating continually and without interruption and including monitoring means for sensing, encoding and accumulating into a complete digital word during the progress of each call information identifying the calling subscriber, the called party and the time duration of the call, and also including means for transferring each complete word intact from the monitoring means to the main storage facility substantially immediately upon the conclusion of the call which it describes, and a concurrently operable readout system having full and independent access to the main storage facility for searching the contents thereof on demand and recovering words therefrom selectively according to a chosen calling subscriber identification.

2. Apparatus of claim 1 wherein said monitoring means includes a separate monitoring facility associated with each of a plurality of trunk connections available in the telephone exchange by means of which words describing calls carried concurrently over the different connections are accumulated separately during the progress of the calls, each monitoring facility having predetermined storage means for the digits identifying the calling subscriber, the digits identifying the called party and at least some of the digits establishing the time duration of the call.

3. In a system for keeping account of telephone calls placed through a telephone exchange from any of a plurality of local telephone subscribers, the combination which comprises a main storage facility including a plurality of cyclically operating storage means, each having a capacity for serially storing a plurality of digitally encoded words, a call monitoring system coupled between the telephone exchange and the main storage facility, said call monitoring system including monitoring means for sensing, encoding and accumulating into a complete digital word during the progress of each call information identifying the calling subscriber, the called party and the time duration of the call, and also including means for transferring each complete word intact from the monitoring means to the main storage facility substantially immediately upon the conclusion of the call which it describes, and a concurrently operable readout system coupled to the main storage facility for searching the contents thereof on demand and recovering words therefrom selectively according to a chosen calling subscriber identification, said transferring means including a first switching means for selectively coupling the call monitoring system to any of said cyclically operating storage means, and said readout system including a second switching means independently operable with respect to said first switching means for selectively coupling the readout system to any of said cyclically operating storage means.

4. In a system for keeping account of telephone calls placed through a telephone exchange from any of a plurality of local telephone subscribers, the combination which comprises a main storage facility for storing a large plurality of digitally encoded words, a monitoring system coupled to the telephone exchange for completing and transferring intact to the main storage facility substantially contemporaneously with the execution of said calls digitally encoded words describing the calls, each completed word describing a particular outgoing call and having a known order of digits which identify the calling subscriber, the called party and the time duration of the call, and a concurrently operable readout system coupled to the main storage facility for searching the contents thereof on demand and recovering words therefrom selectively according to the calling subscriber identification, said concurrently operable readout system including readout means for searching the main storage facility and recovering words having a particular calling subscriber identification, and control means for initiating the action of the readout means for particular subscriber identifications, said control means including manually actuable means for registering a chosen subscriber identification for the readout means, means for initiating the action of the readout means singularly for said chosen subscriber identification, means providing a program of registrations of subscriber identifications for the readout means, means for initiating the action of the readout means for a first subscriber identification in the program, and means responsive to said last named means for automatically recycling the readout means for successive subscriber identifications in the program until the program is exhausted.

5. Apparatus of claim 4 wherein the means for initiating the programmed readout includes means sensitive to the filling of a predetermined amount of the storage capacity of the main storage facility following the initiation of the last programmed readout for automatically producing a requesting signal, and means responsive to the requesting signal for initiating the action of the readout means for a first subscriber identification in the program.

6. Apparatus of claim 5 wherein the means responsive to the requesting signal includes means sensitive to the current progress of a singular readout for delaying the initiation of the programmed readout until the singular readout has finished.

7. Apparatus of claim 4 wherein the means for automatically recycling the readout means comprises means for providing a recycling signal each time the readout means completes its action for a subscriber identification, and means responsive to the initiation of the programmed readout and to said recycling signals for recycling the readout means for successive subscriber identifications in the program until the program is exhausted, and wherein the means for initiating the singular readout includes manually actuable means for producing the requesting signal, and means sensitive to current progress of a programmed readout, to the requesting signal and to the next following recycling signal for interleafing a cycle of the readout means for said chosen subscriber identification in between successive cycles of the readout means for the programmed subscriber identifications.

8. Apparatus of claim 4 wherein the means for initiating the singular readout includes manually actuable means for producing a requesting signal, and means sensitive to current progress of a programmed readout and responsive to said requesting signal for interleafing a cycle of the readout means for said chosen subscriber identification in between successive cycles of the readout means for the programmed subscriber identifications.

9. Apparatus of claim 4 wherein the readout means includes means for transferring for storage in the main storage facility at a predetermined location within each word recovered a signal indicating that the word has once been recovered by the readout means, and means sensitive to said stored signals for blocking the subsequent recovery of the same words by the readout means.

10. Apparatus of claim 9 further comprising as part of the control means, manually actuable means for deactivating said blocking means for chosen programmed and singular readouts.

11. Apparatus of claim 4 wherein said control means in the concurrently operable readout system includes means responsive to the initiation of a programmed readout for limiting the readout means to those particular storage means filled by said call monitoring system since the initiation of the last programmed readout, and means for erasing the contents of said particular storage means following the programmed readout thereof.

12. Apparatus of claim 11 wherein said control means further includes means responsive to the initiation of a singular readout for bypassing said limiting means, so as to provide access for the readout means to all of said plurality of storage means of the main storage facility.

13. In a system for keeping account of telephone calls placed through a telephone exchange from any of a plurality of local telephone subscribers, the combination which comprises a main storage facility for storing a large plurality of digitally encoded words, a call monitoring system coupled to the telephone exchange for completing and transferring intact to the main storage facility substantially contemporaneously with the execution of said calls digitally encoded words describing the calls, each completed word describing a particular concluded call and having a known order of digits which identify the calling subscriber, the party called and the time duration of the call, and a concurrently operable readout system coupled to the main storage facility for searching the contents thereof on demand and recovering words therefrom selectively according to a chosen calling subscriber identification, the readout system including means for transferring to the main storage facility for storage at a predetermined location in each word recovered a signal indicating that the word has once been recovered by the readout system, and means sensitive to said stored signals for blocking the subsequent recovery of these same words from the main storage facility by the readout system.

14. In a system for keeping account of telephone calls placed through a telephone exchange from any of a plurality of local telephone subscribers, the combination which comprises a main storage facility for storing a large plurality of digitally encoded words, the main storage facility includes a plurality of cyclically operating storage means each with a capacity for serially storing a plurality of words, a monitoring system coupled to the telephone exchange for completing and transferring intact to the main storage facility substantially contemporaneously with the execution of said calls digitally encoded words describing the calls, each completed word describing a particular call and having a known order of digits which identify the calling subscriber, the called party and the time duration of the call, and a concurrently operable readout system coupled to the main storage facility for searching the contents thereof on demand and recovering words therefrom selectively according to the calling subscriber identification, said concurrently operable system including readout means for searching the main storage facility and serially recovering words having a particular calling subscriber identification, and control means for initiating the action of the readout means for particular subscriber identifications, said readout means includes means for cyclically reading the contents of said storage means one at a time in succession, comparator means for producing an identifying signal each time a word bearing said particular calling subscriber identification appears on the output of the reading means and prior in time to the appearance of the digits in the word which identify the called party and the time duration of the call, means responsive to said identifying signals for serially recovering the words from which they result, and means for controlling the advancement of the reading means so that the serial contents of each storage area are repeated cyclically until said words are recovered before advancing to the next storage means in said succession, said readout means further including means for decoding and printing the information as it is recovered and in accordance with a predetermined format.

15. In a system for keeping account of telephone calls placed through a telephone exchange from any of a plurality of local telephone subscribers, the combination which comprises a main storage facility for storing a large plurality of digitally encoded words, the main storage facility includes a plurality of cyclically operating storage means each with a capacity for serially storing a plurality of words, a monitoring system coupled to the telephone exchange for completing and transferring intact to the main storage facility substantially contemporaneously with the execution of said calls digitally encoded words describing the calls, each completed word describing a particular call and having a known order of digits which identify the calling subscriber, the called party and the time duration of the call, and a concurrently operable readout system coupled to the main storage facility for searching the contents thereof on demand and recovering words therefrom selectively according to the calling subscriber identification, said concurrently operable system including readout means for searching the main storage facility and serially recovering words having a particular calling subscriber identification, and control means for initiating the action of the readout means for particular subscriber identifications, said readout means includes means for cyclically reading the contents of said storage means one at a time in succession, comparator means for producing an identifying signal each time a word bearing said particular calling subscriber identification appears on the output of the reading means and prior in time to the appearance of the digits in the word which identify the called party and the time duration of the call, means responsive to said identifying signals for serially recovering the words from which they result, and means for controlling the advancement of the reading means so that the serial contents of each storage area are repeated cyclically until said words are recovered before advancing to the next storage means in said succession, said means responsive to the identifying signals for serially recovering the words from which they result comprises means for programming the sequence of recovery of successive words identified by identification signals from the comparator means upon the arrival electrically of the reading means at each storage means, and means responsive to the sequencing means for serially recovering the identified words from the reading means output one at a time in said sequence at a rate substantially slower than the reading rate, said readout means further including means for decoding and printing the information as it is recovered and in accordance with a predetermined format.

16. In a system for keeping account of telephone calls placed through a telephone exchange from any of a plurality of local telephone subscribers, the combination which comprises a main storage facility for storing a large plurality of digitally encoded words the main storage facility includes a plurality of cyclically operating storage means each with a capacity for serially storing a plurality of words, a monitoring system coupled to the telephone exchange for completing and transferring intact to the main storage facility substantially contemporaneously with the execution of said calls digitally encoded words describing the calls, each completed word describing a particular call and having a known order of digits which identify the calling subscriber, the called party and the time duration of the call, and a concurrently operable readout system coupled to the main storage facility for searching the contents thereof on demand and recovering words therefrom selectively according to the calling subscriber identification, said concurrently operable system including readout means for searching the main storage facility and serially recovering words having a particular calling subscriber identification, and control means for initiating the action of the readout means for particular subscriber identifications, said readout means includes means for cyclically reading the contents of said storage means one at a time in succession, comparator means for producing an identifying signal each time a word bearing said particular calling subscriber identification appears on the output of the reading means and prior in time to the appearance of the digits in the word which identify the called party and the time duration of the call, means responsive to said identifying signals for serially recovering the words from which they result, and means for controlling the advancement of the reading means so that the serial contents of each storage area are repeated cyclically until said words are recovered before advancing to the next storage means in said succession, said readout means further includes means for transferring for storage in the main storage facility at a predetermined location within each word recovered and prior to the time the reading means leaves each storage means a signal indicating that the word has once been recovered by the readout means, said predetermined location within each word being in advance of the digits which identify the called party and the time duration of the call, and means sensitive to said stored signals for blocking the subsequent recovery of the same words by the readout means, said readout means further including means for decoding and printing the information as it is recovered and in accordance with a predetermined format.

17. In a system for keeping account of telephone calls placed through a telephone exchange from any of a plurality of local telephone subscribers, the combination which comprises a main storage facility for storing a large plurality of digitally encoded words, the main storage facility includes a plurality of cyclically operating storage means each with a capacity for serially storing a plurality of words, a monitoring system coupled to the telephone exchange for completing and transferring intact to the main storage facility substantially contemporaneously with the execution of said calls digitally encoded words describing the calls, each completed word describing a particular call and having a known order of digits which identify the calling subscriber, the called party and the time duration of the call, and a concurrently operable readout system coupled to the main storage facility for searching the contents thereof on demand and recovering words therefrom selectively according to the calling subscriber identification, said concurrently operable system including readout means for searching the main storage facility and serially recovering words having a particular calling subscriber identification, and control means for initiating the action of the readout means for particular subscriber identifications, said readout means includes means for cyclically reading the contents of said storage means one at a time in succession, comparator means for producing an identifying signal each time a word bearing said particular calling subscriber identification appears on the output of the reading means and prior in time to the appearance of the digits in the word which identify the called party and the time duration of the call, means responsive to said identifying signals for serially recovering the words from which they result, and means for controlling the advancement of the reading means so that the serial contents of each storage area are repeated cyclically until said words are recovered before advancing to the next storage means in said succession, readout means further includes means for transferring for storage in the main storage facility at a predetermined location within each word recovered and prior to the time the reading means leaves each storage means a signal indicating that the word has once been recovered by the readout means, said predetermined location within each word being in advance of the digits which identify the called party and the time duration of the call, said signal transferring means comprises means for diverting the identifying signals from said comparator means to the main storage facility for storage in the words recovered, and means sensitive to said stored signals for blocking the subsequent recovery of the same words by the readout means, said blocking means comprises means sensitive to said stored identifying signals for blocking concurrent identifying signals on the output of the comparator means, said readout means further including means for decoding and printing the information as it is recovered and in accordance with a predetermined format.

References Cited in the file of this patent

UNITED STATES PATENTS

| | | |
|---|---|---|
| 2,369,868 | Taylor et al. | Feb. 20, 1945 |
| 2,639,092 | Retallack | May 10, 1953 |
| 2,850,720 | Oliwa | Sept. 2, 1958 |
| 2,886,642 | Morris | May 12, 1959 |
| 2,886,643 | Harris | May 13, 1959 |
| 2,984,704 | Terry | May 16, 1961 |
| 3,106,613 | Mann et al. | Oct. 8, 1963 |
| 3,117,187 | Baker | Jan. 7, 1964 |

FOREIGN PATENTS

| | | |
|---|---|---|
| 763,828 | Great Britain | Dec. 16, 1956 |

UNITED STATES PATENT OFFICE
CERTIFICATE OF CORRECTION

Patent No. 3,160,709 December 8, 1964

Harry E. Burke

It is hereby certified that error appears in the above numbered patent requiring correction and that the said Letters Patent should read as corrected below.

Column 15, line 21, for "14" read -- 14A --; column 19, line 48, strike out "main", first occurrence; column 22, lines 19 and 20, strike out "in ac- voltage levels along the four leads in the" and insert instead -- in accordance with binary-decimal coding. An --; column 23, line 1, for "in" read -- is --; line 23, for "provide" read -- positive --; line 29, before "relay" insert -- pulse --; line 42, for "levels" read -- level --; same column 23, line 43, for "characteristics" read -- characteristic --; column 25, line 20, for "location" read -- locations --; column 27, line 55, for "companying" read -- company --; column 33, line 60, for "read-wire" read -- read-write --; column 40, line 19, for "395" read -- 295 --.

Signed and sealed this 15th day of June 1965.

(SEAL)
Attest:

ERNEST W. SWIDER
Attesting Officer

EDWARD J. BRENNER
Commissioner of Patents